Jan. 31, 1939.   H. A. FOOTHORAP   2,145,254
COMBINED CALCULATING AND RECORDING MACHINE
Filed Dec. 30, 1932   45 Sheets-Sheet 8

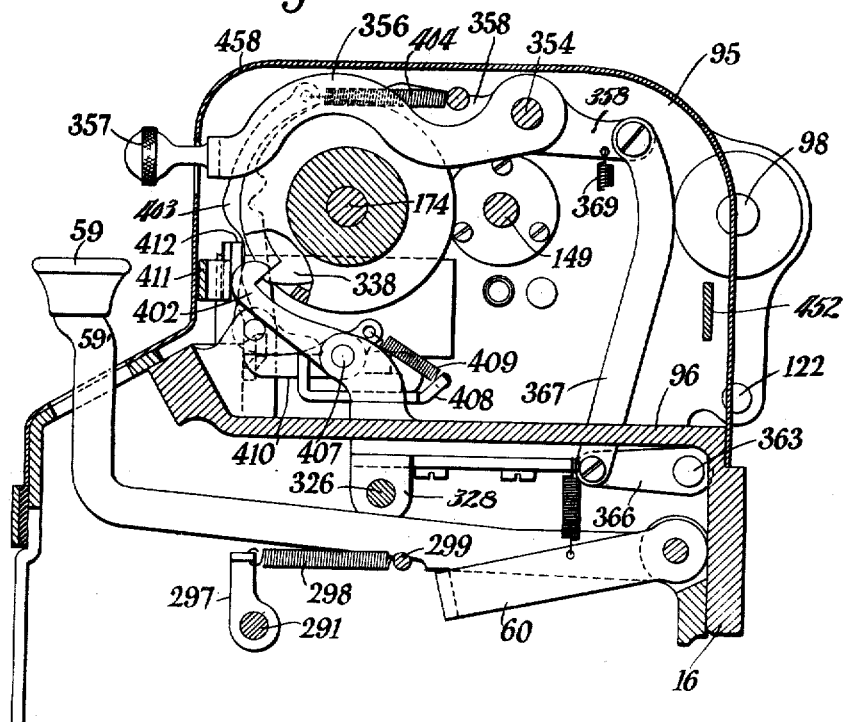
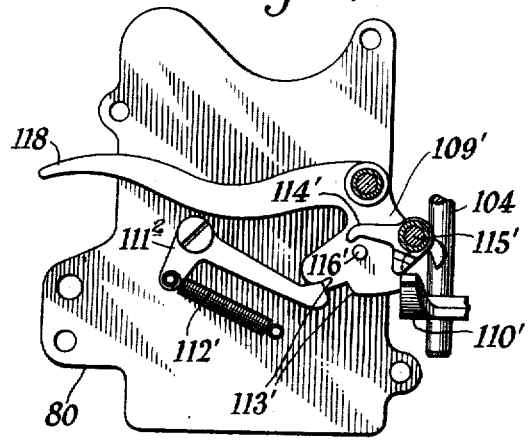

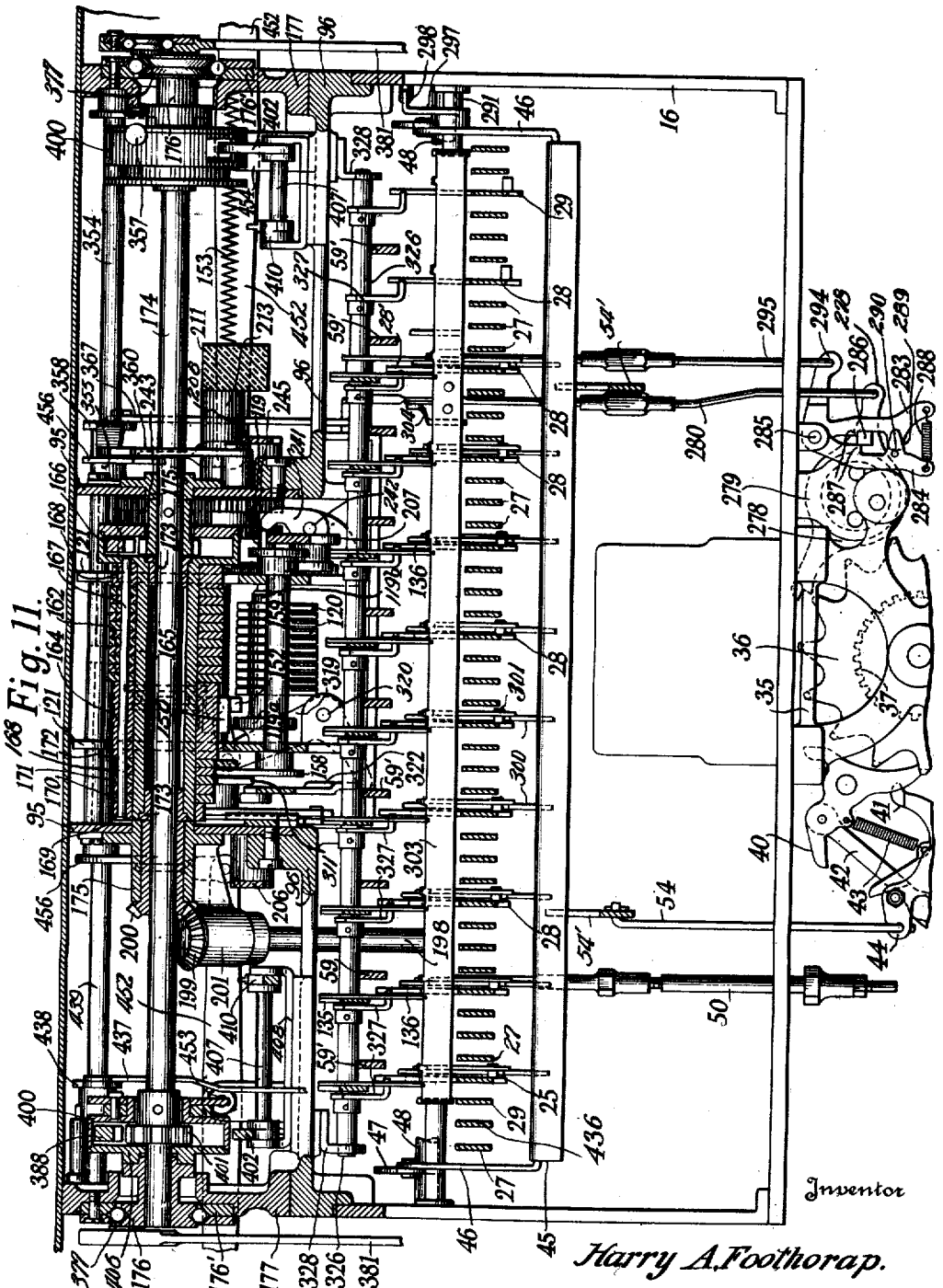

Jan. 31, 1939.  H. A. FOOTHORAP  2,145,254
COMBINED CALCULATING AND RECORDING MACHINE
Filed Dec. 30, 1932   45 Sheets-Sheet 12
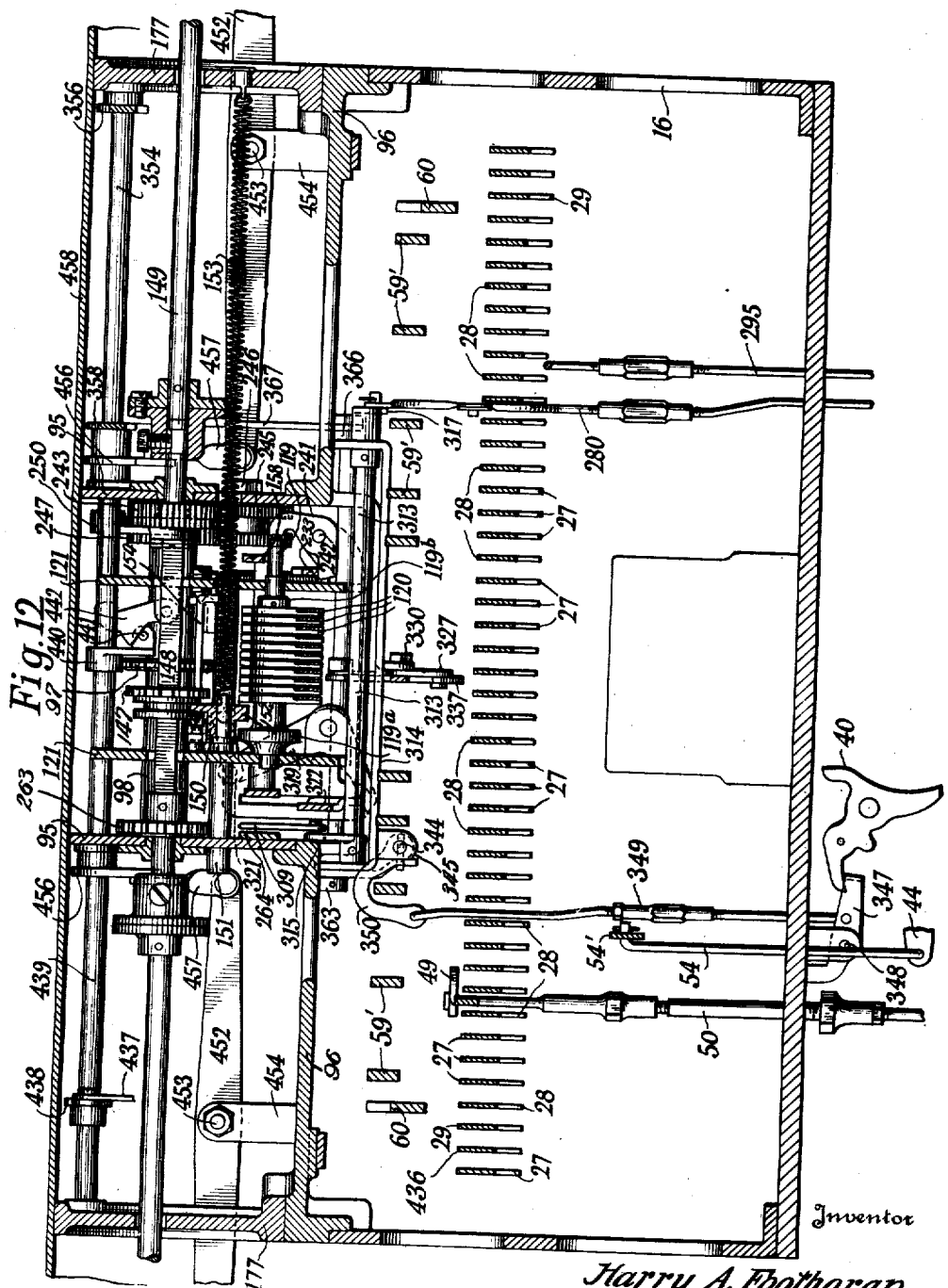
Inventor
Harry A. Foothorap,
By
Attorney

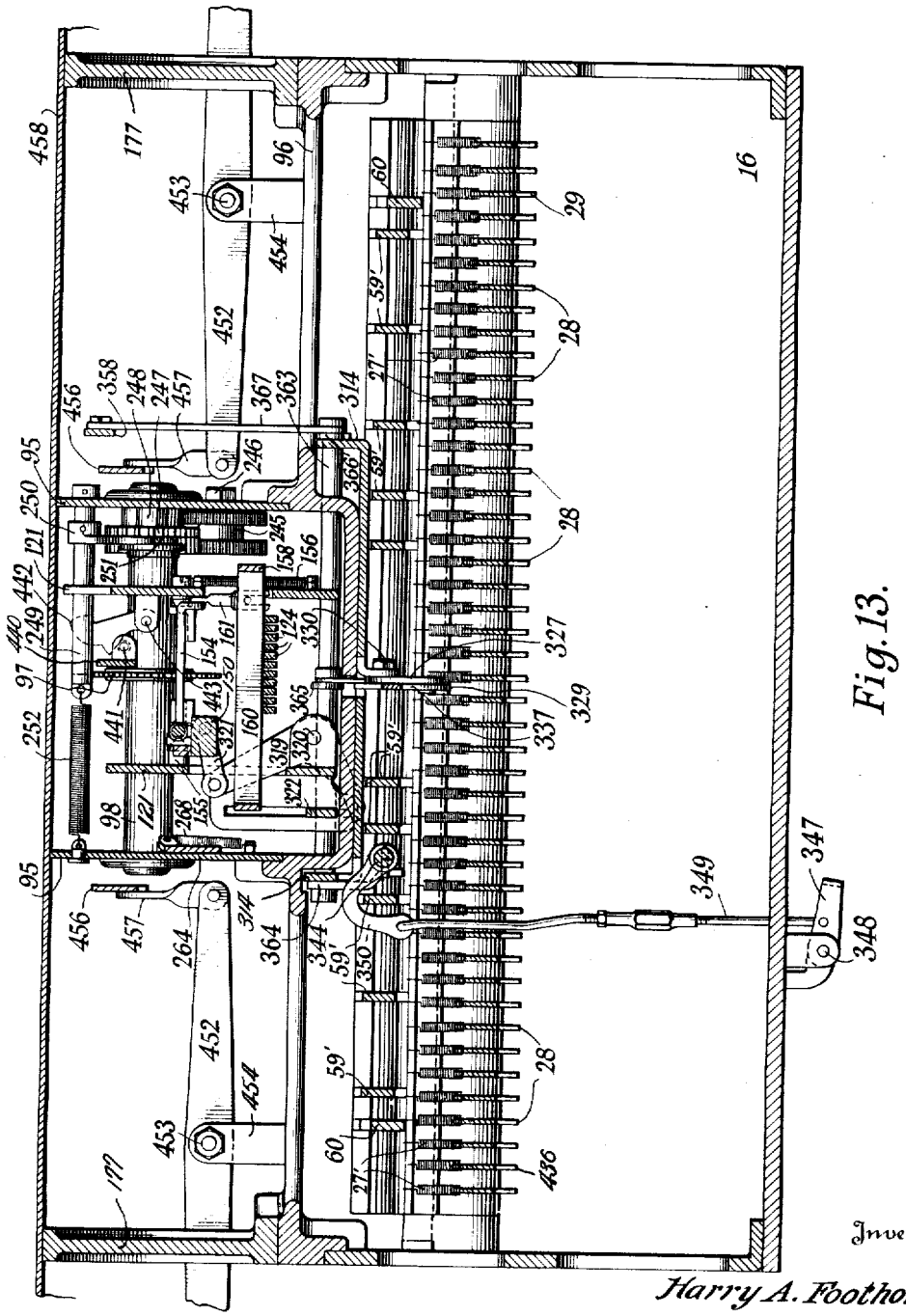

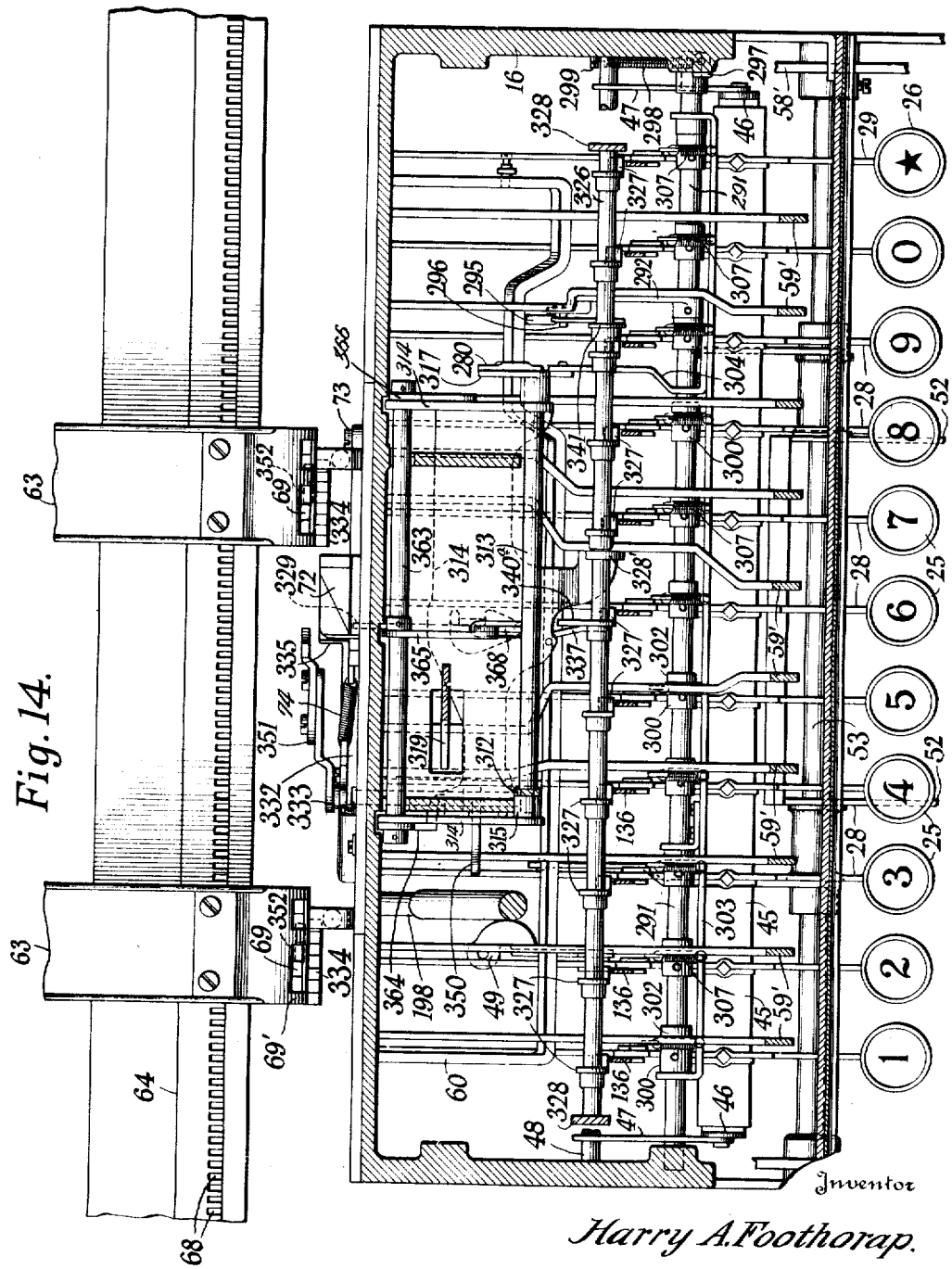

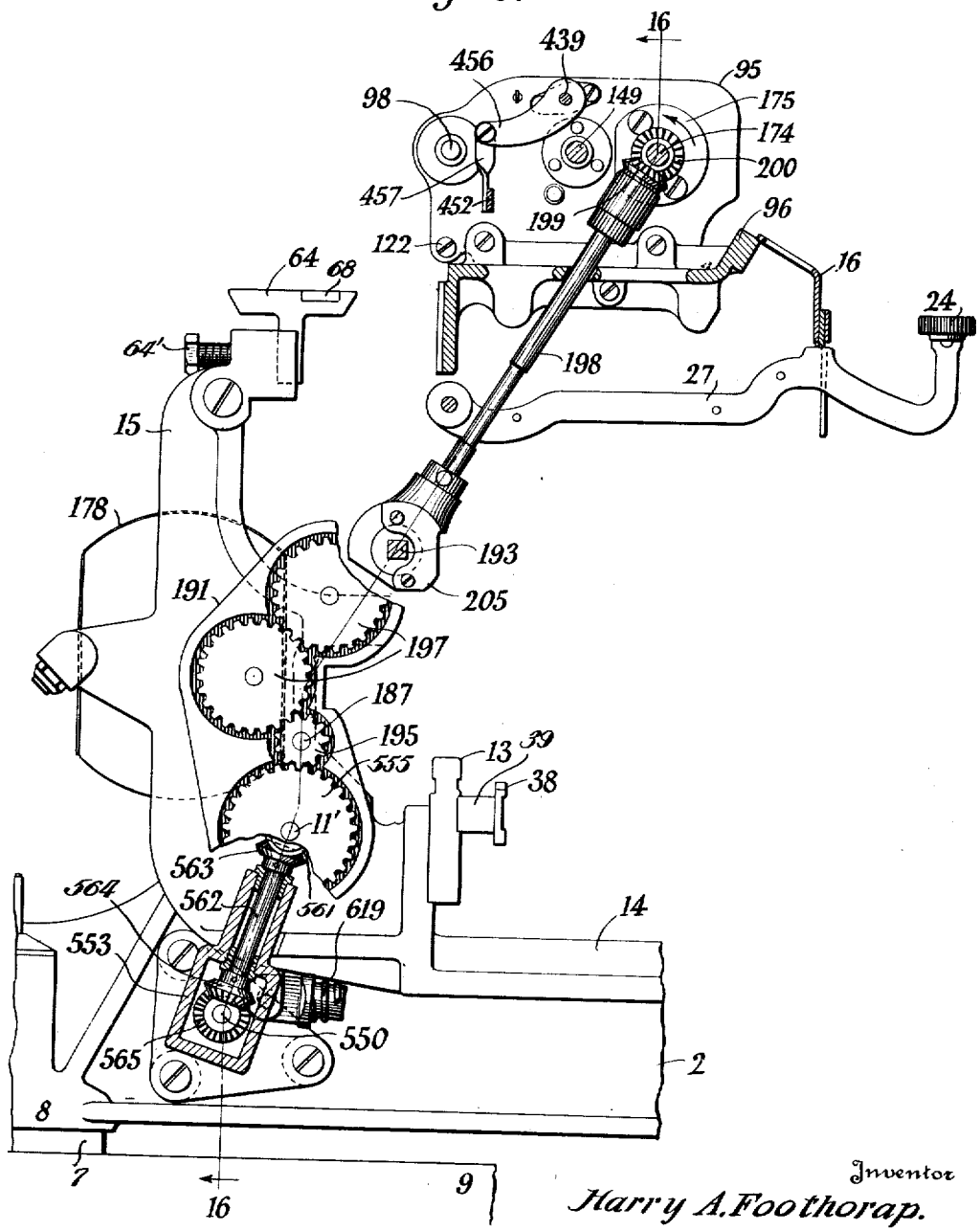

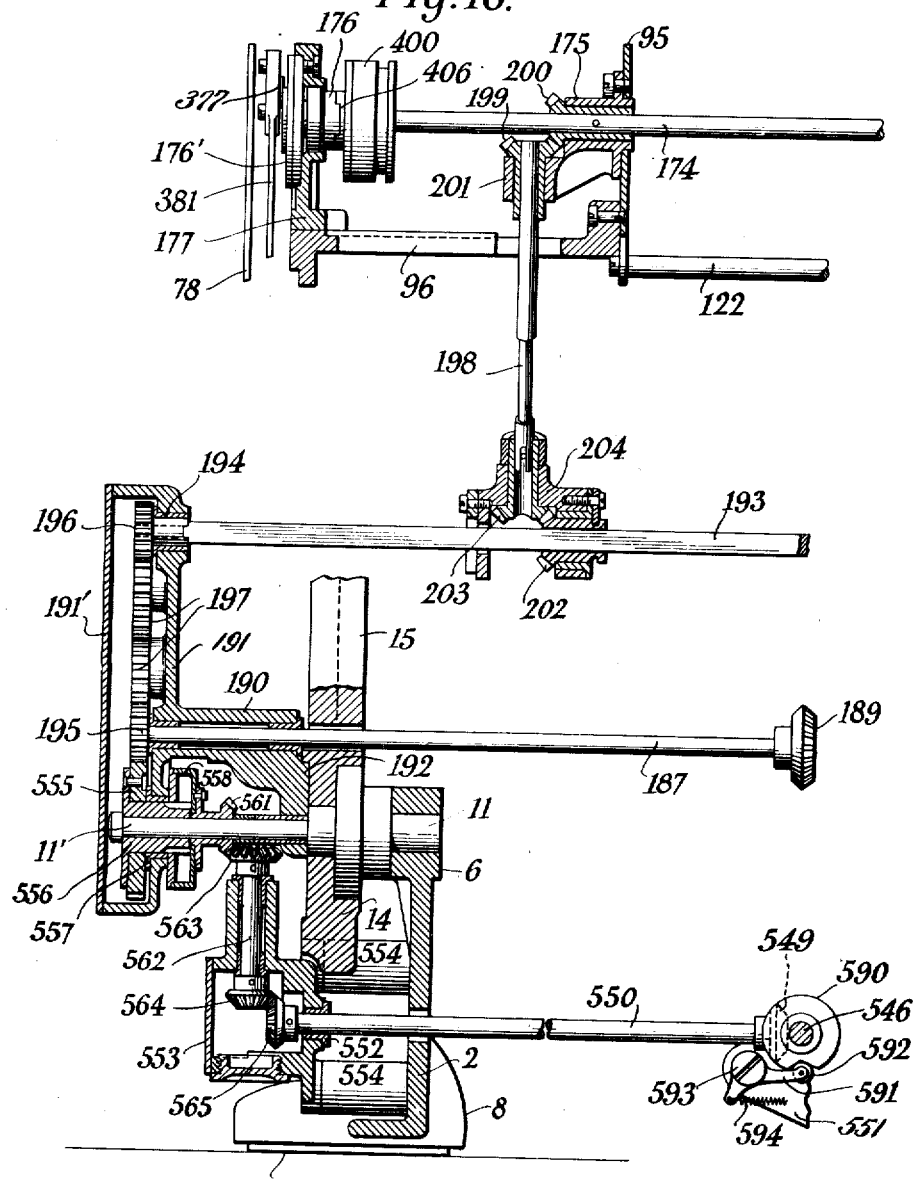

Jan. 31, 1939.   H. A. FOOTHORAP   2,145,254
COMBINED CALCULATING AND RECORDING MACHINE
Filed Dec. 30, 1932   45 Sheets-Sheet 17

Inventor
*Harry A. Foothorap.*

F. E. Gibson.

By
Attorney

Jan. 31, 1939. H. A. FOOTHORAP 2,145,254
COMBINED CALCULATING AND RECORDING MACHINE
Filed Dec. 30, 1932 45 Sheets-Sheet 18

Inventor
*Harry A. Foothorap.*

F. C. Gibson.

By L. G. Julihn
Attorney

Jan. 31, 1939.  H. A. FOOTHORAP  2,145,254
COMBINED CALCULATING AND RECORDING MACHINE
Filed Dec. 30, 1932   45 Sheets-Sheet 20

Inventor
Harry A. Foothorap.
By
Attorney

Jan. 31, 1939.　　　H. A. FOOTHORAP　　　2,145,254
COMBINED CALCULATING AND RECORDING MACHINE
Filed Dec. 30, 1932　　　45 Sheets-Sheet 21

Inventor
Harry A. Foothorap.

Inventor
Harry A. Foothorap.
By L. G. Julihn
Attorney

Jan. 31, 1939.    H. A. FOOTHORAP    2,145,254
COMBINED CALCULATING AND RECORDING MACHINE
Filed Dec. 30, 1932    45 Sheets-Sheet 23

Inventor
Harry A. Foothorap.
By
Attorney

Jan. 31, 1939.   H. A. FOOTHORAP   2,145,254
COMBINED CALCULATING AND RECORDING MACHINE
Filed Dec. 30, 1932   45 Sheets-Sheet 24
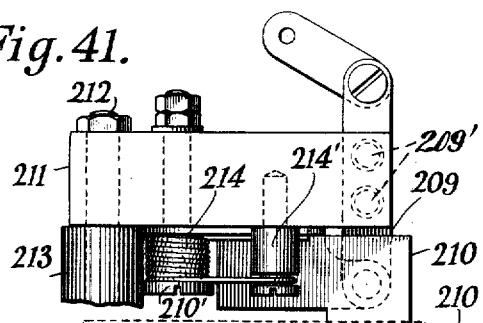
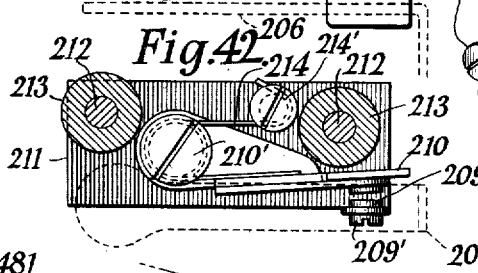
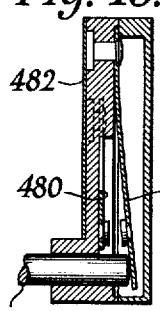
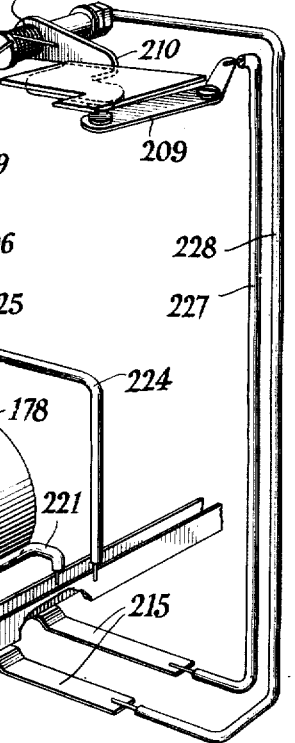
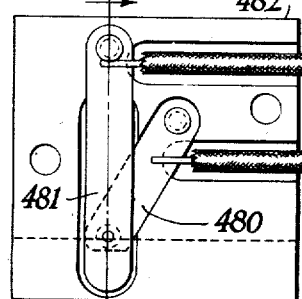
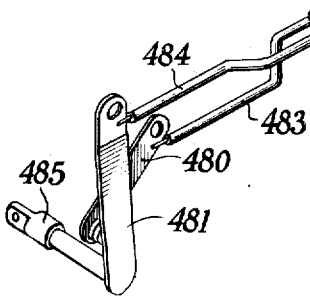
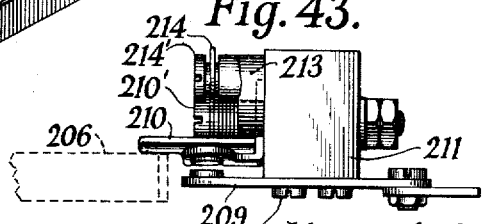

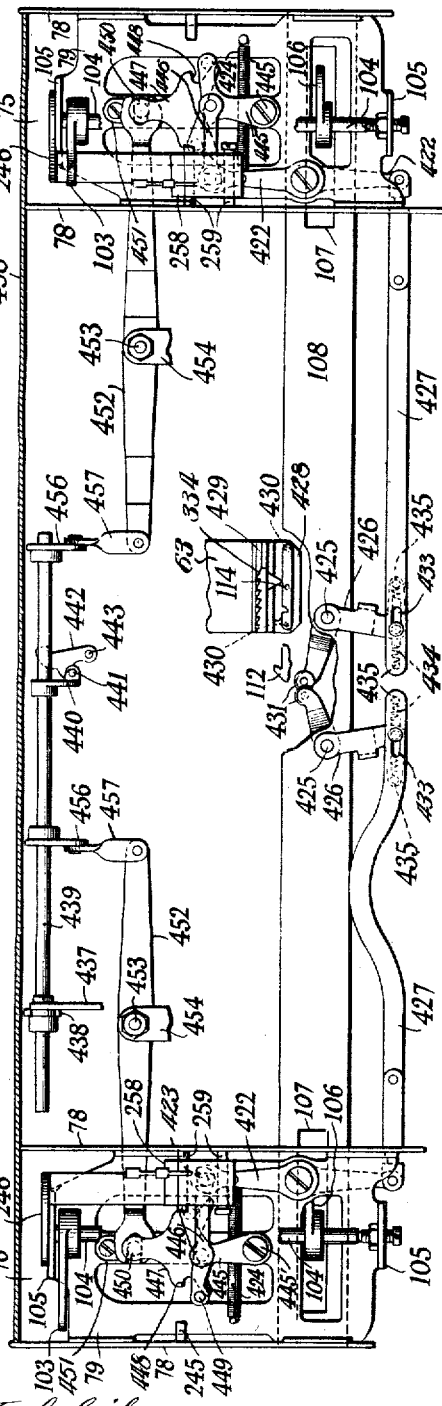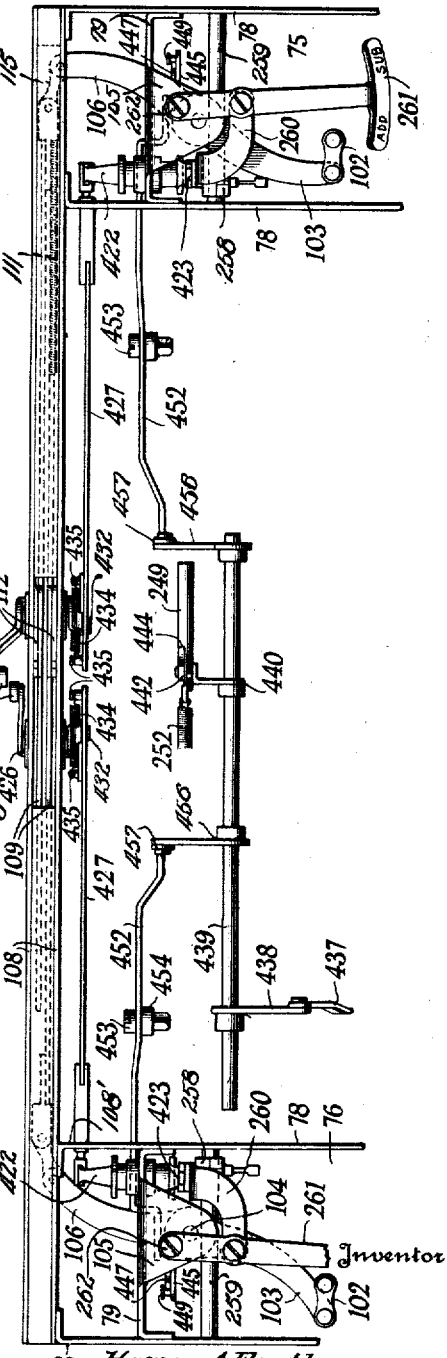

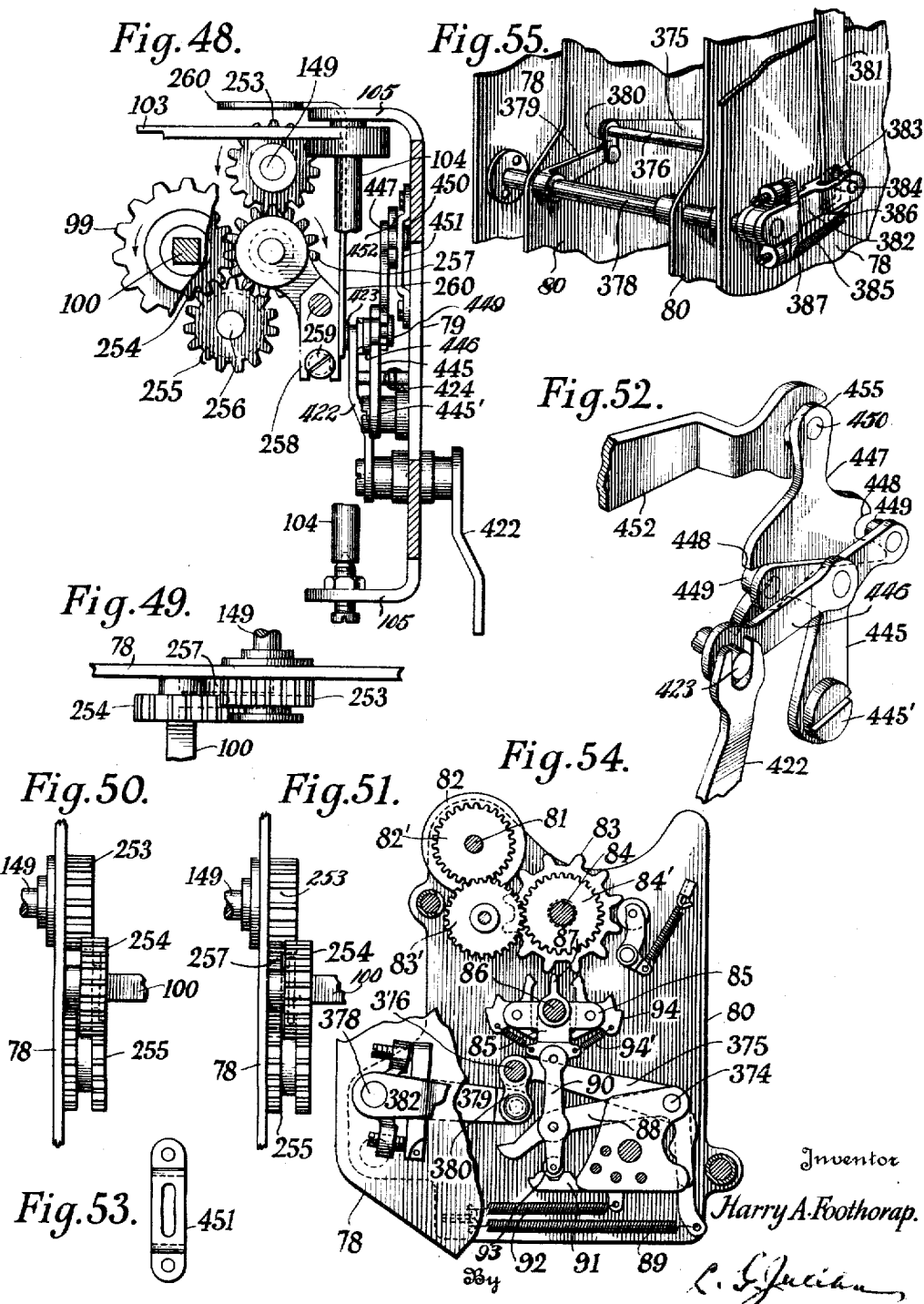

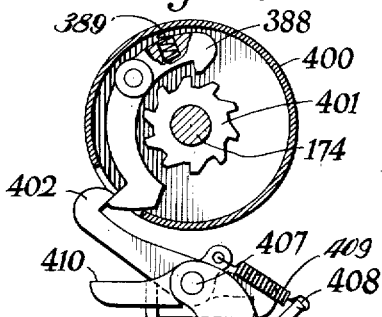
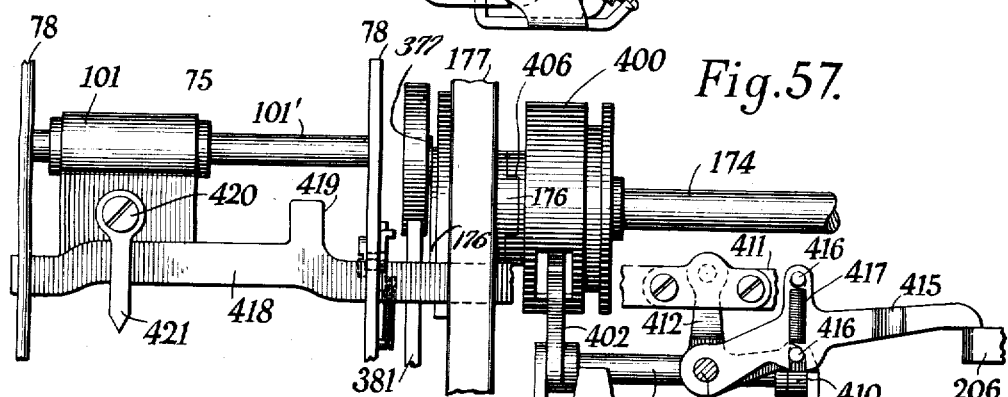
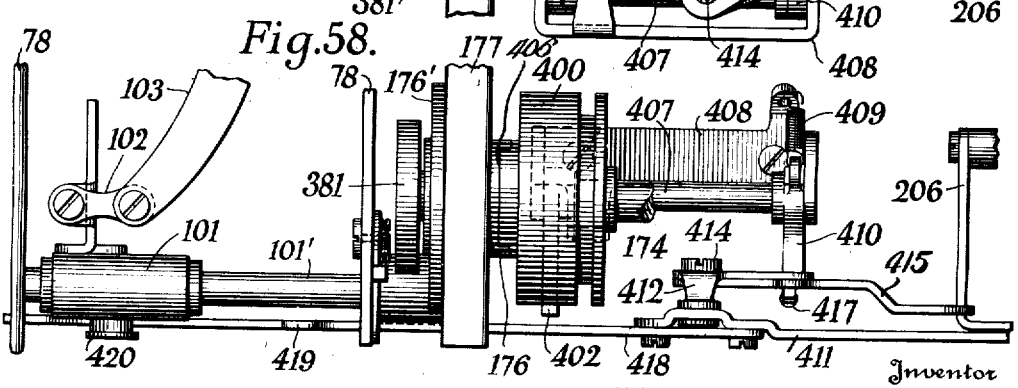

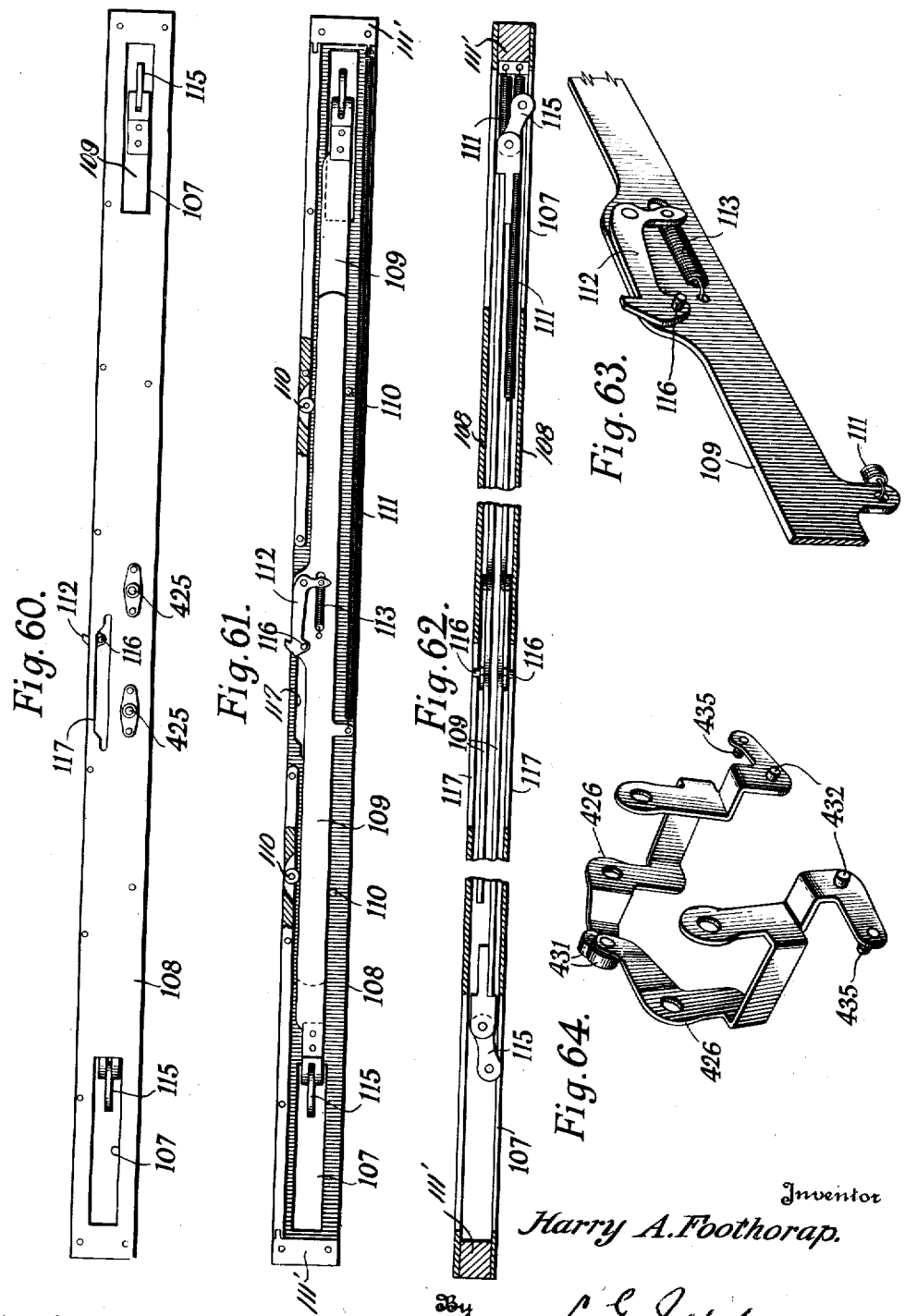

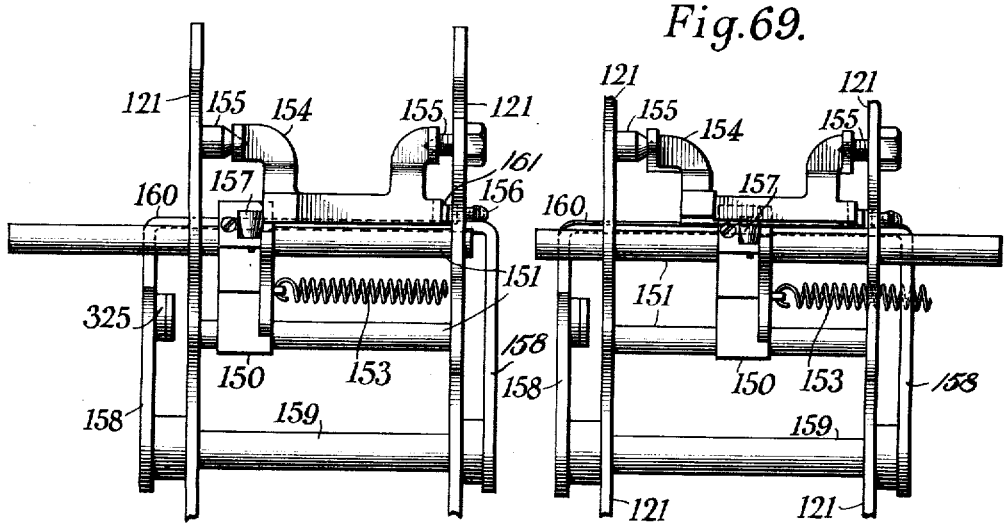
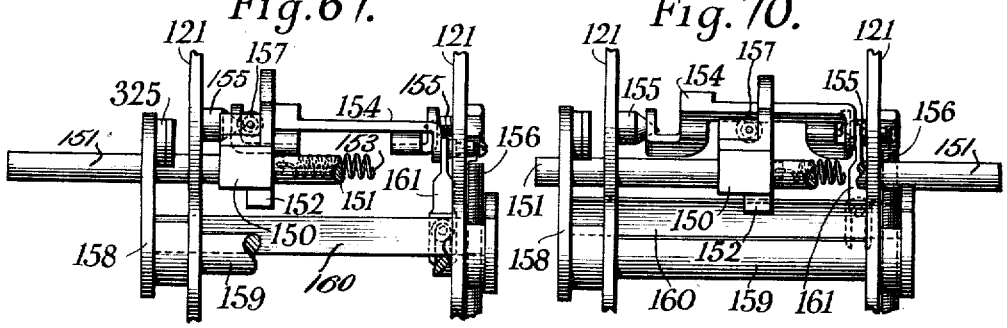
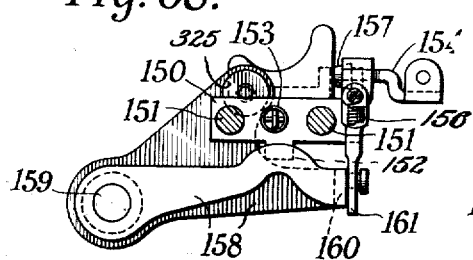
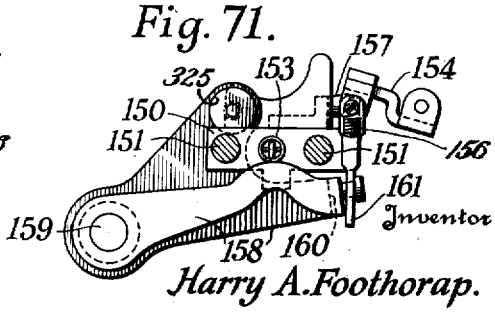

Jan. 31, 1939.  H. A. FOOTHORAP  2,145,254
COMBINED CALCULATING AND RECORDING MACHINE
Filed Dec. 30, 1932   45 Sheets-Sheet 30

Inventor
Harry A. Foothorap.

Jan. 31, 1939. H. A. FOOTHORAP 2,145,254
COMBINED CALCULATING AND RECORDING MACHINE
Filed Dec. 30, 1932 45 Sheets-Sheet 31
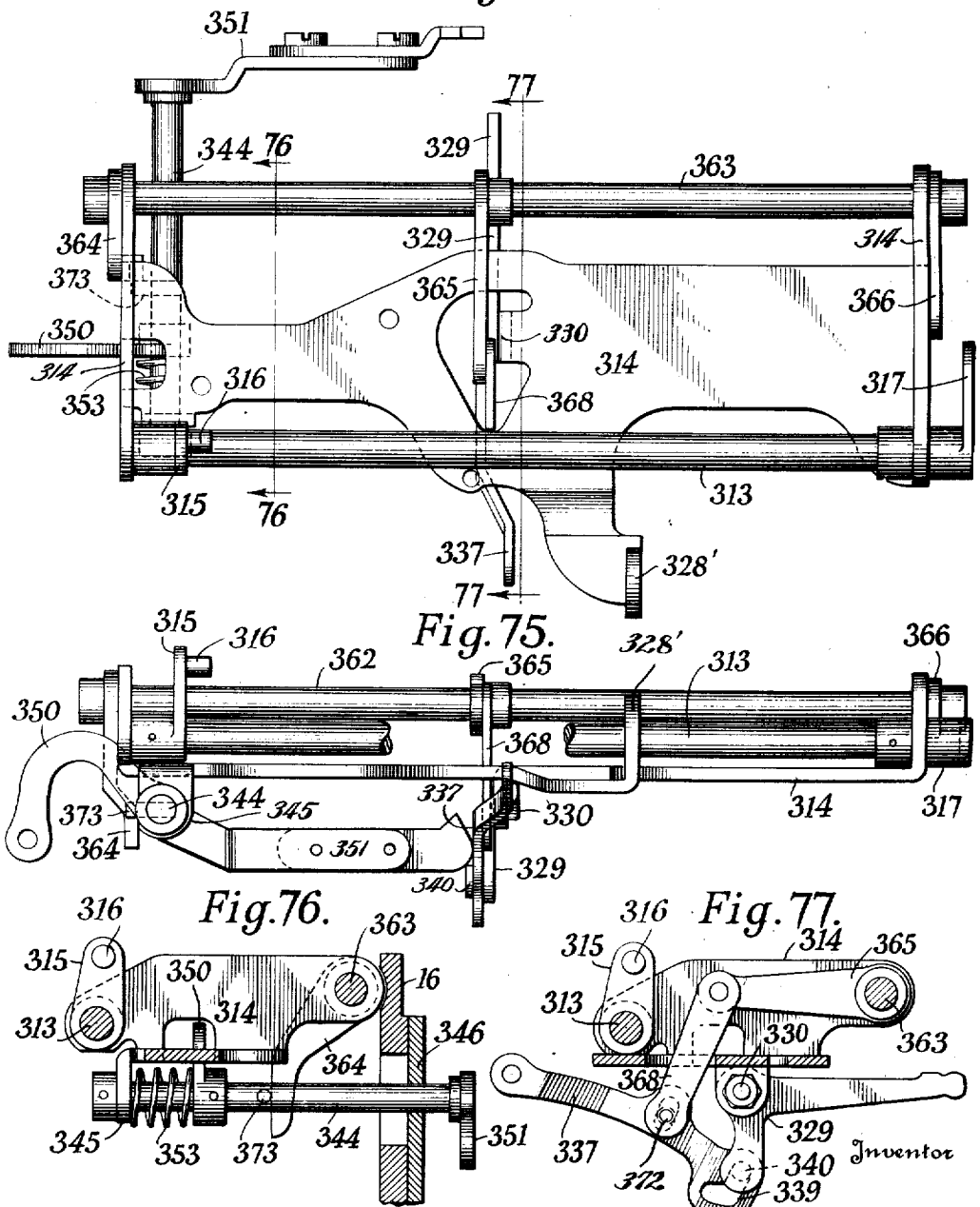
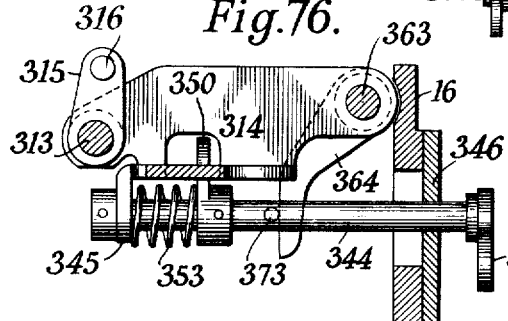
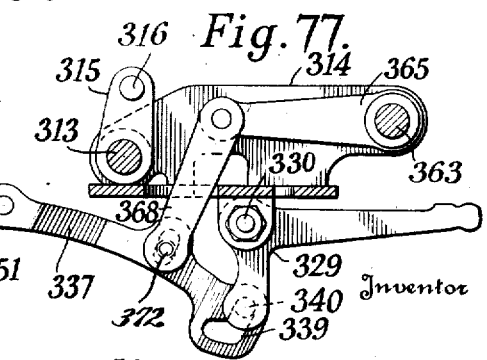
Inventor
Harry A. Foothorap.
By
Attorney Jan. 31, 1939.                H. A. FOOTHORAP                2,145,254
                   COMBINED CALCULATING AND RECORDING MACHINE
                      Filed Dec. 30, 1932      45 Sheets-Sheet 32

Inventor
*Harry A. Foothorap.*

By *L. G. _____*
Attorney

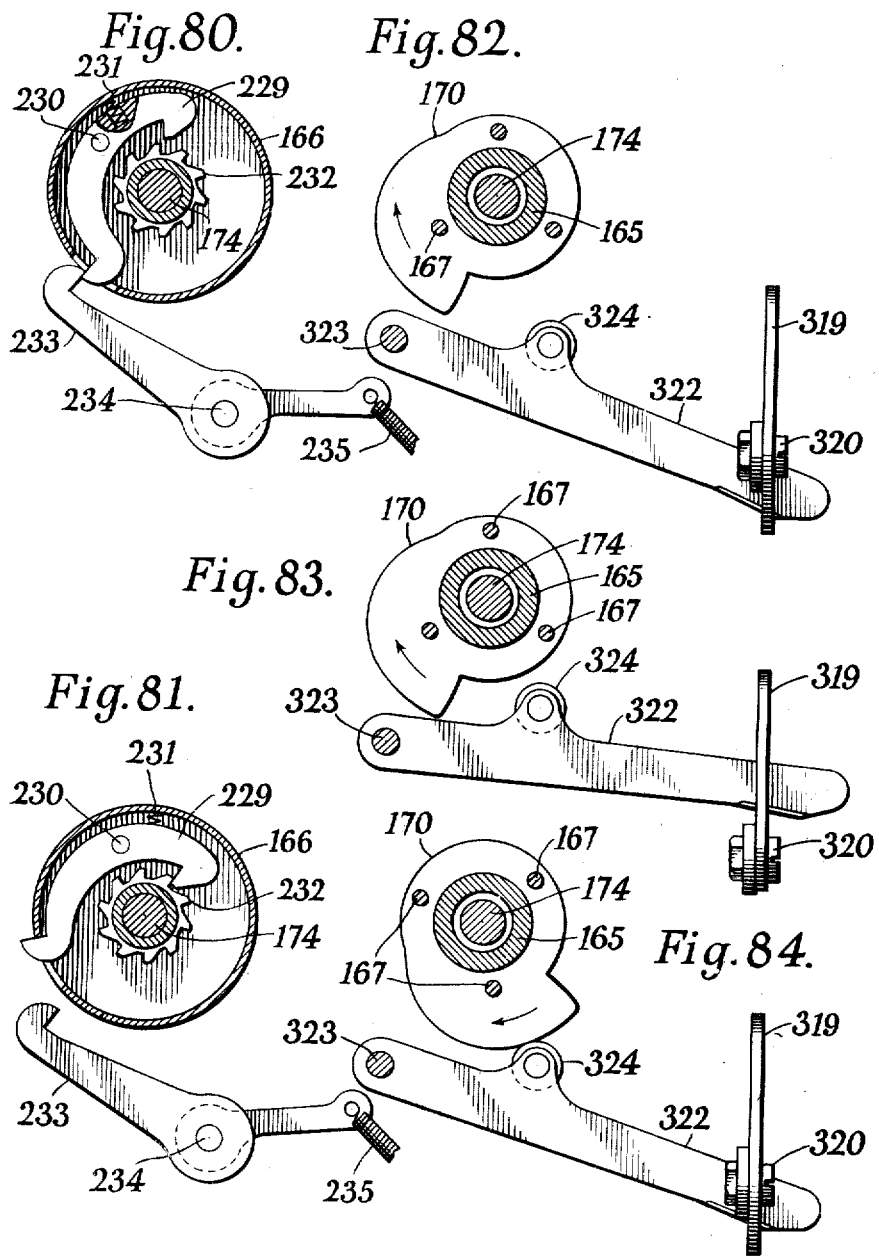

Jan. 31, 1939. H. A. FOOTHORAP 2,145,254
COMBINED CALCULATING AND RECORDING MACHINE
Filed Dec. 30, 1932 45 Sheets-Sheet 35

Inventor
Harry A. Foothorap.
Attorney

Jan. 31, 1939.    H. A. FOOTHORAP    2,145,254
COMBINED CALCULATING AND RECORDING MACHINE
Filed Dec. 30, 1932    45 Sheets-Sheet 36
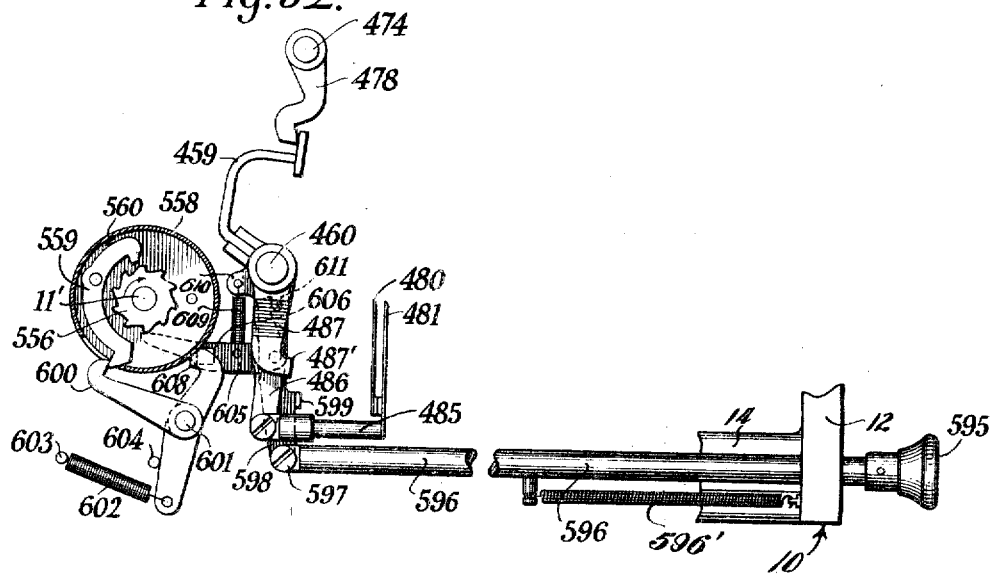
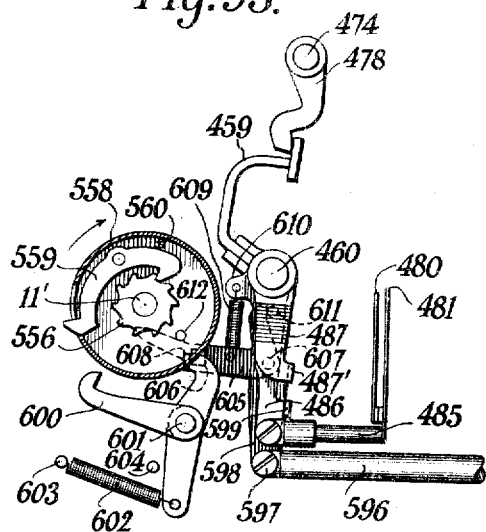
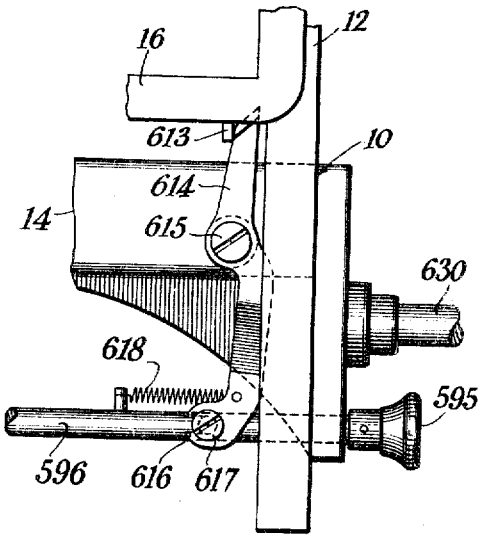
Inventor
Harry A. Foothorap.
By L. G. Julihn
Attorney

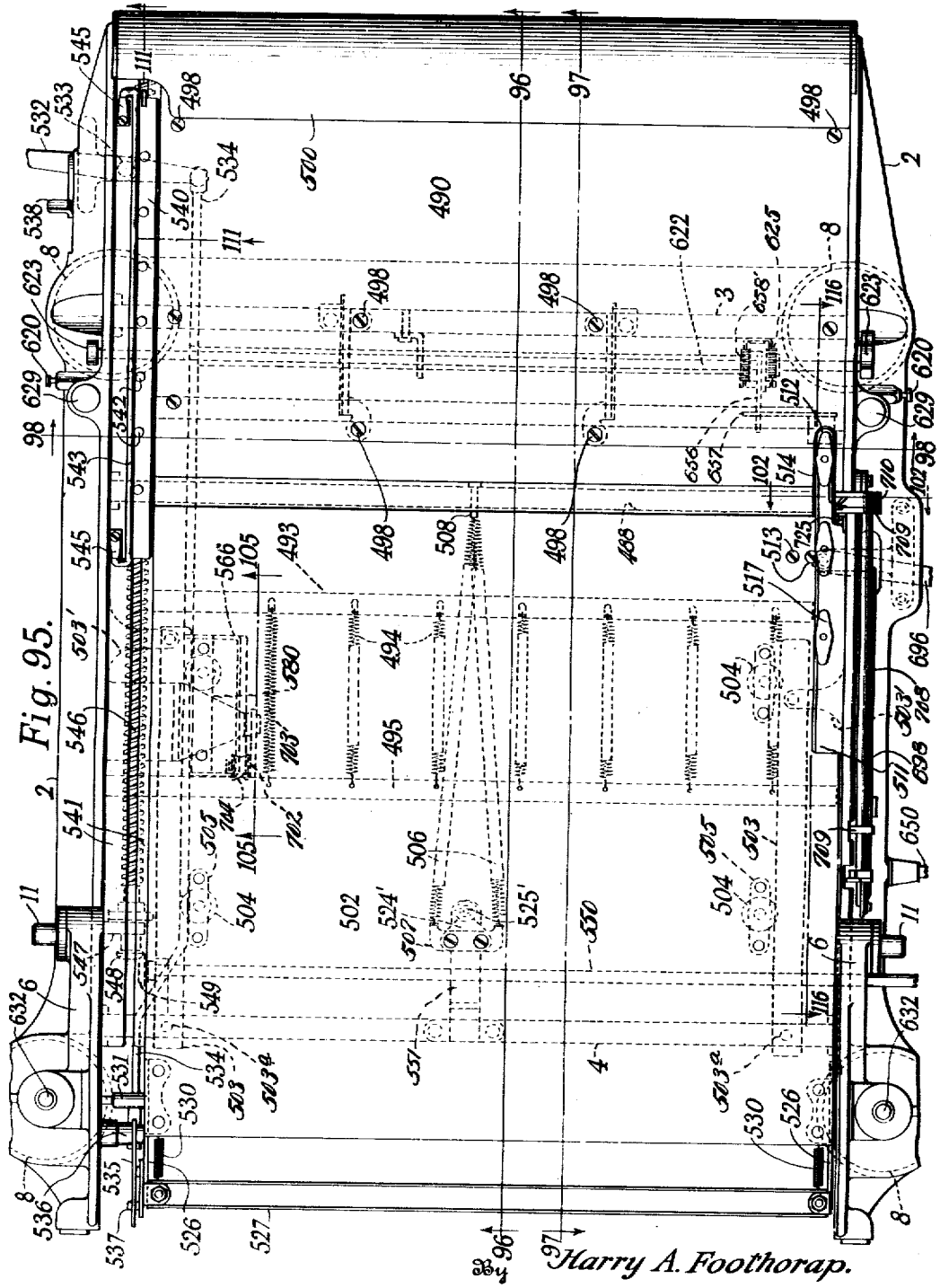

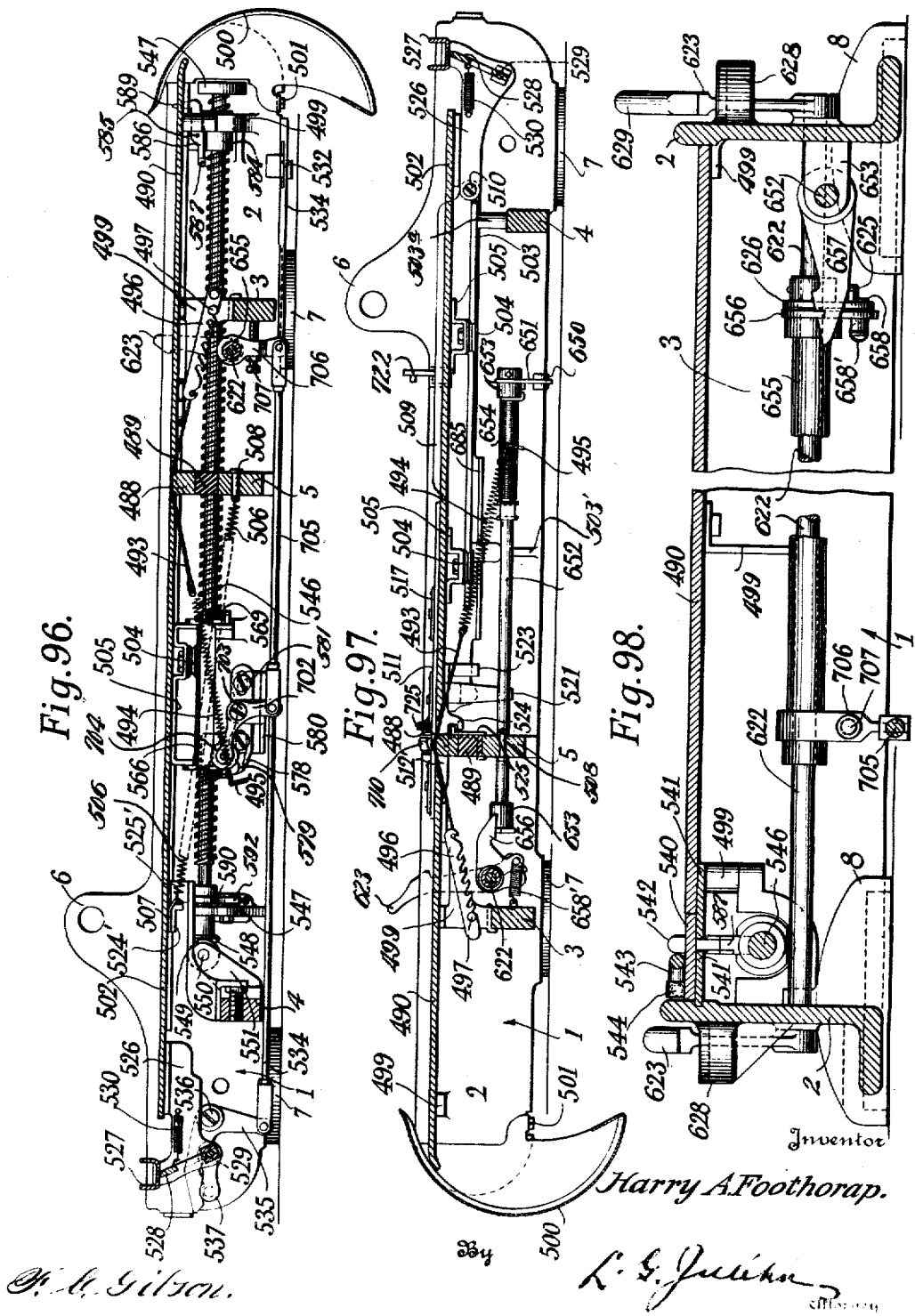

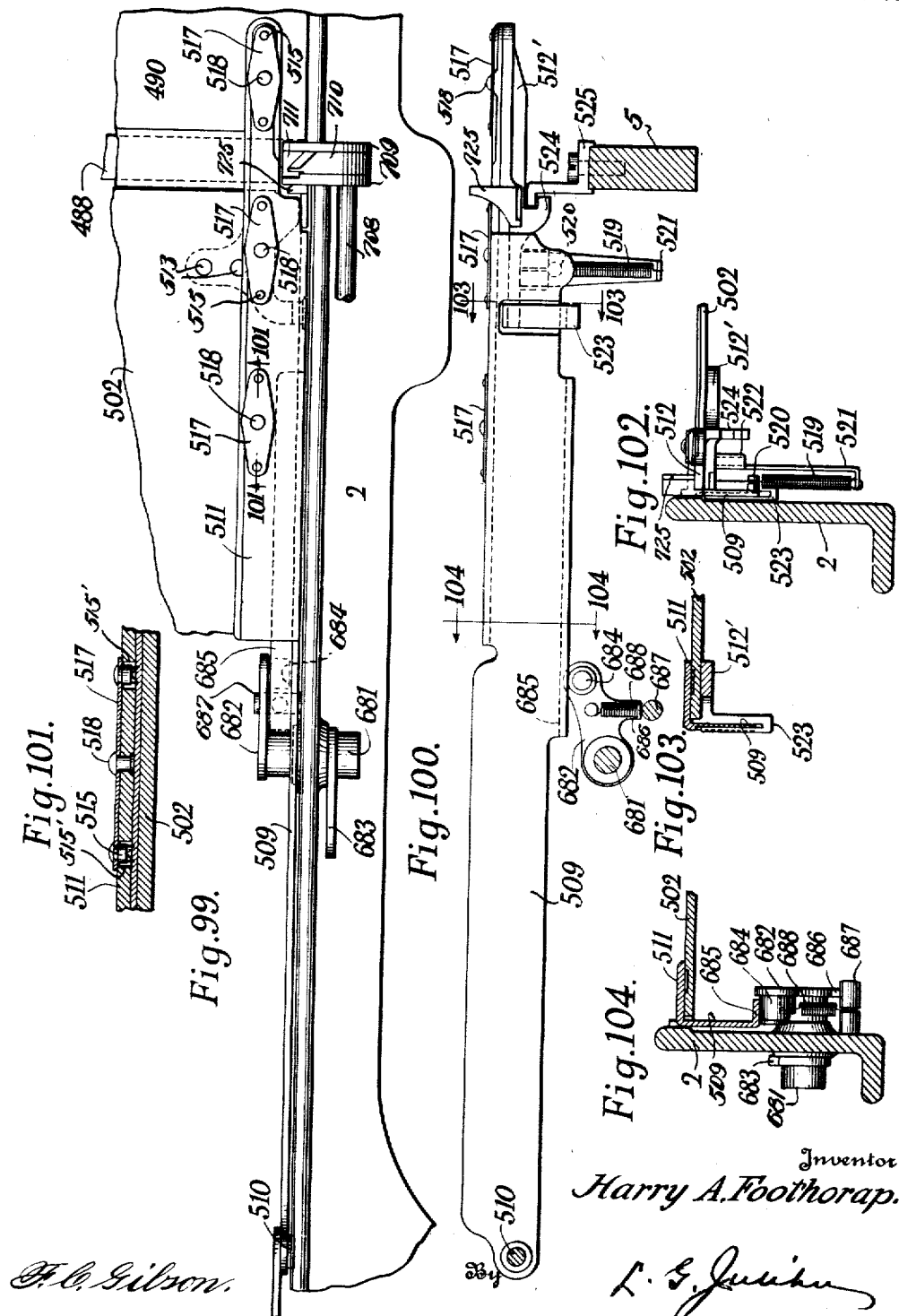

Jan. 31, 1939.  H. A. FOOTHORAP  2,145,254
COMBINED CALCULATING AND RECORDING MACHINE
Filed Dec. 30, 1932   45 Sheets-Sheet 40
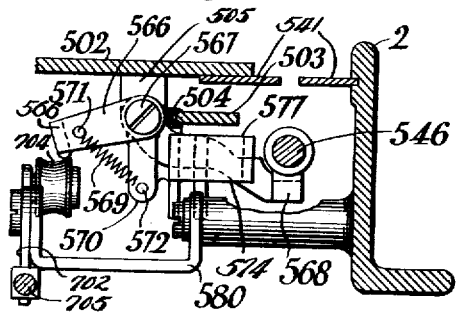
Fig. 108.
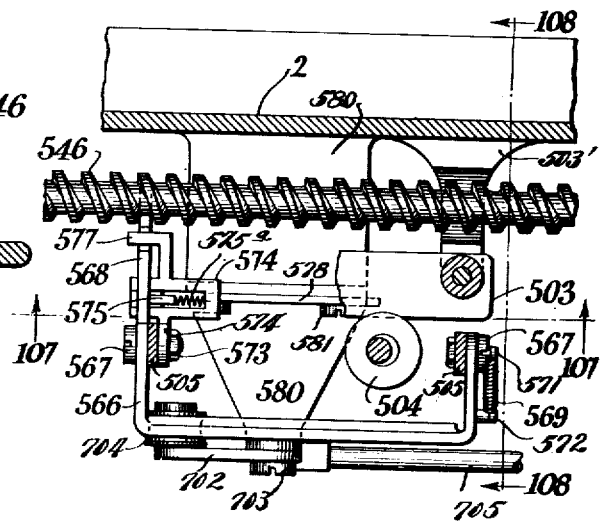
Fig. 106.
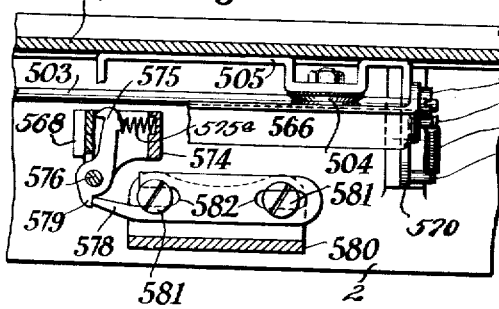
Fig. 107.
Fig. 109.
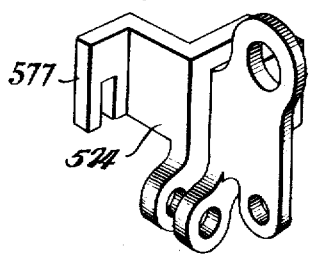
Fig. 110.
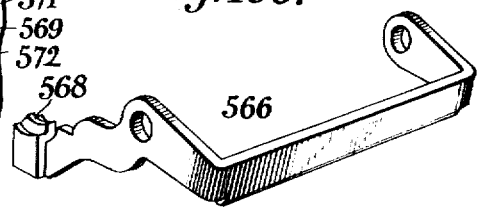
Fig. 105.
Inventor
Harry A. Foothorap.
By
Attorney

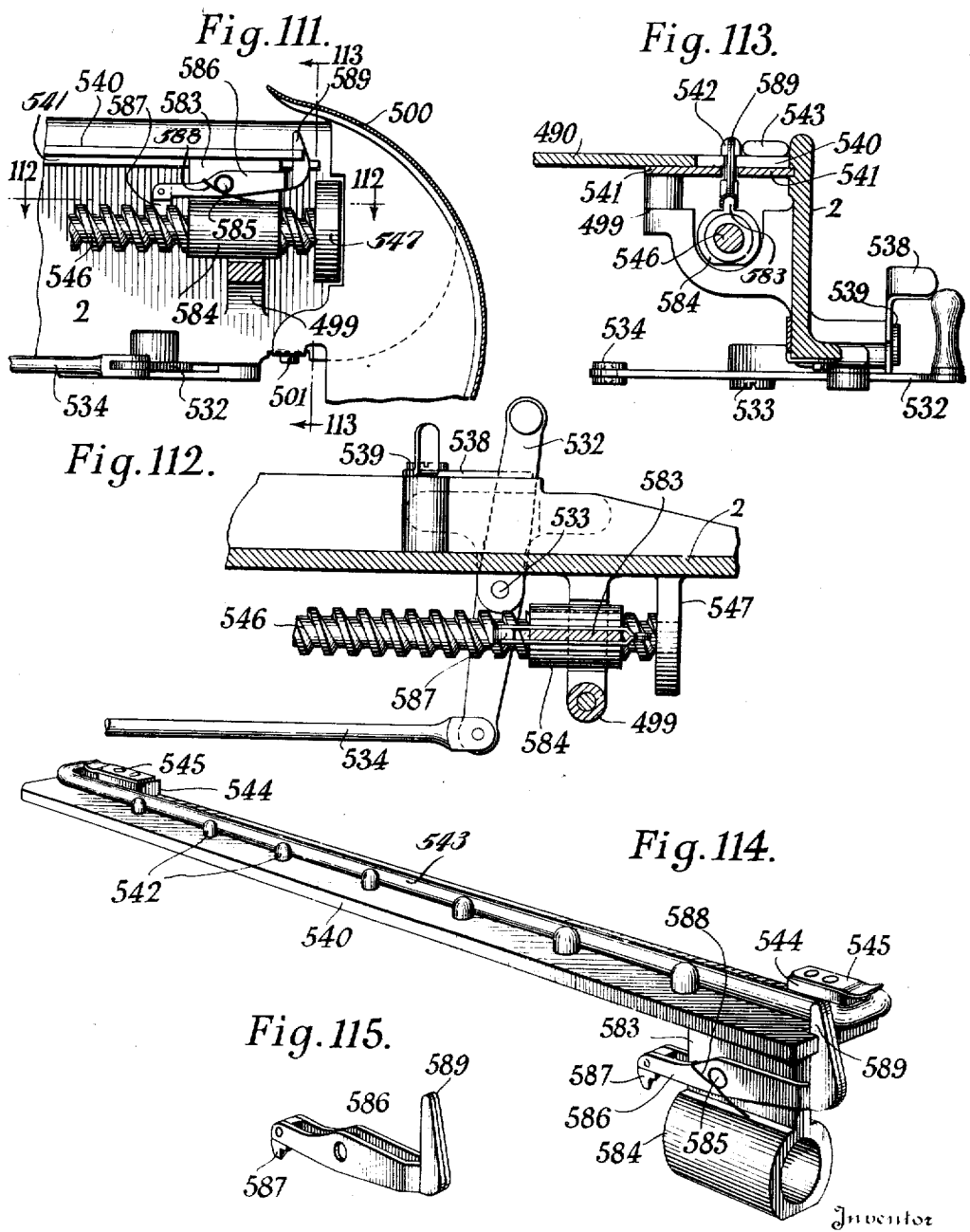

Jan. 31, 1939. H. A. FOOTHORAP 2,145,254
COMBINED CALCULATING AND RECORDING MACHINE
Filed Dec. 30, 1932 45 Sheets-Sheet 42
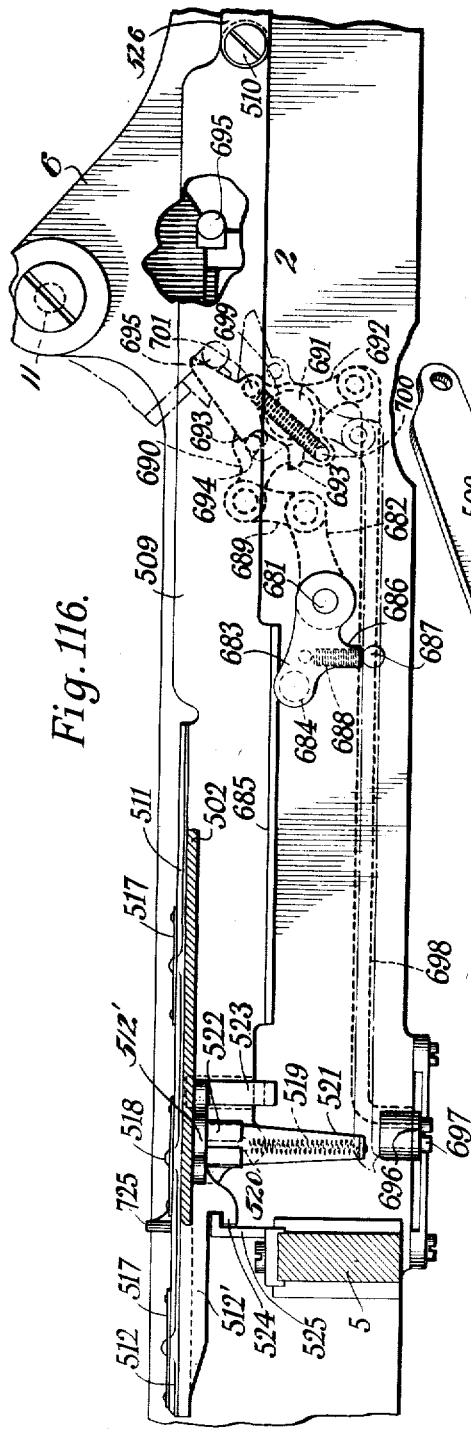
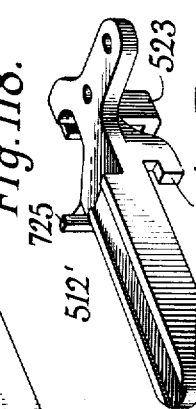
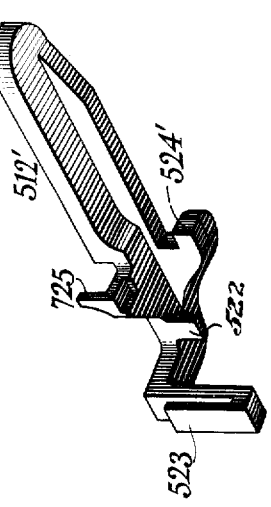
Inventor
Harry A. Foothorap.

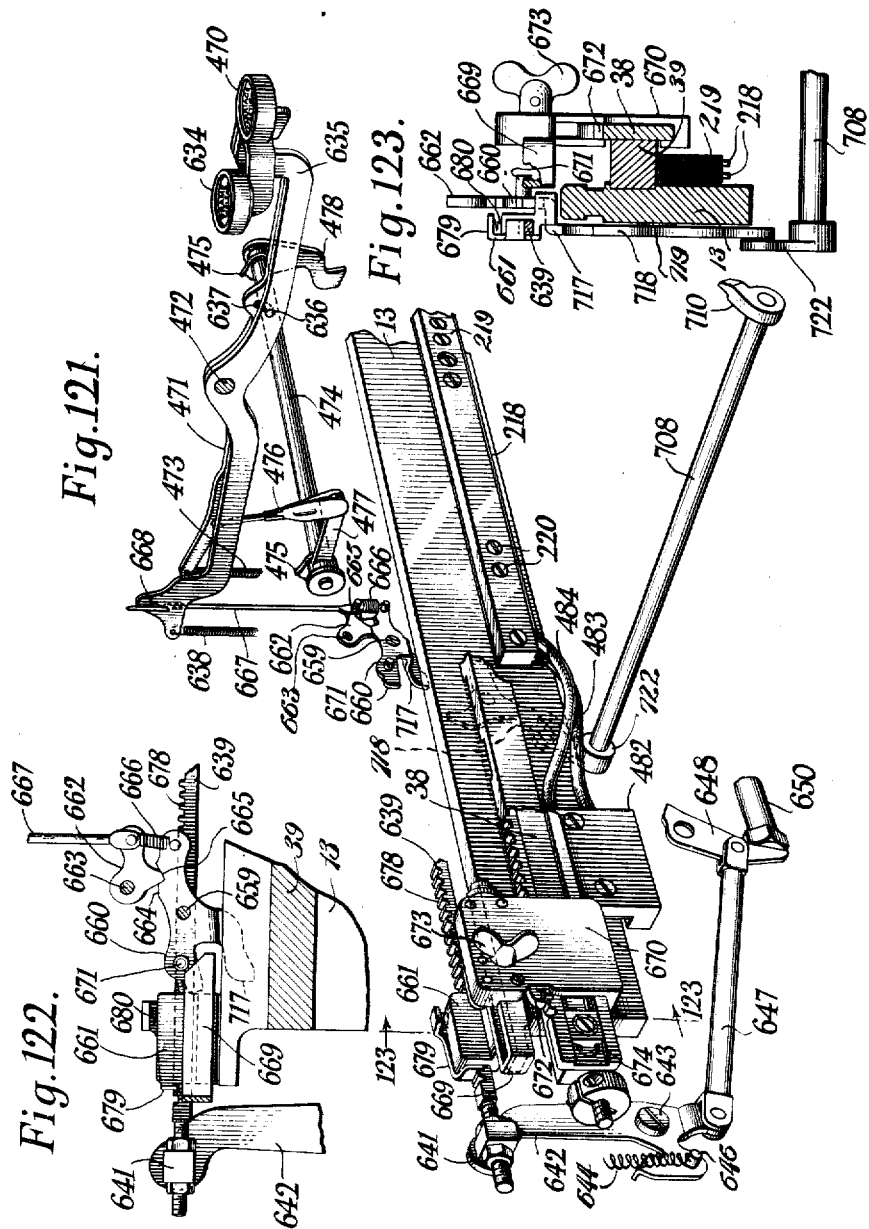

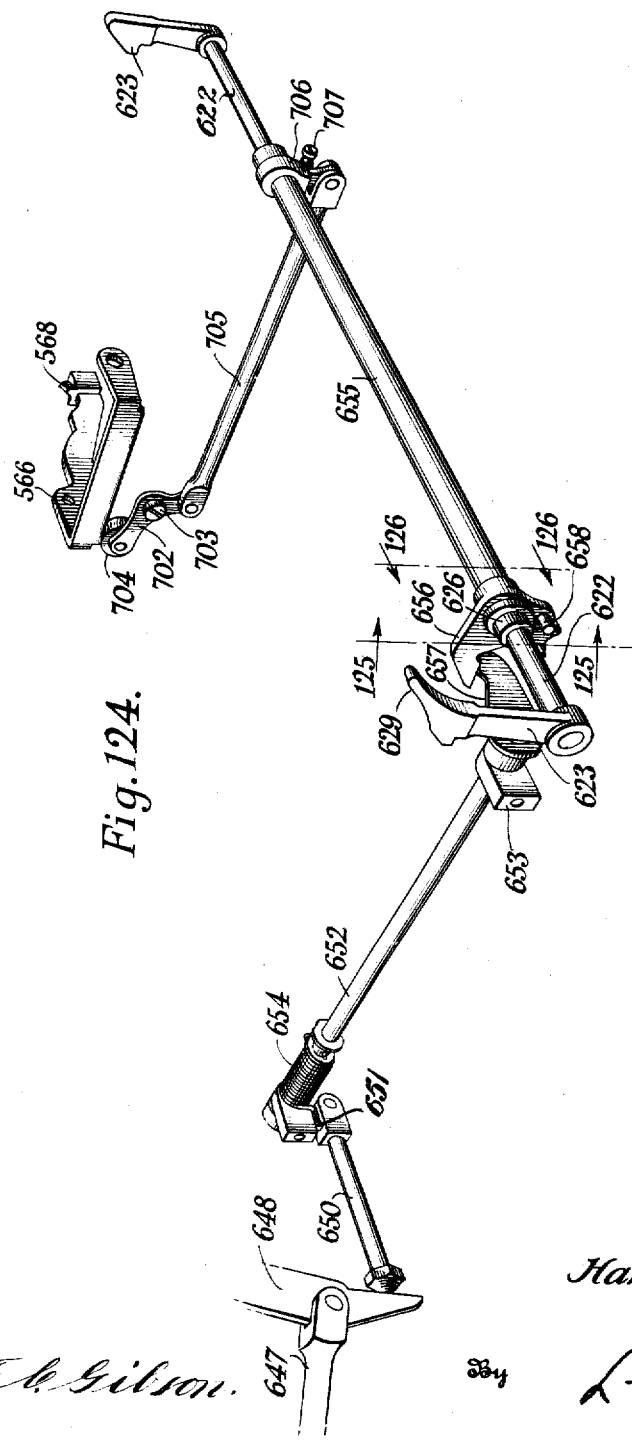

Jan. 31, 1939.　　　H. A. FOOTHORAP　　　2,145,254
COMBINED CALCULATING AND RECORDING MACHINE
Filed Dec. 30, 1932　　45 Sheets-Sheet 45

Inventor
Harry A. Foothorap.
By
Attorney

Patented Jan. 31, 1939

UNITED STATES PATENT OFFICE 2,145,254

COMBINED CALCULATING AND RECORDING MACHINE

Harry A. Foothorap, Harrisburg, Pa., assignor, by mesne assignments, to Underwood Elliott Fisher Company, New York, N. Y., a corporation of Delaware Application December 30, 1932, Serial No. 649,663

54 Claims. (Cl. 235—59)

My invention relates to combined calculating and recording machines, and more particularly to improvements in combined calculating and typewriting machines of the class known commercially as the Elliott-Fisher billing machine.

By way of explanation, the Elliott-Fisher machine, with which my invention is particularly concerned, is a combined calculating and typewriting mechanism distinguished, in its typewriting aspect, by down strike printing mechanism, and keys mounted on a carriage to travel over a subjacent flat platen. Viewed in its computing aspect, it is characterized by one or more so-called column registers past which the carriage travels, a grand totalizer or crossfooter register mounted on and travelling with the carriage, and column and crossfooter register master wheels or actuators mounted on the carriage and crossfooter register frames, respectively, to effect denominational selection in their relation registers incident to the step by step letter spacing travel of the carriage, and operated in synchronism by the number keys of the machine, to accumulate values in the registers as they are printed digit by digit in different columns. Usually the carriage is adapted to travel over the work to both line and letter space the printed record.

In its broad aspect, an important object of my invention is to equip a machine of the above designated class for motor operation of the register mechanism under control of the value keys of the machine, to the end that said keys are free from all load other than that incident to operation of the typewriting mechanism.

Another important object is to equip such a machine for carriage retraction, register operation under control of the value keys, and line spacing of the work, all by means of a single motor.

Another object of the invention is to provide, in such a machine, a shiftable frame supporting the carriage and registers, which frame is shiftable, at an angle, from and to the plane of the work, differential mechanism on the carriage for operating the registers under control of the keys, and a motor on the frame in constant driving relation to the differential mechanism on the carriage in any position of the latter.

Another object is to provide, in a machine equipped as above set forth, work feeding means beneath the shiftable frame, including driving mechanism connected to the motor on the frame in any position of the frame.

Another object is to provide motor means urging said frame into a position in which the typing mechanism is ineffective, and means for both manually and automatically controlling shifting of the frame to such position.

Another object is to provide novel means to clamp the work to the feeding means and to automatically release the clamping means when the frame is shifted away from the work.

Still another object is to provide for the automatic disconnection of the driving mechanism of the work feeding means when the work is automatically released.

Still another object is to provide means for automatically notching the work, and locating the same in exact line position.

Still another object is to provide differential mechanism on the carriage, including stops automatically set under control of the value keys, stop resetting mechanism, means normally locking the differential mechanism against operation, and a general operator on the carriage driven by a motor on the frame, and operatively related to the locking means and stop resetting mechanism to unlock the differential mechanism and reset the stops.

Still another object is to provide for locking the carriage in position under control of the keys during operation of a register, and unlocking said carriage by operation of said general operator.

Still another object is to equip the carriage with two grand totalizers or cross-footer registers, which may be power-operated either in unison or singly, as desired, state control mechanism being associated with the cross-footer registers, whereby either crossfooter register may be caused to either add or subtract in connection with any column register.

Still another object is to equip the cross-footer registers with transfer restoring mechanism automatically operative by a motor on the frame, under control of the denominational selecting mechanism of the cross-footer registers.

To the accomplishment of the foregoing and other and subordinate objects, one embodiment of my invention has been illustrated in the accompanying drawings and will now be set forth in detail, and defined in the claims appended hereto.

Reference is directed to my co-pending divisional applications, as follows: Division A, filed November 11, 1935, Serial No. 49,158; Division B, filed April 4, 1938, Serial No. 199,837; and Division C, filed June 25, 1938, Serial No. 215,823; for claims to such inventions as are shown and described herein, but not claimed in this application.

In the drawings:

Fig. 10 is another similar view taken on the line 10—10 of Fig. 4;

Fig. 11 is a view in transverse vertical section taken on the line 11—11 of Fig. 5;

Fig. 12 is a similar view taken on the line 12—12 of Fig. 5;

Fig. 13 is another similar section taken on the line 13—13 of Fig. 5;

Fig. 14 is a view partly in top plan and partly in horizontal section taken on the line 14—14 of Fig. 5;

Fig. 15 is a detail view, partly in side elevation and partly in section, illustrating the main driving mechanism of the machine;

Fig. 16 is a detail sectional view taken on the line 16—16 of Fig. 15;

Figure 65:
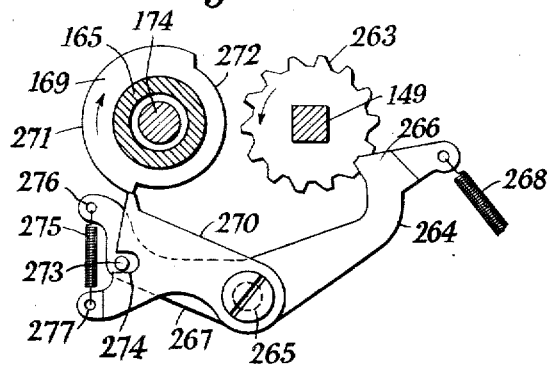
Figure 8:
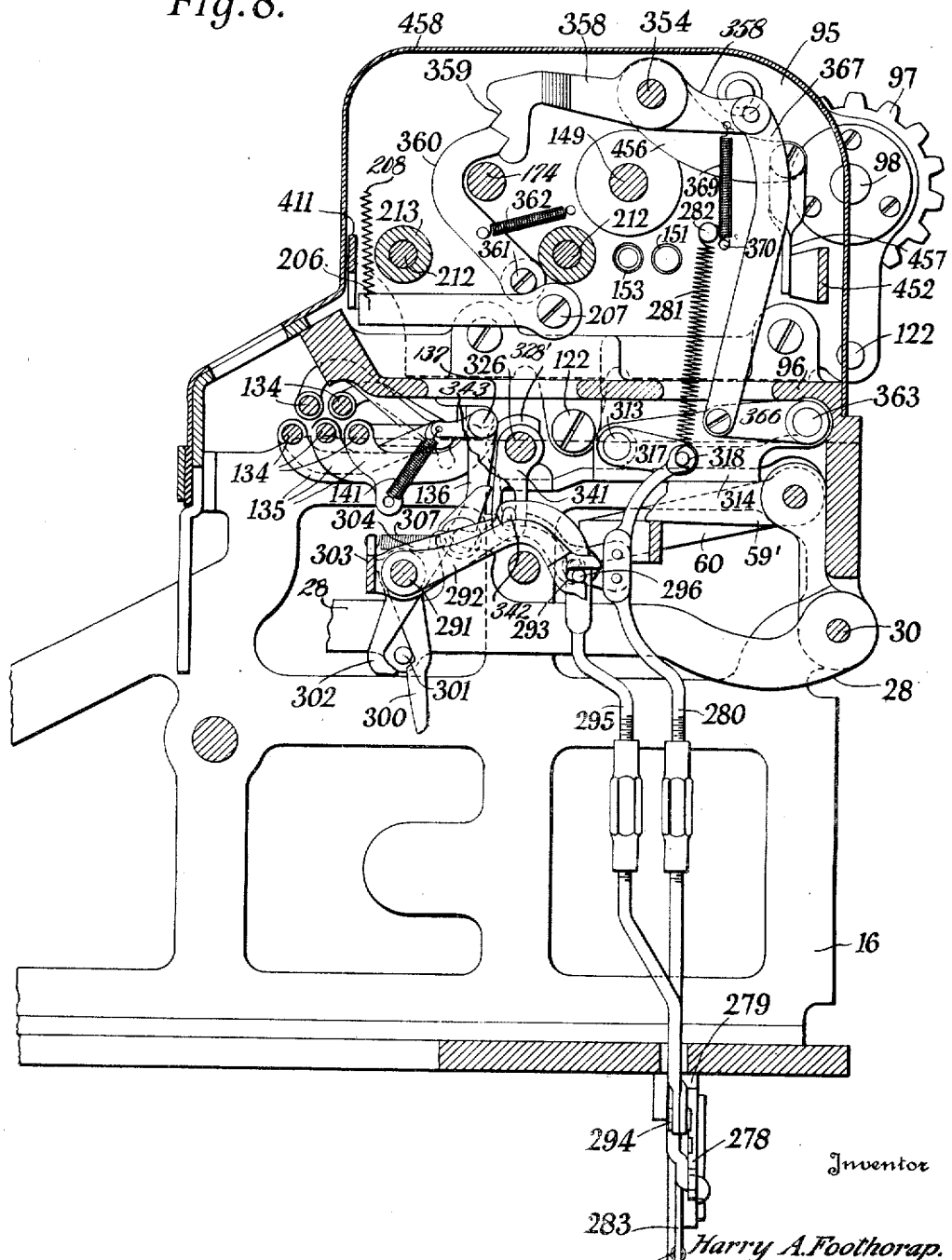
Fig. 8 is a view similar to Fig. 5 taken on the line 8—8 of Fig. 4.
Figure 9:
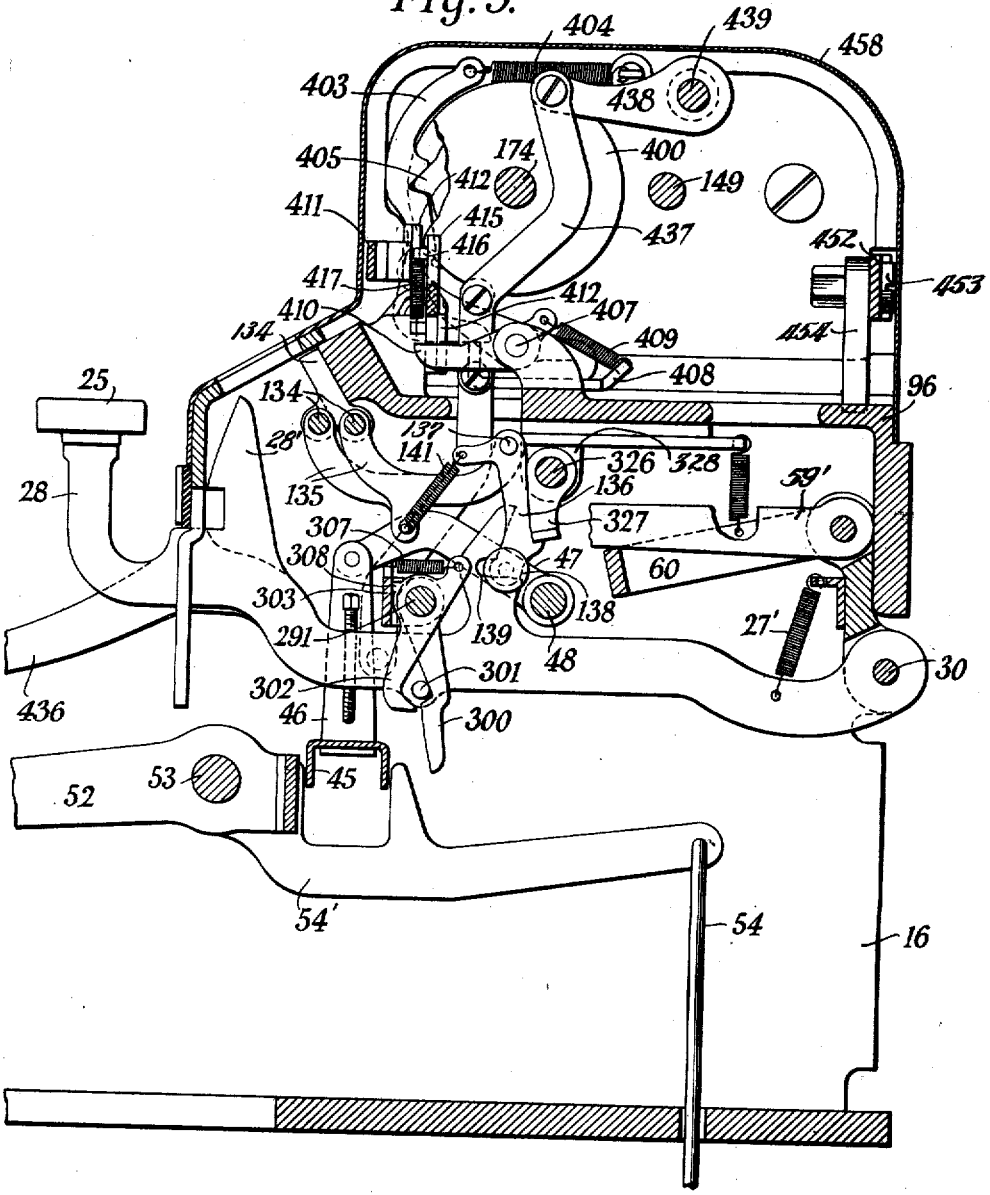
Fig. 9 is a similar view taken on the line 9—9 of Fig. 4.
Figure 17:
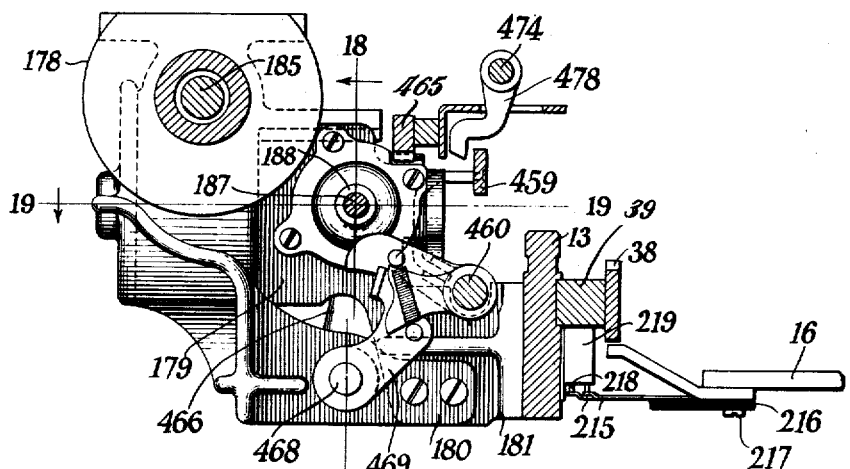
Fig. 17 is a view partly in section and partly in elevation, of a motor and transmission mechanism forming part of said driving mechanism together with parts of a carriage retracting mechanism operated by said motor, and controlling elements for the motor.
Figure 20:
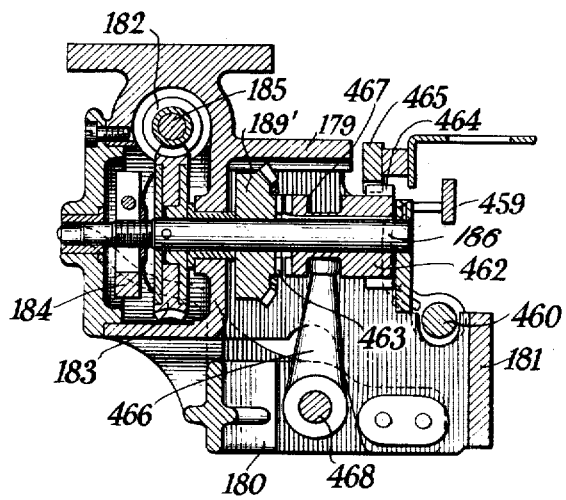
Fig. 20 is a sectional view taken on the line 20—20 of Fig. 18.
Figure 18:
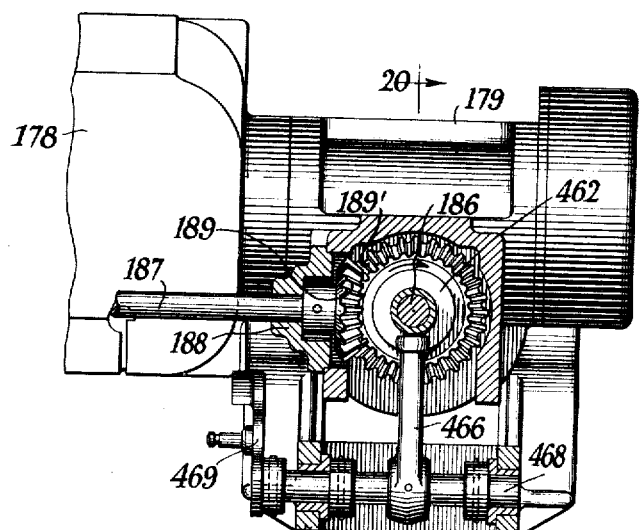
Fig. 18 is a sectional view taken on the line 18—18 of Fig. 17.
Figure 19:
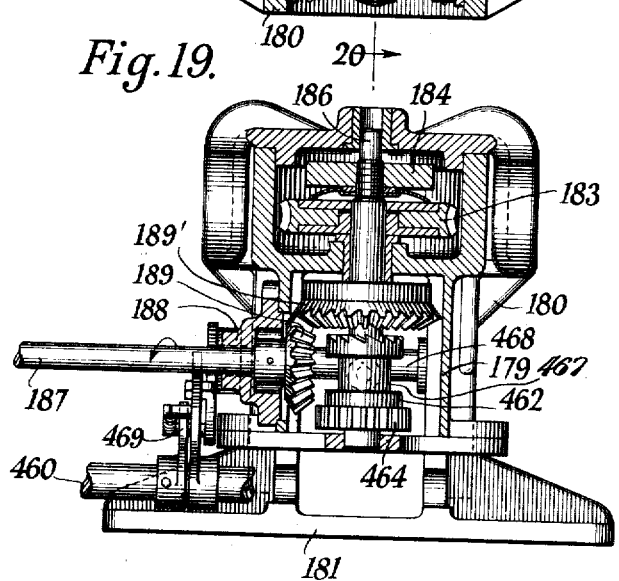
Fig. 19 is a sectional view taken on the line 19—19 of Fig. 17.
Figure 21:
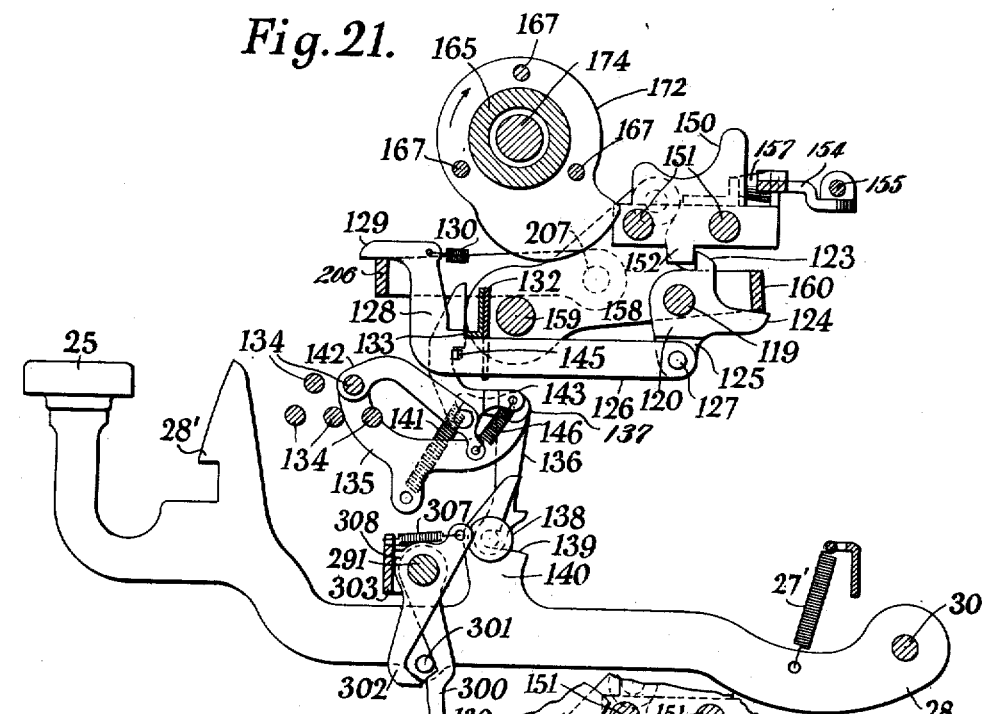
Figure 22:
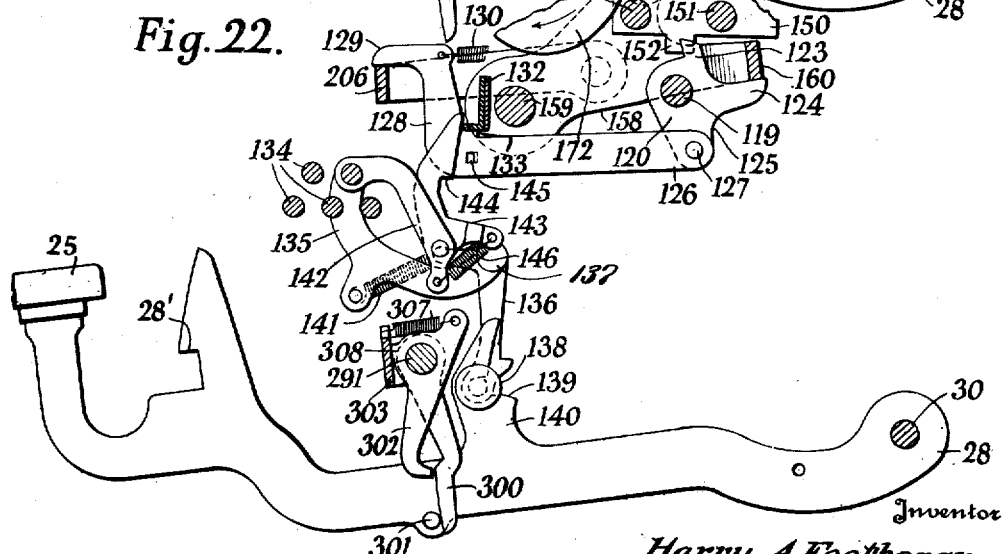
Figure 23:
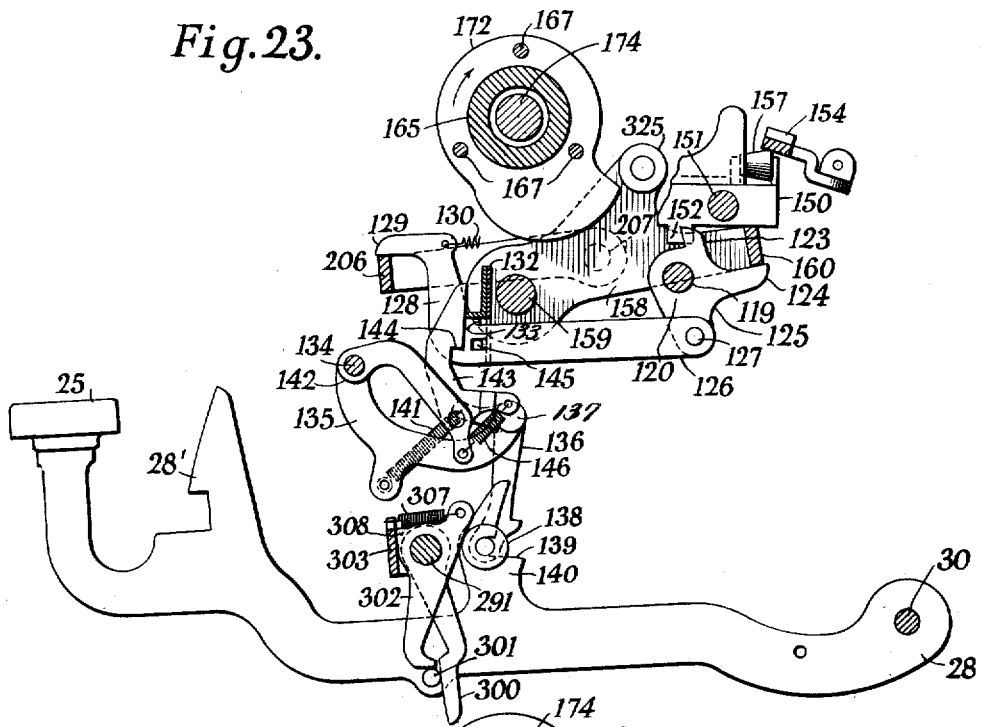
Figure 24:
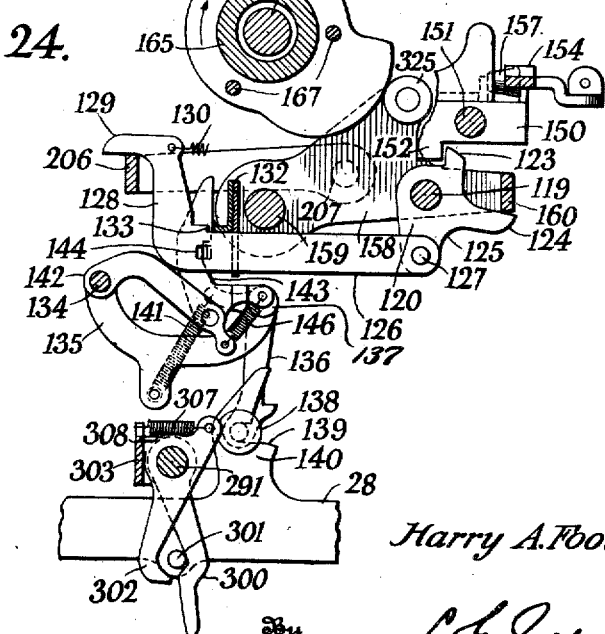
Figure 25:
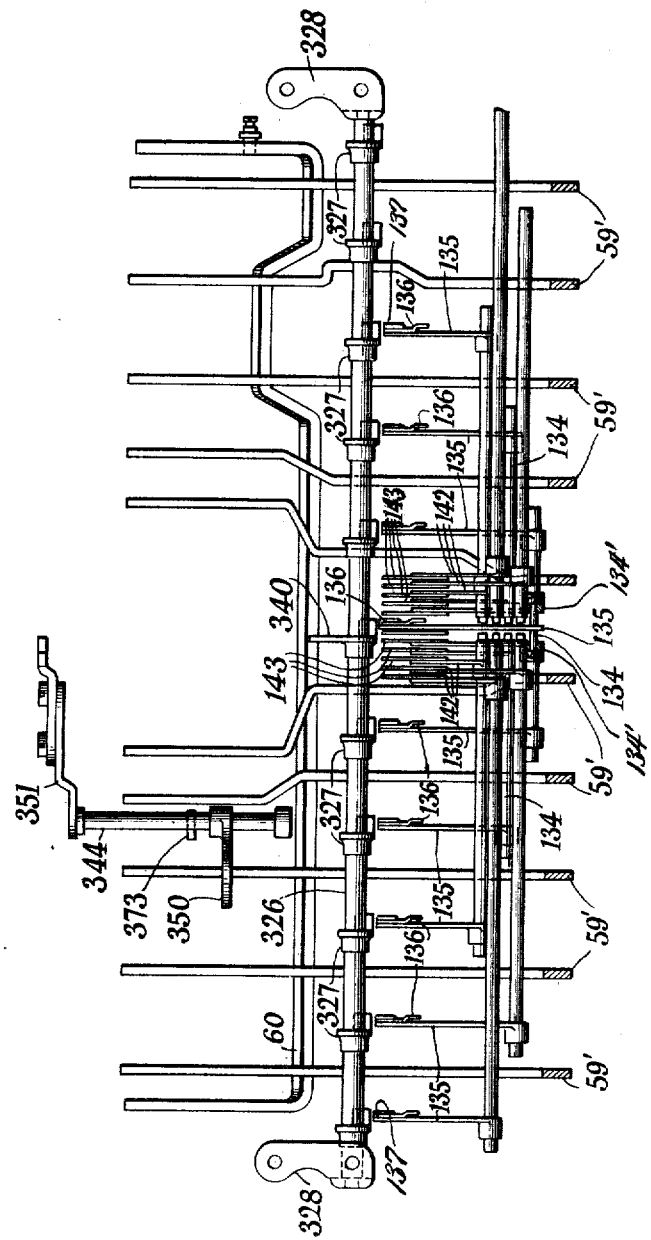
Figure 26:
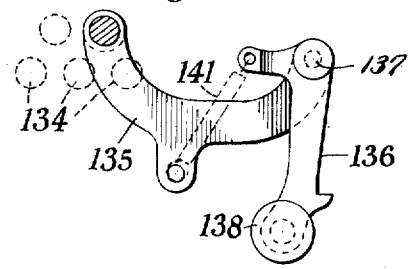
Figure 28:
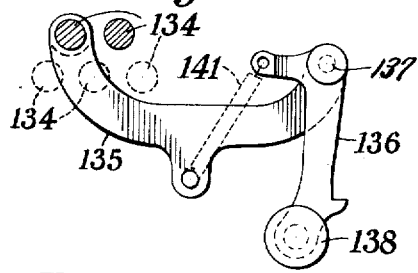
Figure 27:
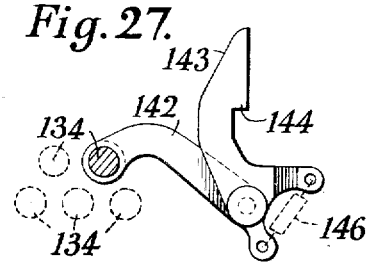
Figure 29:
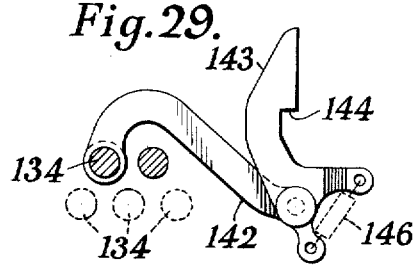
Figure 30:
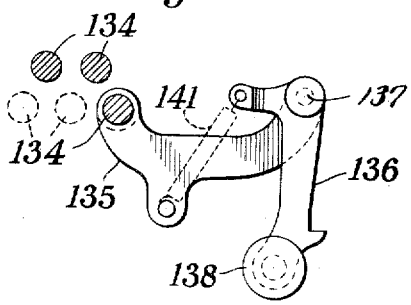
Figure 32:
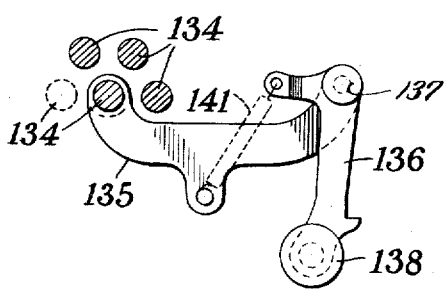
Figure 31:
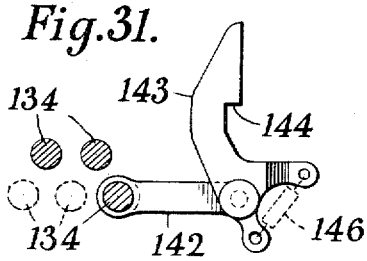
Figure 33:
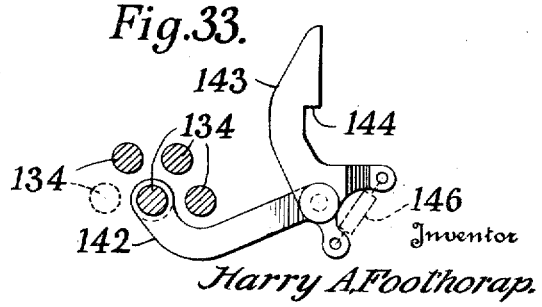
Figure 34:
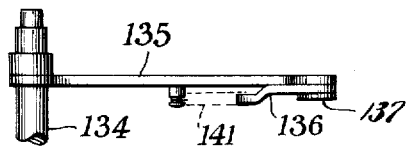
Figure 35:
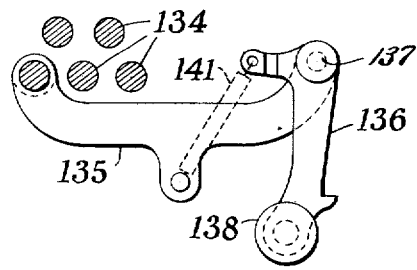
Figure 38:
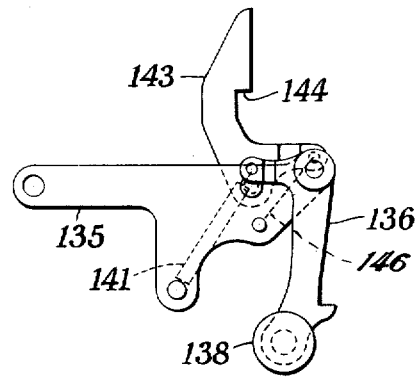
Figure 36:
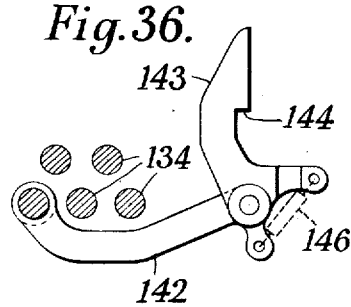
Figure 37:
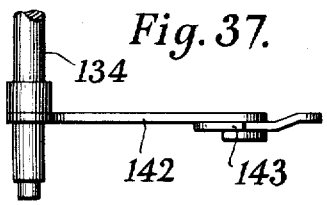
Figure 39:
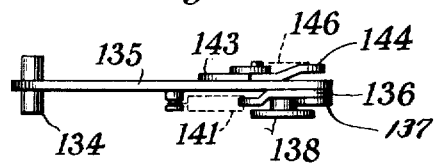
Figures 72, 73:
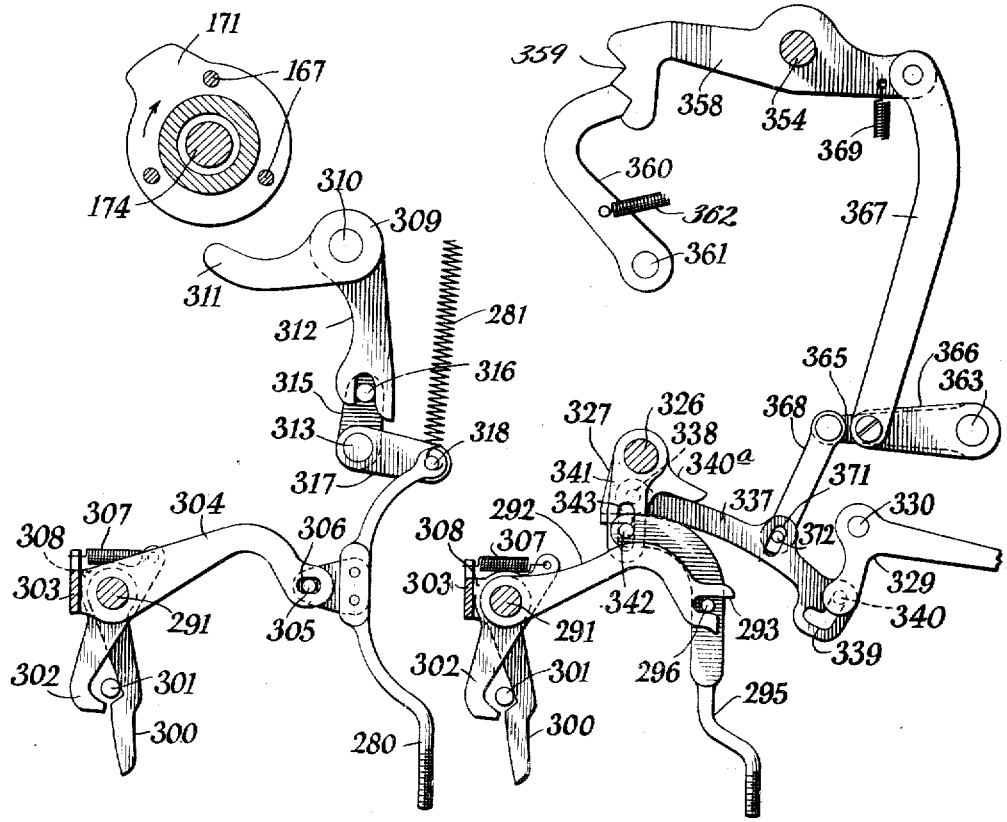

Fig. 21 is a detail side elevation, with parts in section, illustrating the normal position of one of a series of stops automatically set under control of the value keys of the machine, respectively, the means for controlling the setting of said stop, including stop setting mechanism, the value key related to said stop, stop resetting mechanism, a selector gear carriage controlled by the series of stops, a carriage latch, a motor control bail operated by the stop setting mechanism, and parts of the key and escapement locking mechanisms, respectively;

Fig. 22 is a similar view with parts in the position they assume immediately following depression of the value key;

Fig. 23 is a view similar to Fig. 22, illustrating the value key in locked position;

Fig. 24 is a view similar to Fig. 21, illustrating the stop resetting mechanism in an intermediate stage of its operation;

Fig. 25 is a detail top plan view of the decimal tabulating key levers and the tabulating bail of the machine, parts of the decimal trip and key connecting mechanisms, respectively, and a plurality of shafts forming part of the means for controlling the setting of the stops by the value keys and through which said keys are connected to the stop setting mechanism;

Fig. 26 is a view in side elevation, parts showing in section, of connections between the value "1" key and that one of the above-mentioned shafts related to said key;

Fig. 27 is a similar view of connections between said shaft and the stop setting mechanism;

Fig. 28 is a similar view of connections between the value "2" key and that one of said shafts related to said key;

Fig. 29 is a similar view of connections between the stop setting mechanism and the shaft related to the value "2" key;

Fig. 30 is a similar view of connections between the value "3" key and the shaft related to said key;

Fig. 31 is a similar view of connections between the stop setting mechanism and the shaft related to the value "3" key;

Fig. 32 is a similar view of connections between the value "4" key and the shaft related to said key;

Fig. 33 is a similar view of connections between the stop setting mechanism and the shaft related to the value "4" key;

Fig. 34 is a top plan view of connections between the value "5" key and the shaft related to said key;

Fig. 35 is a view partly in side elevation and partly in section, of the shaft and connections shown in Fig. 34;

Fig. 36 is a similar view of connections between the stop setting mechanism and the shaft related to the value "5" key;

Fig. 37 is a top plan view thereof;

Fig. 38 is a side elevation of connections between the value "6" key and its shaft and between said shaft and the stop setting mechanism;

Fig. 39 is a top plan view of the parts shown in Fig. 38;

Fig. 40 is a perspective view of motor controlling mechanism;

Fig. 41 is a top plan view of a circuit making and breaking device forming part of said motor controlling mechanism;

Fig. 42 is a side elevation partly in section, of said device;

Fig. 43 is an end view thereof;

Fig. 44 is a front elevation of a switch and switch box forming part of the motor control mechanism;

Fig. 45 is a section taken on the line 45—45 of Fig. 44;

Fig. 46 is a fragmentary view partly in front elevation and partly in section, of two crossfooter registers with which the machine is equipped, and state control mechanism therefor;

Fig. 47 is a top plan view of the parts shown in Fig. 46;

Fig. 48 is a detail view in longitudinal section, of one of the crossfooter registers, a master actuator and shaft included therein, and reverse gearing and other parts of the state controlling mechanism mounted on the crossfooter register;

Fig. 49 is a fragmentary top plan view of the reverse gearing with the parts in normal "add" position;

Fig. 50 is a front elevation of said gearing with the parts in normal "add" position;

Fig. 51 is a front elevation of said gearing with the parts in "subtract" position;

Fig. 52 is a perspective view of gear shifter elements mounted on the crossfooter and forming part of the state control mechanism;

Fig. 53 is a detail view of a slotted keeper bar forming part of said state control mechanism;

Fig. 54 is a detail view partly in side elevation, and partly in section, of one of the crossfooter registers, illustrating the transfer and transfer restoring mechanism;

Fig. 55 is a fragmentary perspective view of said crossfooter register further illustrating the transfer restoring mechanism;

Fig. 56 is a view in side elevation of a part of one of the crossfooter registers and crossfooter disconnecting means;

Fig. 57 is a fragmentary view of mechanism for automatically operating the transfer restoring mechanisms of the crossfooter registers;

Fig. 58 is a front elevation of the same;

Fig. 59 is a view partly in section and partly in side elevation, of a clutch forming part of the mechanism for automatically restoring the transfer mechanism of the crossfooter registers;

Fig. 60 is a side elevation of one of a pair of housing plates and coupling bars therein forming part of denomination selecting mechanism for the crossfooter registers;

Fig. 61 is a similar view showing the other housing plate and said coupling bars and parts associated therewith;

Fig. 62 is a view partly in horizontal section and partly in top plan, of said plates and bars;

Fig. 63 is a fragmentary perspective view of one of said coupling bars and parts carried thereby;

Fig. 64 is a perspective view of the opposed bell cranks forming part of the state control mechanism;

Fig. 65 is a view in side elevation, parts showing in section, of a register drive shaft and means for locking and unlocking said shaft;

Fig. 66 is a detail fragmentary view in top plan of a carriage for a selector gear with which the present machine is equipped, means for mounting and propelling said carriage, a carriage latch, and a combined stop resetting and latch operating bail, the carriage being shown in normal latched position;

Fig. 67 is a front elevation of the parts illustrated in Fig. 66;

Fig. 68 is a side elevation of the parts shown in Figs. 66 and 67;

Fig. 69 is a view similar to Fig. 66, with the selector gear carriage latch released and said carriage shown in an intermediate position;

Fig. 70 is a front elevation of the parts as shown in Fig. 69;

Fig. 71 is a side elevation of the parts as shown in Figs. 69 and 70;

Fig. 72 is a side elevation, partly in section, of details of the key and escapement locking mechanisms, respectively;

Fig. 73 is a similar view of details of the key and escapement locking mechanisms, respectively, together with automatic key connecting and disconnecting mechanism, and means for disabling the escapement and key connecting and disconnecting mechanisms, respectively.

Figure 78:
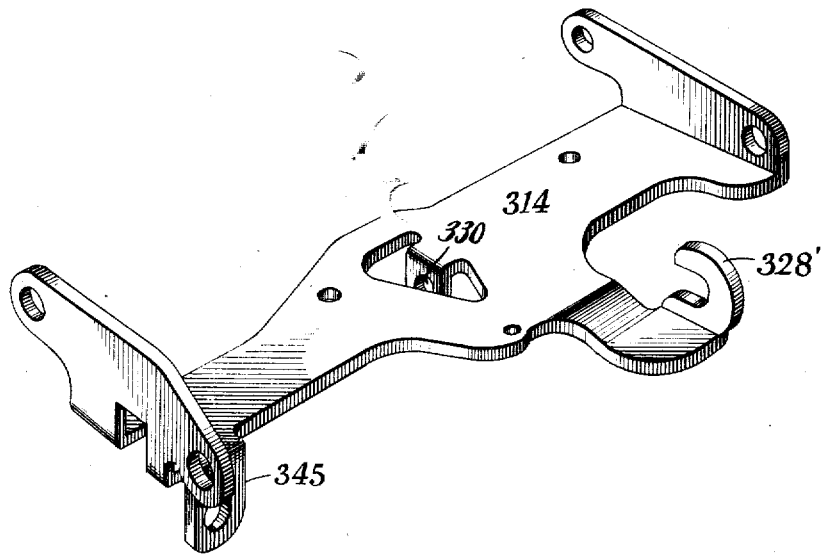
Figure 79:
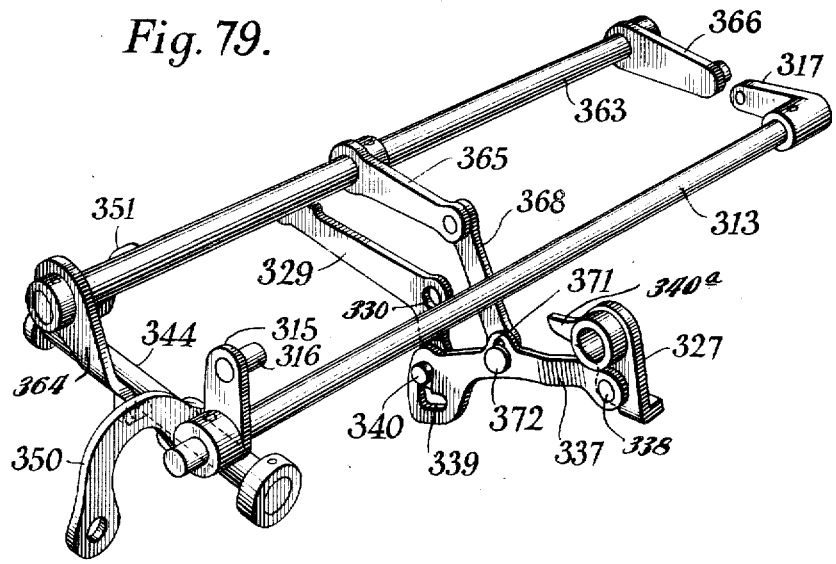
Figure 85:
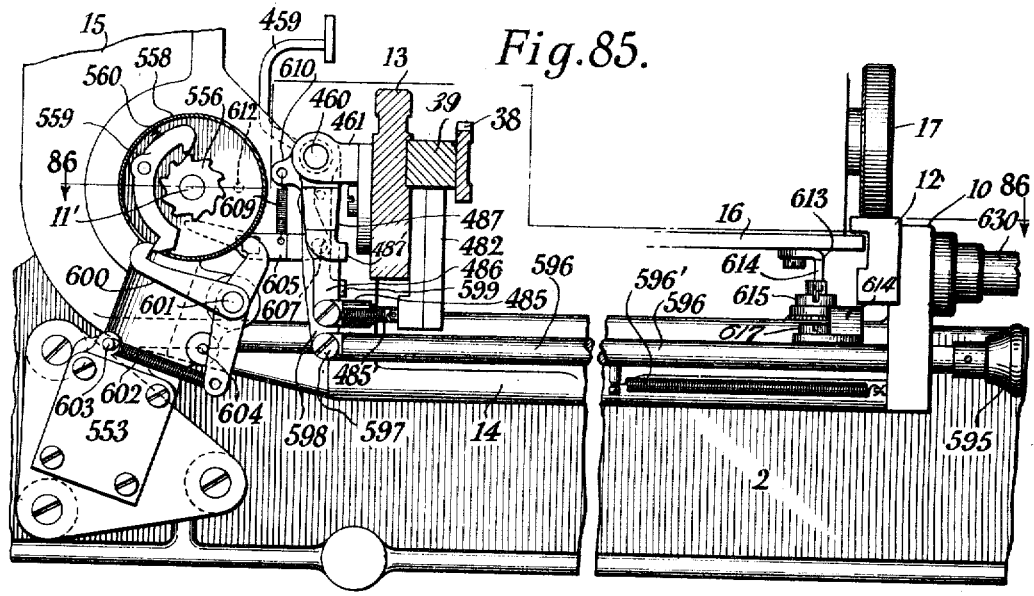
Figure 86:
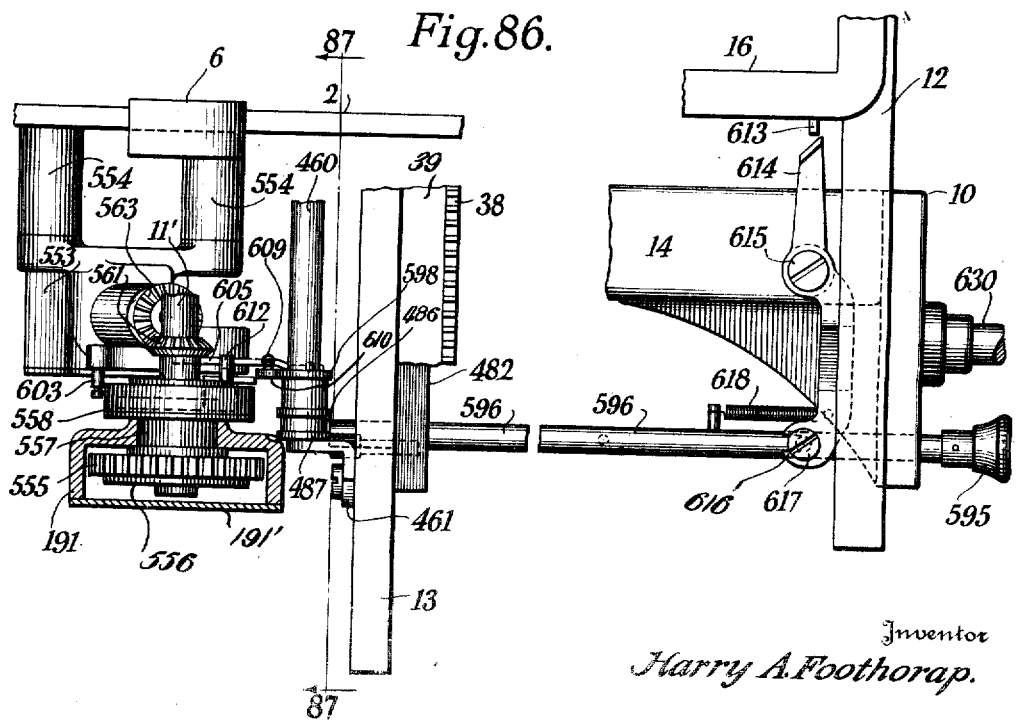
Figure 87:
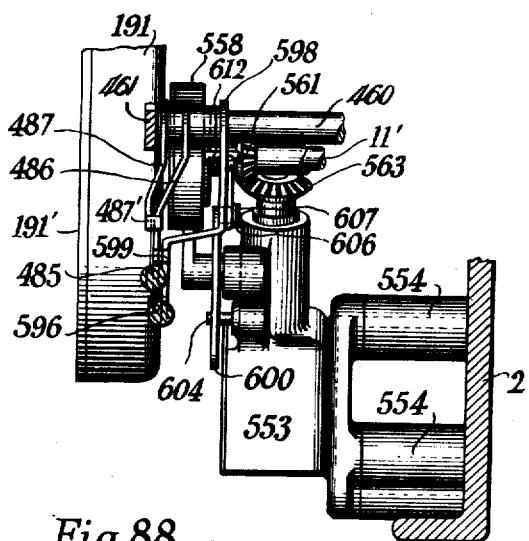
Figure 90:
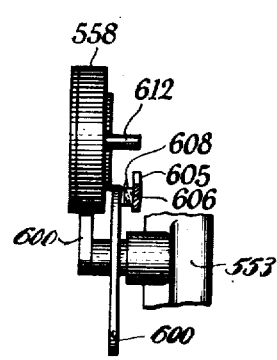
Figure 88:
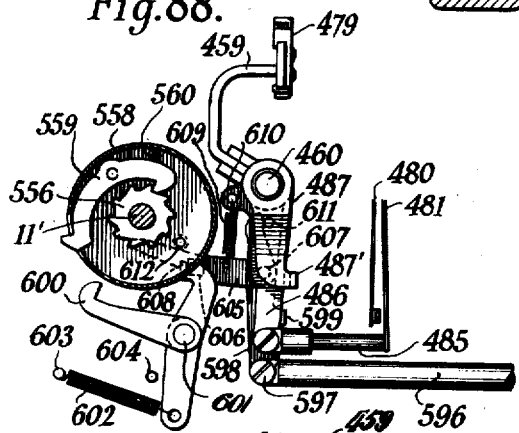
Figure 89:
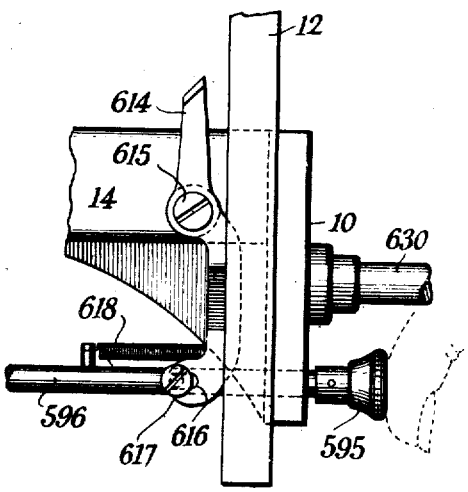
Figure 91:
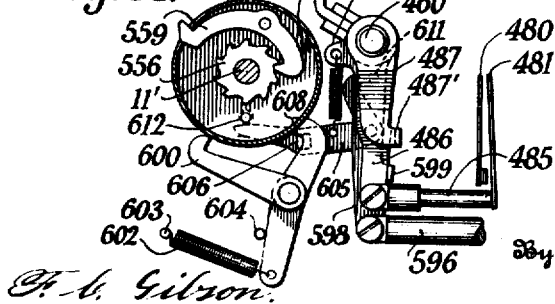

Fig. 74 is a top plan view of a bracket and parts mounted thereon relating to the escapement locking mechanism, the key connecting and disconnecting mechanism, the decimal spacing mechanism, and means for disabling said mechanisms;

Fig. 75 is a view in front elevation of the bracket and parts mounted thereon;

Fig. 76 is a sectional view taken on the line 76—76 of Fig. 74, including part of the carriage of the machine upon which the bracket is mounted;

Fig. 77 is a sectional view taken on the line 77—77 of Fig. 74;

Fig. 78 is a perspective view of the bracket shown in Figs. 74 to 77, respectively;

Fig. 79 is a perspective view of the parts mounted on said bracket;

Fig. 80 is a view partly in side elevation and partly in section, of a clutch and clutch trip forming part of the main drive mechanism of the machine, the clutch being shown in normal disengaged position;

Fig. 81 is a view similar to Fig. 80, showing the clutch engaged;

Fig. 82 is a side elevation, with parts in section, showing the normal relation of certain parts of the retracting mechanism for the selector gear carriage;

Fig. 83 is a similar view illustrating an intermediate stage of operation of the parts of said retracting mechanism;

Fig. 84 is a similar view illustrating a final stage of operation of the parts of said retracting mechanism;

Fig. 85 is a fragmentary side elevation with parts in section, of the machine base, a tilting frame thereon, a carriage travelling on the frame, a carriage retracting bail, a normally disengaged line space clutch, a line space key controlling the clutch, means on the carriage and frame for automatically controlling said clutch, a normally open motor-controlling switch, means for closing the switch by operation of the carriage retracting bail, and means for engaging the clutch and closing the switch by operation of the line space key;

Fig. 86 is a top plan view, partly in horizontal section, taken on the line 86—86 of Fig. 85;

Fig. 87 is a transverse section taken on the line 87—87 of Fig. 86;

Fig. 88 is a fragmentary side elevation, partly in section, of the line space clutch, the carriage retracting bail, the motor-controlling switch, the means for closing the switch by operation of said bail, and the line space key, and the means operated thereby for engaging the clutch and closing the switch, shown in their clutch engaging and switch closing positions;

Fig. 89 is a fragmentary top plan view of the line space key, a carriage operated line space lever, and connections between said key and lever illustrating the relation of the parts in the clutch engaging and switch closing position of the line space key;

Fig. 90 is a view in front elevation of the line space clutch and associated parts;

Fig. 91 is a view similar to Fig. 88, illustrating the operation of clutch parts to limit said clutch to a single revolution;

Fig. 92 is a view similar to Fig. 88, with the line space clutch, line space key, and the clutch engaging means operated by said key all in normal clutch disengaging position, and with the carriage retracting bail and means operated thereby for closing the motor controlling switch shown in switch closing position;

Fig. 93 is a view similar to Fig. 92, with the line space key and the means operated thereby for engaging the line space clutch shown in clutch engaging position;

Fig. 94 is a fragmentary top plan view illustrating carriage operation of the line space lever and key;

Fig. 95 is a top plan view of the base of the machine, work supporting and feeding means thereon, including a work table and a proof sheet carrier movable, respectively, for line spacing, line space mechanism for moving said table and carrier, carbon clamping means, work clamping means, work notching means, and parts of the frame latching mechanism mounted on said base.

Fig. 96 is a longitudinal section taken on the line 96—96 of Fig. 95, looking in the direction indicated by the arrows;

Fig. 97 is a similar view taken on the line 97—97 of Fig. 95 and looking in the opposite direction, as indicated by the arrows;

Fig. 98 is a transverse section taken on the line 98—98 of Fig. 95 looking in the direction indicated by the arrows, and drawn to an enlarged scale.

Figure 129:
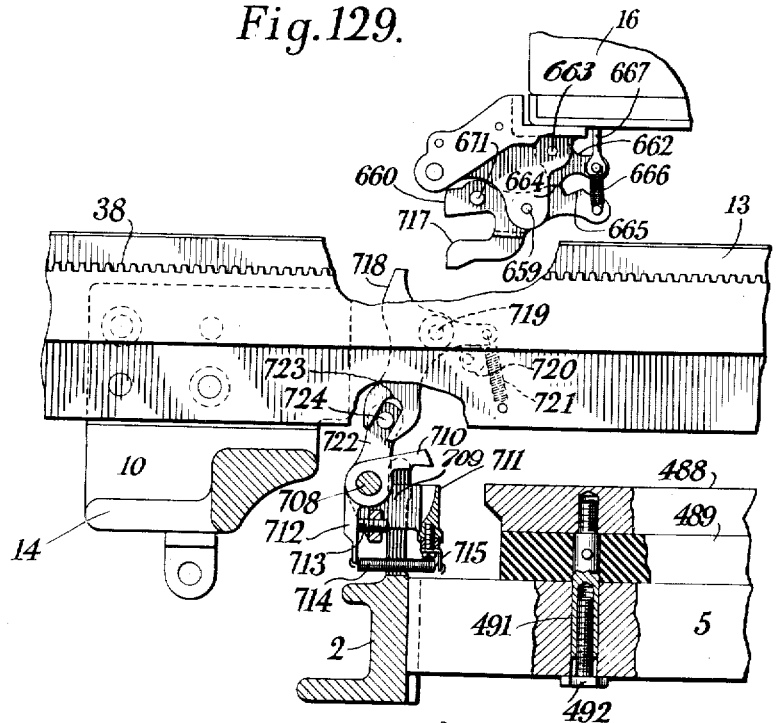
Figure 130:
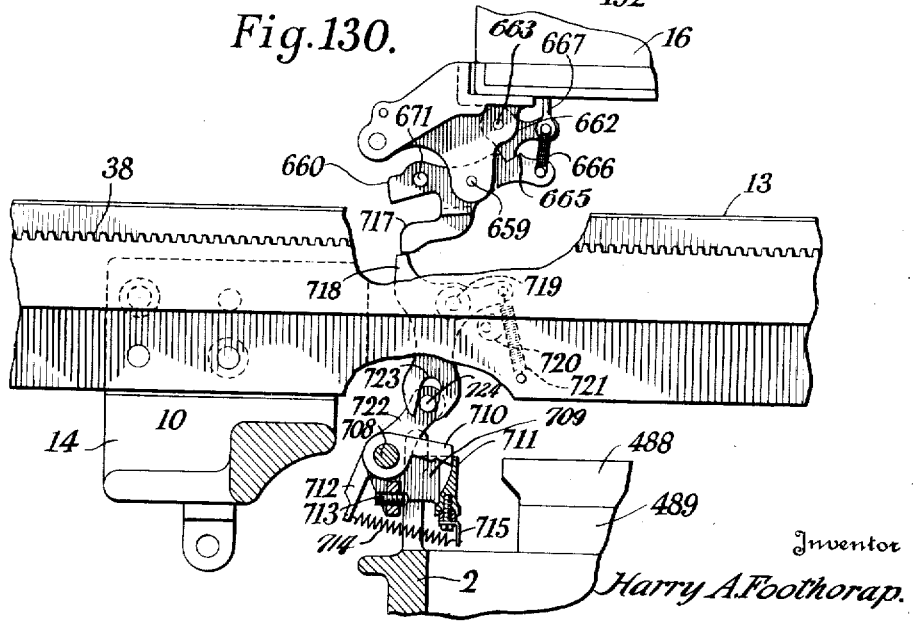

Fig. 99 is a fragmentary view of the work supporting and feeding means, including a platen, stationary and movable tables at the front and rear of the platen, respectively, work clamping means, and parts of the clamp releasing means, and work notching mechanism;

Fig. 100 is a side elevation, partly in section, illustrating details of the work clamping means;

Fig. 101 is a sectional view taken on the line 101—101 of Fig. 99, and drawn to an enlarged scale;

Fig. 102 is a transverse sectional view taken on the line 102—102 of Fig. 95;

Fig. 103 is a similar view taken on the line 103—103 of Fig. 100;

Fig. 104 is another similar view taken on the line 104—104 of Fig. 100;

Fig. 105 is a longitudinal sectional view taken on the line 105—105 of Fig. 95, drawn to an enlarged scale, and showing a part of the movable work supporting table and its mounting, parts of a line space mechanism for moving said table, including a line space worm shaft, a clutch ball for clutching said table to said shaft, a ball latch and latch releasing means, and means for automatically releasing said table from the line space worm shaft;

Fig. 106 is a view in horizontal section taken on the line 106—106 of Fig. 105;

Fig. 107 is a longitudinal sectional view taken on the line 107—107 of Fig. 106;

Fig. 108 is a view in transverse section taken on the line 108—108 of Fig. 106;

Fig. 109 is a perspective view of the clutch ball for clutching the movable table to the line space worm shaft;

Fig. 110 is a perspective view of a combined stop bracket and mounting for the latch, associated with the clutch ball;

Fig. 111 is a view in longitudinal section taken on the line 111—111 of Fig. 95, drawn to an enlarged scale, and illustrating a proof sheet carrier, a clutch member thereon for clutching said carrier to the line space worm shaft, and parts of the carbon clamp releasing mechanism;

Fig. 112 is a view in longitudinal section taken on the line 112—112 of Fig. 111;

Fig. 113 is a view in transverse section taken on the line 113—113 of Fig. 111;

Fig. 114 is a perspective view of the proof sheet carrier and parts associated therewith;

Fig. 115 is a perspective view of a clutch member for clutching the proof sheet carrier to the line space worm shaft;

Fig. 116 is a longitudinal section taken on the line 116—116 of Fig. 95, drawn to an enlarged scale, and illustrating the work clamping means and details of the clamp releasing means;

Fig. 117 is a perspective view of a movable clamping member forming part of the work clamping means;

Figs. 118 and 119 are perspective views, respectively, of a fixed clamping member with which the movable clamping member cooperates;

Fig. 120 is a perspective view of a bracket associated with the fixed clamping member;

Fig. 121 is a perspective view of part of the tilting frame of the machine, means for automatically releasing the same, and parts of the carriage retracting mechanism, and work notching mechanism;

Fig. 122 is a fragmentary view in side elevation illustrating the cooperative relation of parts of the means for automatically releasing the frame;

Fig. 123 is a transverse section taken on the line 123—123 of Fig. 121;

Fig. 124 is a perspective view of parts of the means for automatically releasing the frame, and the means for releasing the movable table from the line space mechanism;

Fig. 125 is a transverse section taken on the line 125—125 of Fig. 124;

Fig. 126 is a similar view taken on the line 126—126 of Fig. 124;

Fig. 127 is a longitudinal section taken on the line 127—127 of Fig. 126;

Fig. 128 is a fragmentary view, partly in section and partly in side elevation, of a frame latching means;

Fig. 129 is a detail view, partly in front elevation and partly in transverse section, illustrating the work notching mechanism in normal position; and, Fig. 130 is a similar view illustrating said notching mechanism in work notching position.

For convenience in description, the various units of the machine of my invention will be described under appropriate headings as follows:

MAIN SUPPORTING STRUCTURE

Referring particularly to Figs. 1, 2, 3, 16, 85, 86, and 96 to 98, the numeral 1 designates the base proper of the machine, including laterally spaced side bars 2 connected together by front, rear, and intermediate cross-bars 3, 4 and 5, respectively, and provided adjacent their rear ends with upstanding lobes 6. The side bars 2 are equipped with the usual resilient feet 7, secured in sockets 8, for cushioning the machine on a desk or table represented at 9.

Surmounting the base 1 is an elevatory track frame 10 suspended between the lobes 6, as by horizontal trunnions 11, one of which is shown in Fig. 16, for vertical swinging movement from a normally horizontal position slightly above the base 1. Included in the frame 10 are front and rear members in the form of track rails 12 and 13, respectively, extending transversely of the base 1, and side members 14 extending longitudinally of said base and terminating at their rear ends in upstanding brackets 15. The function of the tilting frame and its various parts will presently appear.

RECORDING OR PRINTING MECHANISM

The printing mechanism is of the usual Elliott-Fisher class disclosed, substantially, in my U. S. Patent No. 1,251,361, dated December 25, 1917.

Suffice it to explain that a carriage 16, is mounted by sets of front and rear rollers 17 and 18, on the rails 12 and 13 of the tilting frame 10 for advance and retraction in letter and contra-letter feeding directions, respectively. A power barrel 20 mounted on the frame 10 and connected to the carriage 16 by a tape 21, advances said carriage. Mounted on the carriage 16 (see Figs. 1 to 14 particularly), are down strike type bars 22 operated through connections 23, by letter keys 24, value keys 25, and clear signal keys 26, fixed on key levers 27, 28 and 29, respectively, fulcrumed in the carriage 16 on a rod 30 and tensioned by springs 27'. As is well known, the function of the clear signal key 26 in the Elliott-Fisher machine is to print a signal, such as a star, in connection with clearing operations in a crossfooter register, as for instance, in my U. S. Patent No. 1,505,384, dated August 19, 1924. The machine of my present invention embodies two crossfooter registers, presently described, and hence two such clear signal keys 26.

At this point, it may be stated that the machine illustrated is designed for use, preferably, in computing according to the decimal system. It is, therefore, disclosed with a bank of value keys 25 ranging from "1" to "9" followed by "0" and, as is usual in these machines, with one clear signal printing key 26 included in said bank and following the "0" key thereof. It is contemplated, however, that the machine be adaptable for computing English currency. Insofar as the printing mechanism is concerned, such adaptation may be effected by substituting, in the place of the "0" and clear signal keys of the value key bank, keys bearing the values "10" and "11", respectively, and substituting appropriate type bars for those with which the "0" and clear signal keys were related. In this event, as will be understood, the "0" key of the letter key group is used in the printing of a zero.

The machine is equipped with the usual well-known ribbon mechanism, including ribbon spools 31, shafts 32, (Figs. 2 and 3) brackets 33, and a color controlling ribbon shift key 34.

Escapement mechanism

Suspended from the carriage 16, by a bracket 35, (Fig. 11) is escapement mechanism, for the details of which reference may be had to my U. S. Patent No. 1,203,519 of October 31, 1916. Generally speaking, (see Figs. 1 to 6, 9, 11, 12, 14) this mechanism includes an escapement wheel 36, a carriage feed pinion 37 engaging a carriage feed rack 38 mounted on the front face of the track rail 13, as at 39, holding and spacing dogs 40 and 41 (Fig. 11) operatively connected by a link 42 and a spring 43, to effect a step by step rotation of said wheel 36 and pinion 37, and a spacing dog actuator 44. The escapement is operated by the key levers 27, 28 and 29, (Figs. 5, 6 and 11), through a universal bar 45, suspended by bail arms 46 from crank arms 47, fast on a rock shaft 48 suitably journaled in the sides of the carriage 16. A rocker arm 49, fast on the shaft 48, and an escapement draw rod 50, operatively connect the shaft 48 with the spacing dog 41. The usual space bar 51, (Figs. 4, 11 and 12) fixed upon arms 52 pivoted at 53 on the carriage, is operatively connected by the draw rod 54 and crank arm 54' to the dog actuator 44.

Carriage release back space and line finder mechanisms

Associated with the letter-spacing escapement are carriage release and back spacing mechanisms, (not shown) operated by the usual carriage release and back space keys 55 and 56, (Fig. 4), respectively, as shown in my U. S. Patent No. 1,203,519, supra, and No. 1,203,520 of October 31, 1916. Also mounted on the carriage 16 is a line finder key 57, (Figs. 1 and 3), operating line finder mechanism shown in my U. S. Patent No. 1,383,096 of June 28, 1921.

Tabulating mechanism

The tabulating mechanism is substantially such as is disclosed in my U. S. Patent No. 1,280,697, dated October 8, 1928. As will be understood, upon reference to said patent, a carriage tabulator key 58, (Figs. 1 and 4), and key lever 58', together with decimal tabulator keys 59, (Figs. 1 to 6 and 10), and key levers 59' are operatively connected to a series of stop blades (not shown) on the carriage 16, and also to the escapement through an escapement releasing bail 60, suitably pivoted concentrically with the key levers 59', to effect a cooperative engagement of said stop blades with fixed tabulator stops 61 (Fig. 3). The latter are adjustable along the usual stop bar 62 secured, in any suitable manner, in this instance, to the brackets 15 of the tilting frame 10.

COMPUTING MECHANISM

Column registers

In the rear of the carriage 16 are the column registers 63, (Figs. 1 to 4), one for each column of work, as will be understood, mounted on a register bar 64 secured by screws 64' to the brackets 15 of the frame 10. Clamping jaws 65, one of which is movable by a hand screw 66, secure the registers to said bar, and locating devices 67 cooperating with notches 68 in said bar, serve to accurately position said registers. The registers 63 are of the two-way, reversible type embodying the usual denominational value indicating wheels 69 visible through sight openings 69', toothed denominational number wheels driving the wheels 69, and two-way transfer and transfer restoring mechanisms, respectively, of a type presently described in connection with the crossfooter or grand totalizing registers. The usual transfer restoring slide 71, (Fig. 2), projects from each column register 63 for operation, upon retraction of the carrage 16, by a restoring cam 72, (Fig. 14), pivoted to the carriage at 73 and tensioned by a spring 74 for operation in a manner well-known in the art.

Crossfooters or grand totalizers

Suitably secured to the right and left hand sides of the carriage 16 to travel therewith are crossfooters or grand totalizers 75, 76, (Figs. 1–4 and 46–54), respectively, which are identical in construction. Hence, a description of one will suffice for both. The crossfooter main frame 77 includes right and left side plates 78 and a rear plate 79, enclosing a crossfooter register sub-frame, the sides 80 of which sub-frame embrace the register per se. The denominational value indicating wheels 82 are journaled on a shaft 81 mounted in the sides 80 of the sub-frame, and are adapted to be driven in opposite directions for addition and subtraction, respectively, by toothed denominational number wheels, one of which is shown at 83 (Fig. 54), journaled on a shaft 84 also mounted in the sub-frame. The number wheels 83 drive their corresponding value-indicating wheels 82 through the intermediate gears 82', 83' and 84'. Associated with the number wheels 83 is a two-way transfer mechanism of the type disclosed in my U. S. Patent No. 1,576,961 dated March 16, 1926, which includes a series of transfer heads, one of which is shown at 85, mounted to rock upon a fixed shaft 86 to either side of a central normal position. Rocking movement of a transfer head 85 is effected initially by a transfer tooth, not shown, on an associated number wheel 83 engaging a trip member 87 on the head, to move the latter in one direction or the other, at the proper time. Movement of a head 85 is continued in the direction in which it was tripped by actuating mechanism including an actuator lever 88, a spring 89 urging the lever toward the axis of the head, and a link connection 90 between the head and actuator lever. The arrangement of each head and its actuating mechanism is such that, in the normal position of the parts, they assume a dead center position providing a toggle lock resisting the urge of the spring 89, in which position they are yieldingly held by a pivoted detent 91 urged by a spring 92 against a roller 93 on one end of the link 90. Combined carrying fingers and locking dogs 94, tensioned by springs 94', are mounted on each head to execute a carrying step of movement upon the next higher number wheel 83, and for yielding movement on their heads to facilitate return of the parts to normal position.

Denomination selecting means for column registers

Mounted at the rear of the carriage 16, (Figs. 2 to 5, and 12 to 14), between brackets 95 upstanding from a carriage top plate 96, (Fig. 12), is the usual toothed actuator or master wheel 97 fast upon a master wheel shaft 98 journaled at its opposite ends in said brackets. The master wheel 97 is advanced laterally step by step with the carriage 16 in the usual manner, well understood in the art, to select the number wheels 70 for operation in denominational correspondence with the orders in which digits are printed in the columns.

Denomination selecting mechanism for crossfooters

Denomination selection in the crossfooters 75 and 76 is effected in correspondence with the order of printing by the following means. Each crossfooter 75 and 76 (Figs. 4 and 48), includes the usual toothed master wheel 99 and squared master wheel shaft 100 for rotating said master wheel, and along which the master wheel advances laterally across the number wheels 83. The master wheel shaft 100 extends between the side walls 78 of the cross-footer frame. Associated with each master wheel 99 is mechanism for advancing said wheel step by step from its normal ineffective position one step to the left of the number wheels 83 into meshing engagement with each successive number wheel.

The master wheel advancing mechanisms, (Figs. 4 and 48), each include a master wheel carriage 101 movable on guides 101' and connected by a link 102 to a forwardly extending crank arm 103 fast near the upper end of a vertical master wheel advancing shaft 104 journaled in forwardly bent ears 105, (Fig. 48) on the crossfooter rear plate 79. A rearwardly extending crank arm 106, (Figs. 4, 46 and 47), fast on said shaft 104 near its lower end, projects through a slot 107 in one of a pair of laterally spaced housing plates 108, (Figs. 2, 46 and 47), suitably secured to lateral ears formed on rearwardly extending lugs 108' of the side walls 78 of the crossfooters 75 and 76, transversely of the carriage 16, to travel beneath the column registers 63 with said carriage. A pair of longitudinally slidable coupling bars 109, (Figs. 47, 61 and 62), one of which is associated with each arm 106, are mounted, side by side, between upper and lower series of rollers 110 between said plates 108. Springs 111, anchored to one of the filler blocks 111' between the ends of the housing plates 108, yieldingly connect said plates 108 and bars 109 to urge the coupling bars 109 to the right, as viewed in Figs. 61 and 62. A coupling dog 112 urged upwardly by a spring 113, is pivoted on each bar 109 to engage and interlock with a lug 114, (Fig. 46), on the bottoms of each of the column registers 63 when the carriage 16 has advanced the printing point of the machine to within one letter space of a column position on the work to arrest movement of its bar 109 as the carriage continues its advance, and against the action of its spring 111. Normally, the coupling dogs lie one behind the other (Fig. 62) adjacent the printing point of the machine. The corresponding crank arms 106 and coupling bars 109 are connected by links 115, so that when either bar 109 is held stationary, continued advance of the carriage 16 will advance the appropriate master wheel 99 for proper denominational selection in the related crossfooter. Projecting studs 116, (Figs. 60 to 63), on the respective dogs 112, enter elongated cam slots 117 in the respective plates 108, the studs cooperating with the cams formed at the ends of the slots to uncouple the dogs and release the bars 109 when the printing point of the machine advances one step beyond the lowest denominational order of the column position, whereupon the springs 111 retract the master wheels 99 across their respective cross-footer registers, to their normal positions, one step to the left of the wheel of highest denomination, as will be clear.

Manual disconnecting means for crossfooters

Each crossfooter 75 and 76 is equipped with crossfooter disconnecting mechanism, (Figs. 1 and 56), including a key 118 movable to connecting and disconnecting positions, respectively. Said keys 118 are each provided with a bifurcated sector 109' adapted to releasably embrace an arm 110' fast on the master wheel advancing shaft 104 of the crossfooter. The arrangement of the sector 109' and related arm 104 is such that in the connecting position of the key 118, (Fig. 56), the arm 110', by contact with one wall of the bifurcation in the sector, arrests the master wheel 99 and its related advancing mechanism in normal position against the tension of the spring 111 of its coupling bar 109, and in the disconnecting position of said key, said advancing mechanism, and hence the related bar 109, are permitted a slight degree of excess return movement under the tension of its spring 111 to position its master wheel two steps to the left of the cross-footer wheel of highest denomination. The cam slots 117 in the plates 108 are so shaped that the stud 116 of the dog 112 of a coupling bar 109 which has been permitted such excess return travel, will proceed to one extreme of its slot 117 and be cammed from coupling relation with respect to the lugs 114 on the column registers 63, thus disconnecting the cross-footer and column registers. The keys 118 are each yieldingly held in their connecting and disconnecting positions by a suitable dog 111² urged by a spring 112' into engagement with notches 113' in the sector 109'.

Means is provided to lock each of the crossfooter register connect and disconnect keys 118 in their "connect" positions, to prevent attempted disconnection of the cross-footer register after the master wheel has started its traverse thereof. A hooked gravity latch 114' is pivoted to the adjacent side wall of each of the cross-footer frames at 115'. The hooked arm of each latch is adapted to coact with a stud 116' projecting from the corresponding disconnect segment 109', a tail on each latch extending into the path of the locking arm 110' fast on the master-actuator shifting shaft 104.

With the key 118 in its "connect" position, and the parts in their normal home positions, the tail of the latch rests against the locking arm 110' to hold the hooked arm of the latch away from the stud 116'.

When the coupling dog 112 picks up its column register and is arrested thereby, continued travel of the carriage causes the master wheel shifting shaft 104 to turn step by step with the carriage. During the first of these steps the locking arm 110' fast on the shaft 104 recedes from the tail of the latch 114', to free the latch, the hooked arm of which immediately drops over the stud 116' and locks the connect-disconnect key 109' in its "connect" position.

Disengagement of the coupling dog 112 from a column register 63, enables the spring 111, acting upon its coupling bar 109, to return its crossfooter master wheel shifting shaft 104 with its locking arm 110' to their normal positions, the locking arm, on such return, contacting the tail of the latch 114' to rock the hooked arm of the latch away from the stud 116' and release the connect-disconnect key for operation, if desired.

VALUE SELECTING MECHANISM

*Value selecting stops*

A short shaft 119 extending transversely of the carriage 16 supports a series of independently rocking stops 120 (Figs. 5, 6, 11, 12, 21 to 24) arranged in line centrally of the carriage, in equidistantly spaced relation to swing in vertical planes from their normally ineffective to their effective positions, and vice versa. The stops 120 are immovable longitudinally of the shaft 119, but said shaft and stops are bodily shiftable endwise in opposite directions, respectively, for a purpose later described, the shaft 119, for this purpose being mounted in and extending between the parallel walls 121 of a sub-frame located intermediate the brackets 95, and supported upon tie rods 122 connecting the side walls 121. Collars 119ᵃ and 119ᵇ, (Figs. 11 and 12), limit such axial movement of the shaft 119 through engagement with the sub-frame walls 121. There are eleven stops 120, each including an upstanding stop arm 123, a rearwardly extending resetting beak 124 and a depending operating or setting lug 125.

*Stop setting mechanism*

The stops 120 are set by motor-operated setting mechanism (see Figs. 1, 4, 5, 11, 12, 21 to 24), as follows: A series of closely-placed normally horizontal stop setting slide levers 126, one for each stop, extend forwardly of the latter. Each stop setting slide lever has its rear end pivoted, as at 127, to the operating lug 125 of its related stop 120, and is provided at its forward end with an upstanding abutment portion 128 terminating in a forwardly extending finger 129 overlying a rocking, motor-control bail 206, the function of which will presently appear. Individual stop setting motor springs 130 for the slide levers 126 have their opposite ends suitably connected to their associated slide levers and to a fixed bar 131, respectively, to urge the setting slide levers endwise rearwardly. Rearward movement of the setting slide levers 126, as will be seen from inspection of Fig. 23, rocks the stops 120 in a direction to move their stop arms 123 forwardly and to elevate their resetting beaks 124. A stationary stop bar 132 extends between and is suitably fastened at its opposite ends to the brackets 121 to overlie the stop setting slide levers 126 in the rear of the abutment portions 128 for cooperation with the latter, to limit rearward movement of said slide levers and thus establish the effective positions of the stops 120. The forward ends of the slide levers 126 are urged upwardly, by means to be described, against the lower edge of the stop bar 132, and are provided in the rear of the abutment portions 128, with latching shoulders 133 normally engaging the front edge of the stop bar 132 to latch the slide levers 126 against rearward movement, and thus establish the normal ineffective position of the stops 120.

MEANS FOR CONTROLLING THE STOP SETTING MECHANISM BY THE VALUE KEYS

Means are provided for controlling the setting of the stops 120 progressively, from left to right, by the number keys 25 of successively higher value, beginning with the value "1" key, whereby each stop, when set, has a position in the series representative of the value of the related number key. Said controlling means preferably takes the form of key-operated mechanism for tripping the stop setting slide levers 126 from their latched positions, as follows:

Intermediate the stop setting slide levers 126 and the key levers 28, 29, and slightly in advance of the former, are individual rock shafts 134 for the several stop setting slide levers 126 (see Figs. 5 and 23 to 39 inclusive). The shafts 134 are suitably journaled in hangers 134', (Figs. 5 and 9), secured to the inclined front edge of the top plate 96 of the carriage transversely thereof in two groups, of five parallel shafts each, located on opposite sides of the center of the carriage, in end to end, spaced apart relation, with a single short shaft (Fig. 25) located in the space between the groups. This arrangement of the shafts 134 is for the purpose of connecting the widely spaced key levers 28, 29 and the closely spaced setting slide levers 126. The shafts 134 in the left hand group are adapted to operatively connect the "1", "2", "3", "4" and "5" value key levers 28 and the setting slide levers 126 of the first, second, third, fourth and fifth stops 120, respectively. Those in the right hand group are designed to connect in like manner, the "7", "8", "9", "10" and "11" value key levers 28, provided the machine is equipped in the manner and for the purpose previously described, with number keys for values "10" and "11", and the setting slide levers 126 of the seventh, eighth, ninth, tenth and eleventh stops 120. The single short shaft 134 is designed to connect the key lever 28 of the value "6" key with the setting lever 126 of the sixth stop 120. The last-named key lever and setting slide lever are in the center of the machine, and the before-described space between the groups of the other shafts has been provided in order that a direct connection may be made between the key lever 28 of the "6" key and its corresponding stop-controlling slide lever 126.

Connections between the numeral key levers 28 and the shafts 134 are provided (see Figs. 7, 11, 14, and 21 to 39) in the form, preferably, of a rearwardly projecting crank arm 135 fast on each shaft 134 in substantially the same vertical plane with its related key lever 28. Each crank arm 135 has a pendant link 136 pivoted thereto, as at 137, to swing lengthwise of the related key lever. Each link 136 is provided with a stud 138 adapted, when the link is swung forwardly, to enter a rearwardly opening recess 139 in a vertical horn 140 on the related key lever 28, and thus connect the shaft 134 to its key lever to be rocked thereby. Springs 141 connecting the crank arms 135 and their respective floating links 136, normally hold the free ends of the links rearwardly to disengage the studs 138 from the recesses 139, and maintain the number keys 25 disconnected from the stop control mechanism to enable the numeral keys 25 to be used for writing only. Operating cranks 327, (Fig. 9), arrest the floating links 136 at their rearward limits, and control the connections between the number keys 25 and the stop control mechanism, as hereinafter explained.

Fast upon each shaft 134, except that of the short shaft related to the "6" key, and in substantially the same vertical plane with its related setting slide lever 126, is a rearwardly extending tripping arm 142 having pivoted thereon for movement lengthwise of its slide lever 126, a tripping dog 143 extending upwardly in front of the stop bar 132 and undercut on its rear edge to provide a hook portion 144 adapted to engage a tripping lug 145 on its related stop setting slide lever 126. A spring 146 suitably connects each tripping dog 143 and arm 142 to urge the dog rearwardly against the stop bar 132 and permit yielding movement of said dog in counter-clockwise direction for a purpose to be explained. In the case of the short shaft 134, related to the "6" key, no tripping arm 142 is required since the related setting slide lever 126 is directly above said shaft. Hence, as shown in Figs. 38 and 39, an angular tripping dog 143, similar to the others, is pivotally mounted at its elbow directly on the crank 135 of said shaft and urged in the proper direction by a spring 146 suitably connected to the tail of the angular dog and to the crank. In their forward positions, and in the normal positions of the setting slide levers 126, the tripping dogs 143 hook rearwardly over the lugs 145 so that downward movement of said arms and dogs will pull the setting slide levers 126 downwardly and thus trip them from their normal latched positions for sliding movement rearwardly by the motor springs 130 to set the stops 120. Since the machine, as shown, is not equipped with keys for the values "10" and "11", the connections between related shafts 134 and the setting slide levers 126 of the 10th and 11th stops have not been shown.

*Stop controlled value selecting gearing*

Above the stops 120 is a selector gear 147, (Figs. 5 and 12) mounted upon a squared intermediate section 148 (Fig. 12), of a register drive shaft 149 for lateral advance and retraction thereon transversely of the stops 120, and for rotation by said shaft. The register shaft extends clear across the carriage and is journaled in the brackets 95, and the side plates 78 of the crossfooters 75 and 76 (Fig. 4), with its opposite ends projecting into the crossfooters for driving connection with respect to the master wheels 99 thereof, in a manner to be explained.

A selector gear shuttle carriage 150 (Figs. 4, 5, 12, 13, 21, 24, and 66 to 71) is mounted upon transverse guides 151, and connected to the grooved hub of the gear 147 (Fig. 12), to advance and retract the selector gear over the stops 120. The shuttle carriage 150 slides on one guide 151, (Figs. 66, 69), having its ends fixed to the sub-frame side walls 121, and is fixed to another guide 151 sliding in said side walls to provide an adequate bearing for said carriage. A stop lug 152 (Figs. 5, 21-24, 67 and 70) depends from the gear shuttle carriage 150 to be intercepted, in the effective, or set, positions of the stops 120, by the stop arms 123, whereby axial advance of the selector gear 147 is limited in different degree to set the gear to different positions along the register drive shaft 149 according to the values of the keys depressed.

A motor spring 153 connected at its opposite ends to the selector gear shuttle carriage 150 and to a fixed part of the machine, advances said gear shuttle carriage and gear.

The selector gear shuttle carriage 150, and hence the gear 147, are adapted to be held, against the tension of the motor spring 153, in a normal position slightly to the left of the left hand stop 120, by a shuttle carriage latch 154 pivoted on bearings 155 in the sub-frame side walls 121, to swing vertically, against the tension of a suitably connected spring 156, from a latching position in front of a tapered roller 157, (Figs. 66, 67 and 68), on said shuttle carriage 150 into an unlatching position (Figs. 69, 70 and 71) above the roller.

A combined latch-releasing and stop-resetting bail 158 is pivoted for vertical rocking movement on a shaft 159, extending between the sub-frame side walls 121 parallel with and in front of the shaft 119. The bail 158 includes a bail bar 160 overlying the resetting arms 124 of the stops 120, whereby it is operatively related to said stops 120 for elevation by movement of the latter to effective position, and for depression to reset said stops 120 to ineffective position. A slotted link 161, (Figs. 6, 13, 67, 68, 70 and 71), connects said bail 158 with the shuttle carriage latch 154 so that the latter is moved to unlatching position by elevation of said bail and permitted to assume latching position under the urge of the spring 156 upon depression of the bail. In this connection, it is to be noted that the above unlatching operation is effected, primarily, by operation of the stop setting mechanism, to wit, the slide levers 126, stops 120 and motor springs 130, in properly timed relation to movement of the stops to their fully effective positions.

Operatively related to the axially shiftable selector gear 147, is a differential gear 162, (Figs. 1, 4 and 5), having graduated teeth or flights 163 arranged to engage the selector gear 147, in the different set positions of the latter, so that different numbers of teeth or flights 163 corresponding to the value of the number key 25 depressed will engage the selector gear 147 to turn the latter differentially. In one aspect, the differential gear 162 forms part of the value selecting mechanism. In another, it forms part of a general operator unit to be described, by which, as will presently more clearly appear, said gear 147 is rotated differentially according to the values of the keys 25. It will, of course, be understood that in the normal position of the selector gear shuttle carriage 150, the selector gear 147 is out of mesh with the differential gear 162. It will be noted that eleven teeth 163 have been illustrated in furtherance of the machine's adaptation to English currency work, but it will be understood that, in computing according to the decimal system only, the first nine teeth 163 only will be utilized.

OPERATING MECHANISM

*General operator*

Figure 4:
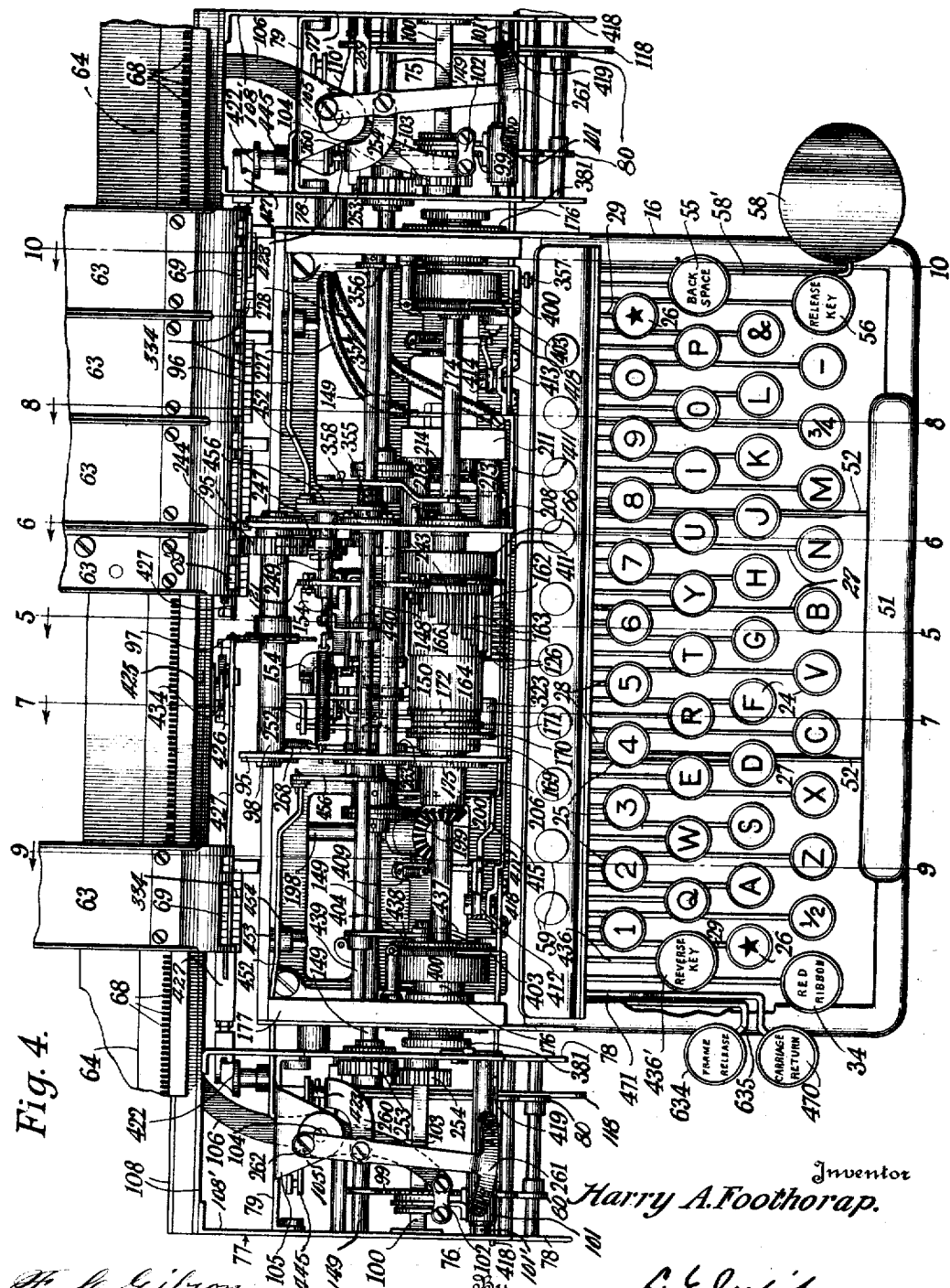
Fig. 4 is a detail view in top plan, drawn to an enlarged scale, with the sub-structure and other parts omitted for the sake of clearness in illustration.

The differential gear 162 is mounted on a general operator unit 164, (Figs. 1, 4, 5, 7, 11, 21–24 and 65), including a sleeve 165 having at one end a clutch housing 166. Secured to the sleeve, as by tie rods 167 and spacing collars 168, are the aforesaid differential gear 162 and a series of cams 169, 170, 171 and 172, (Figs. 4, 7, 11 and 65), presently to be explained. The general operator 164 is journaled, as by bushings 173, on a general operator shaft 174 to be driven thereby through the clutch 166, as hereinafter explained. The shaft 174 extends across the carriage 16, through bushing members 175, (Fig. 11), in the brackets 95, with its ends terminating adjacent the inner ends 78 of the crossfooters 75 and 76, (Fig. 4). The opposite ends of the general operator shaft 174 are journaled in sleeves 176 rotatably mounted in anti-friction bearings 176' supported in brackets 177 arising from the carriage top plate 96.

*Main drive mechanism to general operator shaft*

The general operator shaft 174 is adapted to be driven in a clockwise direction, looking at the machine from the right hand side thereof, as follows: Referring particularly to Figs. 2, 3, 11, 16 to 20, an electric motor 178, (Figs. 17, 19 and 20), and transmission casing 179, are secured, as by brackets 180 and 181 at the rear of the machine, to the rear face of the rail 13 of the tilting frame 10. A worm 182, (Fig. 20), worm gear 183, and safety slip clutch 184, connect the armature shaft 185 of said motor in driving relation with a short transmission shaft 186 journaled in the casing 179 longitudinally of the machine. At the rear of the frame 10, preferably above the trunnions 11, is a transversely extending main drive shaft 187. The latter has a bearing at one end, as at 188, (Figs. 17–19), in the casing 179 for driven connection with the transmission shaft 186, as by beveled gears 189 and 189' fast on said shafts, respectively, the opposite end of the main drive shaft 187 extending through one bracket 15, (Fig. 16), and through a bearing sleeve 190 into a gear housing 191. The bearing sleeve 190 may be formed in a bracket 192 secured to the outer face of the left hand vertical bracket 15. The gear housing 191 is formed integrally with the bracket 192, and is closed by a cover plate 191', and rocks with the tilting frame 10. Above the main drive shaft 187 is a transversely extending squared spline shaft 193 having a bearing (not shown) at one end in one of the brackets 15 and extending at its opposite end into the housing 191 through a bearing 194 therein. The main drive shaft 187 drives the shaft 193 in the proper direction by a gear train within the housing 191, including gears 195 and 196 fast on said shafts, respectively, and intermediate idler gears 197 in the housing.

Intermediate the spline shaft 193 and general operator shaft 174 is an inclined jack shaft 198, (Figs. 15 and 16), operatively connected at its upper end to the general operator shaft 174 by beveled gears 199 and 200 fast on said shafts, respectively, the elongated sleeve of the beveled gear 199 fast on the jack shaft, being journaled for support in one of the before-mentioned bushing members 175 projecting from one of the brackets 95. The spline shaft 193 is operatively connected to the lower end of the jack shaft 198 by beveled gears 202 and 203 on said shafts, respectively, mounted in an angular bearing member 204 fixed to the carriage 16, as by a bracket (Figs. 3 and 15), and slidable along the spline shaft 193, so that said gears 202, 203 are moved lengthwise of the shaft 193 with the carriage 16.

It will be seen that the before-described main drive mechanism is mounted on the elevatory frame 10 and carriage 16 to swing with said frame and carriage about the axis of the trunnions 11. A particular advantage of this arrangement is that the parts of the said main drive are always maintained in driving relation in any position of the frame 10 and carriage 16, and at the same time, are adapted for driving relation with respect to drive mechanism on the base 1, as will more clearly appear in the succeeding description.

*Main drive control*

Referring particularly to Figs. 4, 5, 8, 21 to 24, and 40 to 43 a motor control bail 206 underlying the hooked fingers 129 of the stop-setting slide levers 126, is pivoted on the carriage 16, as at 207, to the brackets 95, and urged upwardly by a spring 208, (Figs. 4 and 8), suitably fixed at its opposite ends to said bail 206 and to one bracket 95. As will be obvious, said bail 206 urges the forward ends of the stop setting slide levers 126 upwardly against the stop bar 132, the bail being depressed by said slide levers when the latter are tripped from their latched positions, and locked in depressed position by said tripped slide levers. Adjacent one side of the bail 206 is a circuit making and breaking device in the form of fixed and movable contact members 209 and 210, (Figs. 40–43), respectively, one of which members is secured by screws 209', and the other by a binding post 210', to an insulator block 211 supported by and spaced apart from one bracket 95, (Fig. 4), by bolts 212 and insulator sleeves 213. The movable contact member 210 is arranged to overlie the fixed member 209 and also the adjacent side of the motor control bail 206, (Figs. 41 and 43), and is urged downwardly toward contacting position by a spring 214 coiled about the extended end of the binding post 210'. The spring is tensioned by fastening one end to a screw 214', the opposite end of the spring bearing against the contact 210 to urge the latter against the contact 209 and close the circuit. The spring 208 of the bail 206 is stronger than the spring 214, so that the control bail 206 normally holds the movable contact member 210 out of contacting position, but depression of the bail 206 by the beak 129 of any tripped setting slide lever, permits closing of the circuit by the spring 214 to energize the motor.

A pair of stationary contacts mounted on the frame 10 are adapted for continuous contacting relation with a pair of traveling contacts or brushes mounted on and shiftable with the carriage 16 in any position of the carriage 16. Preferably, said traveling contacts take the form of a pair of resilient brushes 215 (see Fig. 40) extended from an insulation block 216, (Figs. 17 and 123), bolted, as at 217, to the carriage 16. Each of these brushes lies in wiping engagement with the lower edge of one of a pair of bus bars 218 embedded, in side by side parallel relation, in an insulating strip 219 secured to the rear rail 13 of the frame 10, as at 220, (Fig. 121). A wire 221, (Fig. 40), connects one bus-bar 218 to one side of the motor 178. Wires 223 and 224 connect the other side of said motor and the other bus-bar 218, respectively, with a plug socket 225 for receiving the usual power leads 226. The fixed and movable contact members 209 and 210 of the circuit making and breaking device are each connected to one of the brushes 215 the one by wire 227, and the other by a wire 228, so that the circuit may be completed through the motor or broken through contact members 209 and 210.

We have seen in the foregoing, that depression of a value key 25 first trips the stop setting lever 126, of a related stop 120, from its normally latched position for operation of said slide lever by its motor spring 130 to set the value stop 120 from an ineffective to an effective position in the path of the selector gear shuttle carriage 150, and that, in view of the described relation of the stop setting slide levers 126 to the motor control bail 206, and the described connections between said bail and the motor 178, the latter is energized to rotate the general operator drive shaft 174 coincidentally with the setting of the value stop 120 to effective position. It will also be clear that another result is effected substantially coincidently with the setting of a stop 120, namely, the stop resetting bail 158 is operated to release the latch 154 of the selector gear shuttle carriage 150, whereupon the latter is propelled by its motor spring 153 so that the lug 152 thereon collides with and is intercepted by the set stop 120.

We next come to the driving connections between the general operator unit 164 and the general operator drive shaft 174, and the control of such connections.

*Drive from general operator shaft to general operator unit*

The general operator unit 164 is driven by the general operator drive shaft 174 through a single cycle of movement as an incident to depression of each value key 25, as follows: Referring particularly to Figs. 4, 6, 11, 12, 80 and 81, there is associated with said unit 164 a single revolution, general operator clutch, including a clutch dog 229 pivoted at 230 in the clutch housing 166 and urged by a spring 231 to engage a ratchet wheel 232 fast on the general operator drive shaft 174. The tail of the clutch dog 229 projects through the housing 166 for engagement, in the normal position of the general operator unit 164, with a hooked clutch tripping arm 233 mounted on a fixed stud 234 to be rocked into either tripping or releasing position relatively to the dog 229, whereby the clutch is engaged or disengaged, as will be clear. A suitably connected spring 235 yieldingly retains the tripping arm 233 in tripping position and the clutch normally disengaged. The general operator unit 164 is yieldingly held in normal position at the end of each revolution, by a detent lever 236 (Fig. 6), pivoted, as at 237, and urged by a suitably connected spring 238 in a direction to engage a notch 239 in said lever with a tooth 240 on said unit. A stop 238' projecting from the adjacent sub-frame wall 121, limits movement of the detent lever 236 in a direction to prevent the latter from binding against the general operator unit 164.

The above-described clutch drive to the general operator unit 164 is controlled, preferably, by the value selecting mechanism, so that said unit is held locked out against rotation, through disengagement of the clutch elements, until after a value selection has been effected. In other words, the control is such that value selection is a condition precedent to rotation of the general operator unit 164. This is for the purpose of preventing premature operation of the registers 63, 75 and 76 which, as will presently be seen, are driven by rotation of said general operator unit to accumulate the selected values.

As previously mentioned the stop shaft 119 (Figs. 5 and 21-24), is endwise movable in limited degree in the sub-frame side walls 121. Hence, the impact of the selector gear shuttle carriage 150 against a set stop 120 will impart limited advance movement to said shaft 119, i. e., toward the right, looking at the front of the machine. A clutch control lever 241 (Figs. 6, 11 and 12), is pivoted, as at 242, to an ear projecting from one sub-frame wall 121, for operation by advance of the stop shaft 119 to move the general operator clutch tripping arm 233 to releasing position and thus free the clutch dog 229 for engagement with the clutch ratchet 232. Retraction of the stop shaft 119 by the shuttle carriage 150, as hereinafter set forth permits return of the clutch tripping arm lever 233 by its spring 235 to tripping position to disengage the clutch dog 229 at the end of a single rotation of the general operator shaft 174. The collar 119ª, (Figs. 11 and 12), is located on the shaft 119 for engagement by the selector gear shuttle carriage 150, so that when the latter is retracted, by means presently described, the shaft 119 and value stops 120 will be also retracted from the positions to which they were moved by the selector gear shuttle carriage on its collision with the set value stop 120.

*Drive from general operator to register drive shaft and registers*

As will be understood from the foregoing, the general operator unit 164 drives the register drive shaft 149 through the medium of the differential gear 162 on the former and the selector gear 147 on the latter. Operatively connecting the register drive shaft 149 and the shaft 98 of the column register master wheel 97 is a reversible gear drive similar to that featured in my U. S. Patent No. 1,421,201 of June 27, 1922. Briefly (see Figs. 4, 6, 11, 12, 13), said drive includes gears 243 and 244 fast on the shafts 149 and 98, respectively, a twin gear 245 mounted on a stud 246 on one bracket 94, and a reversing gear 247 mounted between said sub frame wall 95 and the bracket 121 upon a shaft 248 and laterally shiftable to "add" or "subtract" positions, respectively, in one of which the master wheel shaft 98 is rotated in a direction to effect addition in the column registers 63, and in the other of which, the direction of rotation of said shaft 98 is reversed to effect subtraction in said registers 63. A gear shifter rod 249, (Figs. 6 and 13), having a yoke 250 engaging a grooved hub 251 on the reversing gear 247, is mounted to slide in one bracket 95 and the adjacent sub-frame wall 121 to shift said reversing gear 247. A spring 252 is suitably connected to the gear shifter rod 249 and to the other bracket 95 to yieldingly hold the reversing gear 247 normally in "add" position.

The crossfooter registers 82 are driven by the register drive shaft 149 through gear trains substantially the same as above described, including in each instance (see Figs. 4, 12, 46 to 51), a crossfooter driving gear 253 fast on the end of said shaft 149, a gear 254 fast on the crossfooter master wheel shaft 100, a twin gear 255 journaled in the crossfooter register on a stud 256 projecting from the side plate 78, and a shiftable reversing gear 257, functioning in the same manner as described with reference to the master wheel drive for the column registers. In the case of the crossfooter registers, the gear shifters 258 (Figs. 4 and 46–48), slide on horizontal guides 259 in said crossfooter registers, each shifter being operatively connected by a bar 260 to a swinging indicator 261 mounted on a pivot 262 on the upper ear 105 of the rear frame plate 79 of the crossfooter, and adapted to indicate the "add" or "subtract" condition or state of the crossfooter.

*Register drive shaft lock and release mechanism*

Associated with the register drive shaft 149 is locking mechanism controlled by the general operator unit 164 to normally lock said shaft, and hence the master wheels 97 and 99, against over-rotation when the selector gear 147 is retracted and out of mesh with the differential gear 162, said locking mechanism operating automatically to unlock said shaft just prior to an accumulating operation and to again lock the same as soon as an accumulating operation has been completed, to prevent overrunning of said shaft and master wheels. Preferably, this locking mechanism includes a toothed ratchet wheel 263 fast on the register drive shaft 149 (see Figs. 4, 7 and 65), a vertically rocking over-rotation preventing dog 264 pivoted on a fixed stud 265 on a bracket 95, and having at one end a wheel dogging tooth 266 to co-act with the ratchet 263. The opposite end or tail 267 of the dog lies subjacent the over-rotation preventing cam 169 of the general operator unit 164. A spring 268 connected at its opposite ends to the locking dog 264 and to a fixed stud 269 on the bracket 95, respectively, urges the dog 264 toward unlocking position. A dog rocker 270 pivoted on the stud 265 is engaged by high and low portions 271 and 272, respectively, of the over-rotation preventing cam 169. A yielding operating connection is provided between the dog 264 and dog rocker 270 in the form of a pin 273 on the former, a slot 274 in the latter, and a spring 275 connected at its opposite ends to said dog and rocker, as at 276 and 277, respectively, said slot, pin and spring being arranged so that when the high portion 271 of the cam 169 wipes over the dog rocker 270, it rocks the dog 264 against the tension of the spring 268 to dog the ratchet wheel 263 and thus lock the register drive shaft 149. In the event, however, of an obstruction to movement of the dog 264, the dog rocker 270 has a limited degree of independent movement to prevent jamming or breakage of the parts.

It will be noted that the teeth or flights 163 of the gear 162 extend approximately half-way, only, around the general operator unit 164 so that an accumulating operation in the registers is accomplished by substantially a half revolution of said unit. The high and low portions 271 and 272 of the over-rotation preventing cam 169 are so arranged that, in the normal position of the general operator unit 164, shown, for instance, in Figs. 7 and 65, the cam maintains the over-rotation preventing dog 264 in locking engagement with the ratchet wheel 263 and register drive shaft 149, but releases said dog upon slight rotation of said general operator unit 164 to permit disengagement of said dog 264 by the spring 268, and then cams said dog 264 back into locking engagement when the general operator unit 164 has rotated substantially a half revolution, to thereby lock the register drive shaft 149 coincidentally with the completion of an accumulating operation. A slight preliminary degree of rotation of the general operator unit 164 is provided for, before the teeth 163 mesh with the selector gear 147, to thereby effect the unlocking of the register drive shaft 149 just prior to an accumulating operation.

*Escapement and key locking mechanisms*

To prevent lateral displacement of the carriage 16, and hence movement of the master wheels 97 and 99 from selected denominational location during an accumulating operation, it has been found advisable to lock the escapement of the machine at the beginning of a cycle of operation and to maintain it locked until accumulation has been completed. To this end, there is provided locking mechanism automatically operative under control of the value keys 25 to lock the escapement upon initial depression of said keys, and to maintain it locked until said keys have returned to normal position, including key locking mechanism to prevent premature return of the depressed key, and means for releasing both the escapement and said key locking mechanisms at the end of an accumulating operation.

The escapement locking mechanism (see Figs. 5, 8, 11, 14, 21 to 24, 72 and 73) includes an escapement locking dog 278 (see Fig. 11) cooperating with the escapement wheel 36 and mounted on a bracket 279, depending from the base of the carriage 16, to rock into escapement locking and unlocking positions, respectively. A vertical dog-operating rod 280 (see Fig. 8) is connected at its lower end to said dog 278. A spring 281 has its opposite ends secured to said rod and to a fixed stud 282 in the bracket 95, respectively, to urge said rod upwardly to shift the locking dog 278 toward escapement locking position. Cooperating with the escapement locking dog 278 is a pair of opposed main and auxiliary latching members 283 and 284, respectively, pivoted on a stud 285 supported beneath the carriage 16, to swing into and out of their latching positions on opposite sides of a latch lug 286 on said locking dog 278, each member 283 and 284 having a latching shoulder 287, the latching shoulders being opposed and one being higher than the other. These latching shoulders are adapted, in the latching positions of said members, to take over said lug 286 to maintain the escapement locking dog 278 in unlocking position. A spring 288 connects said latching members 283 and 284 to urge them toward each other and hence, toward latching position, but permitting their relative separation for a purpose presently clear. Cooperating stops 289 and 290 on said latching members, respectively, limit their movement toward each other. The arrangement of the latching shoulders 287 is such that in the latching position of the main latching member 283, the auxiliary latching member 284 is blocked, by contact of its latching shoulder 287 with the side of the latch lug 286, against movement to latching position. The stops 289 and 290 are so arranged that the main latching member 283, by its movement to latching position, will displace the auxiliary latching member 284 from latching position. The purpose of the described construction of the main and auxiliary latching members will hereinafter be explained. Normally, the main latching member 283 is maintained in latching position, and hence the dog 278, in escapement unlocking position, by latch operating mechanism as follows:

Suitably mounted in the carriage 16 to extend transversely thereof, over the number key levers 28, is a latch operating rock shaft 291. A crank arm 292, (Figs. 8, 14 and 73) having a bifurcated end 293 is fast on said shaft 291. Pivoted at 294, (Fig. 11), to the main latch member 283 is a latch releasing rod 295 having a stud 296, (Fig. 8), thereon, whereby said rod may be connected to or disconnected from said crank arm 292 by swinging movement of said rod. In their connected relation, said crank arm 292 and rod 295 provide for swinging said main latching member into latching and unlatching positions by rocking movement of said shaft 291 in opposite directions, respectively. The purpose of disconnecting said crank arm 292 and rod 295 will be presently explained. A second crank arm 297, (Figs. 11 and 14), fast on the rock shaft 291 is connected by a spring 298 to a fixed stud 299 (Figs. 10, 11 and 14) so that said shaft is yieldingly urged in a direction to swing the main latching member 283 to latching position. Fast on the rock shaft 291 is a series of cam arms 300, one for each value key lever 28, pendant from the rock shaft 291 alongside said key levers 28, and operated upon initial depression of said key levers, by rounded studs 301 on the key levers, to rock said latch-operating shaft 291 in the opposite direction, whereby the main latching member 283 (Fig. 11), is swung to unlatching position and maintained in such position until the return of the depressed key lever to normal position. The normal position of the cam arms 300 and rock shaft 291 is shown, for instance, in Figs. 5, 8, 21, 24 and 72 and 73, and the manner in which they and their related parts are affected by depression of the value keys 25 is shown in Figs. 22 and 23.

Loosely mounted on the latch-operating rock shaft 291 is a series of key locking fingers 302 adapted to be swung on said shaft from a normal ineffective position to an effective position over the studs 301 to block return of the number key levers 28. Also swinging on said shaft 291 is a finger-operating bail 303 adapted to be rocked from normal position to move said fingers 302 to effective position and to return the latter to ineffective position by its movement back to normal. A bail-operating arm 304, (Figs. 11, 14 and 72), on said bail is connected by a compensating pin and slot connection 305 and 306, respectively, to the aforesaid dog-operating rod 280 of the escapement locking mechanism, whereby when the latter is operated to escapement-locking position, by its spring 281, the bail 303 is moved from normal position and vice versa. Springs 307 connecting the fingers 302 and said bail 303 and shoulders 308 on said fingers bearing against said bail, establish a yielding operating connection between the bail and fingers.

At this point, it may be explained that the machine is also equipped with suitable means with which the upstanding lugs 28' of the levers 28 cooperate, for instance, that shown in my U. S. Patent No. 1,811,227 of June 23rd, 1931, for preventing depression of more than one value key at a time, and also with full stroke mechanism of the type of my Patent No. 1,576,960 of March 16th, 1926. However, it has not been considered necessary to illustrate and describe these features in the present instance, since their operation is well-known and they form, per se, no part of the present invention.

The escapement-locking and key locking mechanisms are automatically unlocked by releasing mechanism common to both, including the before-mentioned cam 171, (Fig. 72), of the general operator unit 164. A rocker member 309 mounted on a fixed stud 310, and comprising two arms 311 and 312, respectively, is positively rocked, in one direction, at the completion of an accumulating operation, by wiping contact of the cam 171 with the arm 311. Such movement of the rocker member 309 is imparted to the dog-operating rod 280 to move the escapement locking dog 278 to unlocking position where it is held by the latch member 283, (Fig. 11). For this purpose, a rock shaft 313 is journaled in the opposite flanged ends of a bracket 314, (Figs. 8, 14 and 74–78), secured to the carriage top plate 96. A crank arm 315, (Fig. 72), is fixed on one end of the shaft 313 and operatively connected at 316 to the arm 312 of said rocker member 309. A second crank arm 317 is fixed on the other end of said shaft 313 and connected to the rod 280 at 318. Since the finger-operating bail 303 of the key locking mechanism is connected at 305, 306, in the manner previously described, to the escapement locking mechanism, it will be seen that the key locking fingers 302 are moved to ineffective position, to release a depressed key lever 28 simultaneously with the release of the escapement mechanism. Obviously, the immediately following return movement of said key lever 28 permits the return of the main latch member 283 to latching position under the urge of the spring 298.

It may sometimes happen that the operator, by neglecting to remove his finger from a value key, will hold the main latching member 283 in unlatching position during or after the automatic release of the escapement and value keys 25. In this event, the auxiliary latching member 284 will function to latch the dog 278 in escapement unlocking position until the operator removes his finger, whereupon the main latching member 283 will displace the auxiliary member 284 and assume latching position under the urge of the spring 298.

Figure 5:
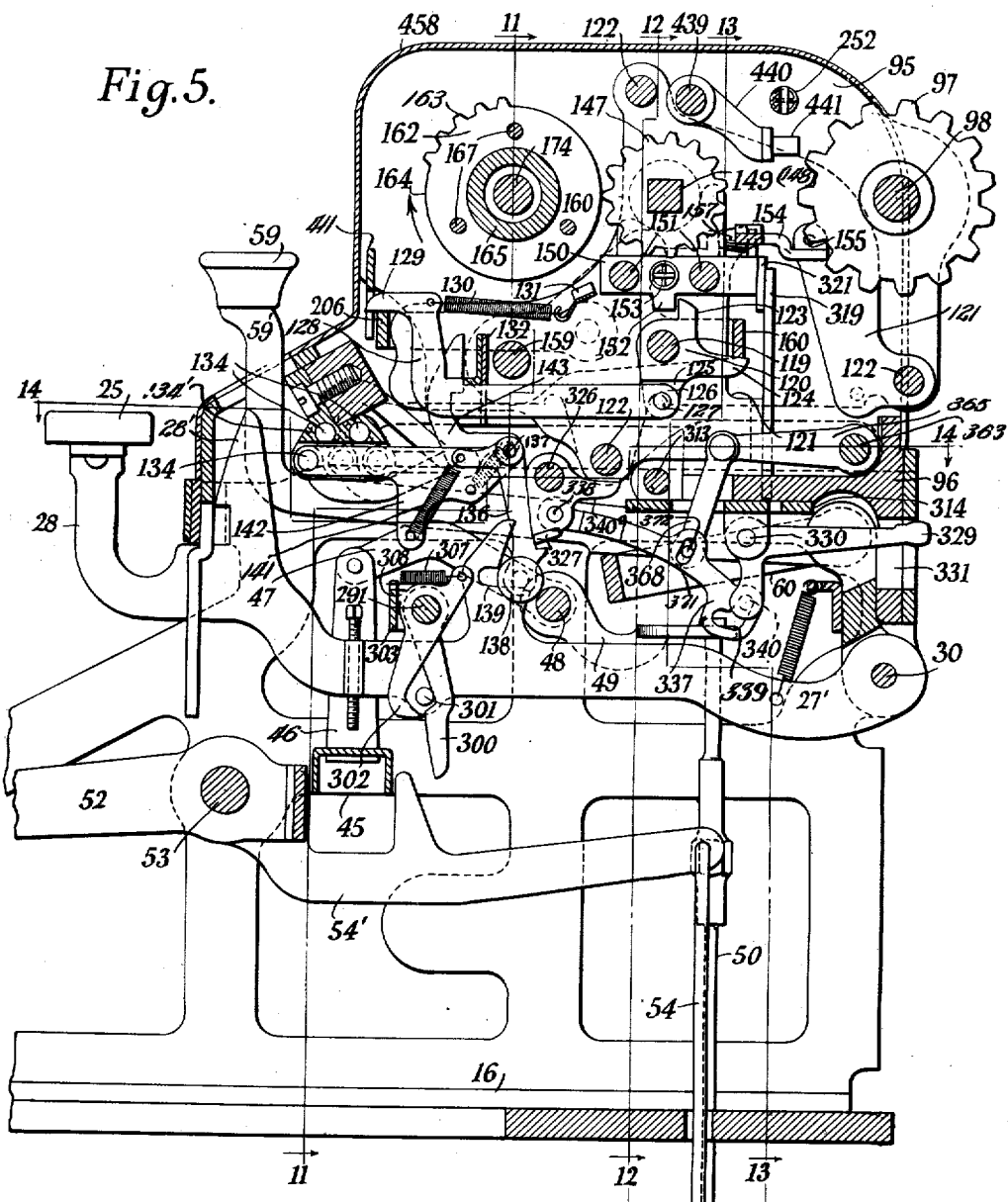
Fig. 5 is a view in longitudinal section taken on the line 5—5 of Fig. 4.
Figure 6:
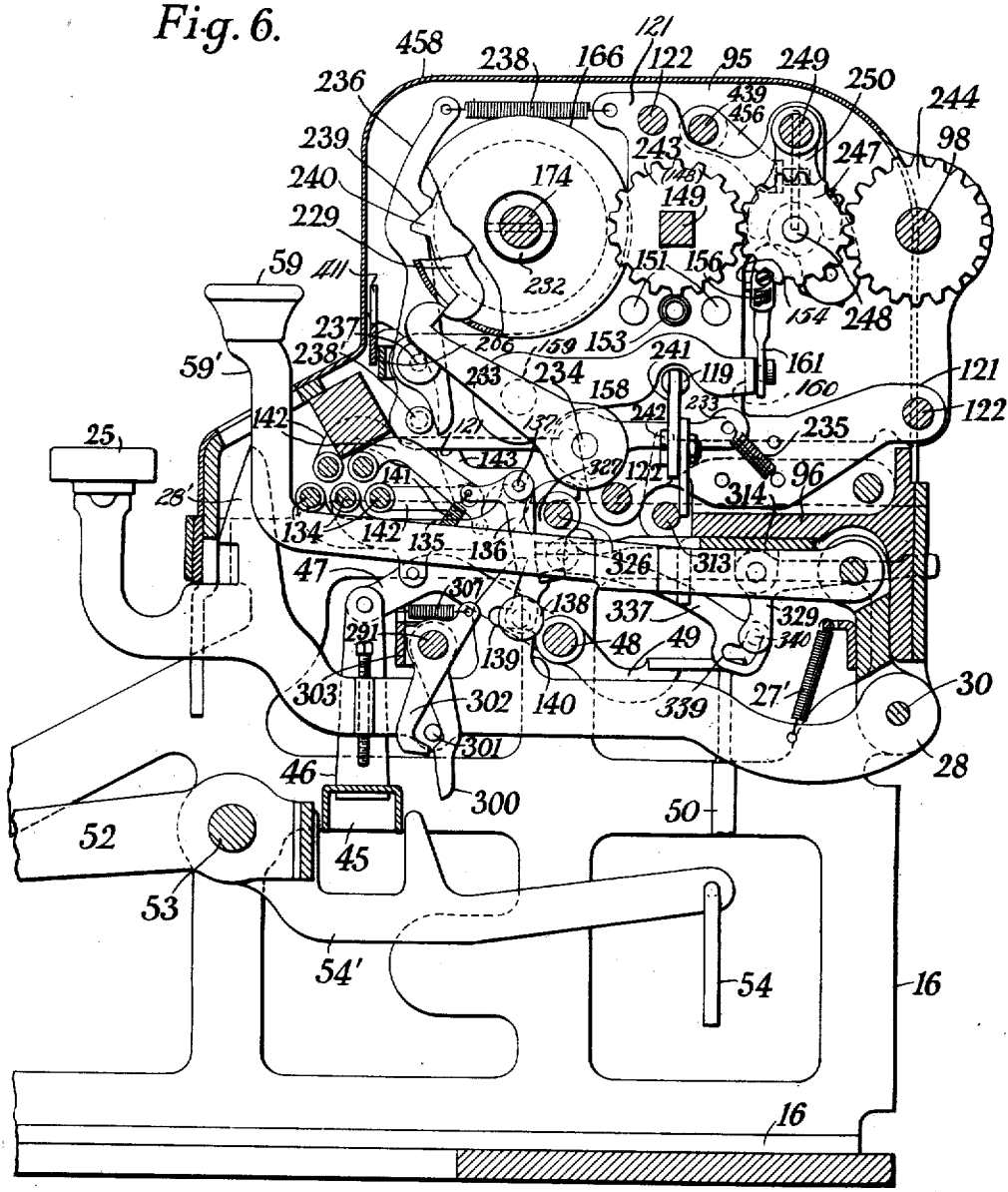
Fig. 6 is a similar view taken on the line 6—6 of Fig. 4.
Figure 7:
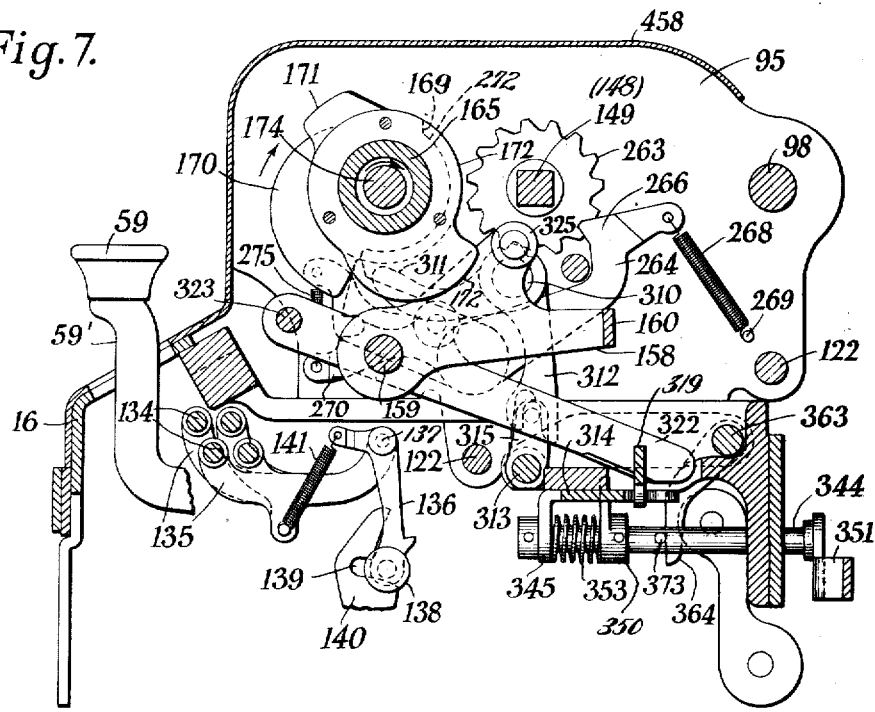
Fig. 7 is a fragmentary longitudinal section taken on the line 7—7 of Fig. 4.

In Fig. 5, the normal angular positions of the teeth 163 on the general operator unit 164 are shown and in Figs. 7 and 72 is shown the normal position of the cam 171 on the general operator unit, from which it will be clear that the automatic release of the escapement and key locking mechanisms, by the cam 171, follows closely upon the completion of effective operation of the selector gear 147 by the differential gear 162 of the general operator unit 164, and hence, closely following the accumulating operation.

Upon reference to Fig. 23 it will be seen that immediately following the release of a depressed value key 25, said key is free to return. Likewise, the before-described mechanism operated by said depressed key for tripping the related stop-setting slide levers 126 is free to assume normal position, shown as, for instance, in Fig. 21, so that when said stop-setting slide lever 126 is returned to normal, the said tripping mechanism will again be in tripping position. The tripped stop-setting slide lever 126 is returned to normal at another point in the same cycle of operation of the machine as will presently be explained.

Selector gear retracting mechanism

The selector gear 147 is next automatically returned to its previously described normal position, by mechanism which retracts the selector gear shuttle carriage 150. This mechanism, (Figs. 7, 11, 13 and 82 to 84) includes the before-mentioned cam 170 of the general operator unit 164, a shuttle carriage retracting bell crank lever 319, (Figs. 11 and 13), pivoted at 320, to one sub-frame side wall 121, and having one arm connected to the shuttle carriage 150 by a link 321, and an operating connection between the lever 319 and the cam 170, in the form of a lever 322 pivoted at one end, as at 323, to one of the sub-frame side walls 121 with its opposite end overlying an arm of the retracting bell crank 319. Roller 324 on the lever 322 provides an anti-friction bearing wiped by said cam 170. The relation of the above described parts of the selector gear shuttle carriage retracting mechanism is such that the lever 319 is moved beyond normal position, to an overthrown position, to momentarily retract the selector gear shuttle carriage 150 to its overthrown position. Such overthrow retraction of the selector gear shuttle carriage 150 accomplishes two things. First, it provides for a clearance between the roller 157 on the shuttle carriage, and the latch 154, while the latter is swinging into latching position in front of the former to insure the return of the latch to effective position. Secondly, the before-mentioned stop lug 152 on said shuttle carriage 150 engages the collar 119a, (Figs. 11 and 12), on the stop shaft 119 during such overthrow retraction of said shuttle carriage 150 and retracts said shaft positively to its normal position from its advanced position previously described. Such retraction of the stop shaft 119, as has been previously explained, permits return of the tripping lever 233, (Fig. 6), by the spring 235 to a position to disengage the clutch dog 229 on the housing 166 of the general operator unit 164 from the general operator shaft 174. The cam 170 is arranged to retract the selector gear shuttle carriage 150 and release the clutch dog 229 to effect a single revolution of the general operator unit 164 for each digit value selection set up in the machine.

In Figs. 7, 11, 13 and 82, the normal position of the parts of the selector gear retracting mechanism has been illustrated. In Fig. 83, the relation of the parts of said mechanism have been illustrated when the selector gear 147 has advanced and prior to its retraction by the cam 170, and in Fig. 84 the parts are shown at that point in the cycle of operation of the general operator unit 164 when the cam 170 operates the selector gear retracting mechanism.

Stop resetting mechanism

Returning now to the before-described combined latch-releasing and stop-resetting bail 158. Said bail, in addition to its latch-operating function previously described, forms part of an automatic stop resetting mechanism, including the cam 172 of the general operator unit 164. In the set position of a stop 120, the bail 158 is swung on its shaft 159 to an elevated position, shown in Figs. 22, 23 and 71, by the set stop, as has been described in the foregoing. As a final operation in the cycle of movement of the general operator unit 164, the cam 172 engages a roller 325, mounted on said bail 158 in the path of said cam 172, and depresses the bail to its normal position shown in Figs. 5, 6, 7, 21, 24 and 66 to 68. The bail 158, in turn, through its engagement with the resetting arm 124 of the set stop 120, resets said stop to normal position, as will be clear. As an incident to the resetting of the stop 120, the related stop setting slide lever 126 is slid forwardly to disengage its latching shoulder 133 from beneath the stop bar 132, thereby releasing the motor control bail 206 to the action of its spring 208, which thereupon rocks the motor-control bail from its depressed, circuit closing, position to circuit breaking position to stop the motor 178. Such movement of the motor control bail 206 also urges the stop setting slide levers 126 upwardly so that the latching shoulders 133 will be engaged with the stop bar 132 by the springs 130.

Automatic key connecting and disconnecting mechanism

As has been previously explained, the number keys 25 are normally disconnected from the stop controlling mechanism because the springs 141 normally hold the connecting links 136 in their key disconnecting positions, (Fig. 5). This, as will be understood, is to provide for independent use of the typewriting mechanism when writing outside of columns in which it is desired to compute. The links 136 and springs 141 may be controlled for automatically connecting the keys 25 to the mechanism for tripping the stop setting slide levers 126, when the printing point of the machine enters a column in which it is desired to compute, and for automatically disconnecting said keys when the printing point of the machine leaves such a column.

Such automatic control, (Figs. 5, 6, 8, 9, 11, 14, 25, 73, 74, 75 and 77), includes a key-connecting shaft 326 having fast thereon a series of pendant key-connecting cranks 327 opposed to the respective links 136. The shaft 326 is journaled in brackets 328, (Figs. 9, 11 and 25), on the carriage top plate 96, and also in a bearing lug 328', (Figs. 74, 75 and 78), on the bracket 314, for movement to engage the lateral lugs on the lower ends of the cranks 327 with the links 136, and swing the latter forwardly against the urge of the springs 141 to thereby enter the studs 138 in the recesses 139 of the key levers 28, and thus connect the latter with the computing mechanism, as will be clear. Movement of the key-connecting shaft 326 in a key-connecting direction is effected by means including a bell crank lever 329, (Figs. 5, 14, 73 and 77), rocking vertically on a stud 330 in the bracket 314, one arm of said lever projecting through a slot 331 in the rear wall of the carriage 16 for operation by a key-connecting arm 332, (Fig. 14), on the back of the carriage 16, which arm 332 is tensioned by a spring 333 and operated by a cam 334 on each of the column registers 63.

The key-connecting arm 332 and cam plate 334 are operated in conjunction with a letter space lock mechanism, including a dog 335 adapted to engage a series of teeth on the upper face of the cam 334, as fully explained in the U. S. Patent No. 1,183,280, issued to W. L. Dench, May 16th, 1916, to which attention is invited.

Suffice it to explain herein that said key-connecting arm 332 is depressed by said cam 334 against the tension of the spring 333, to rock the bell crank 329 in one direction when the carriage 16 enters a column to be computed, and to release said arm 332 as the carriage 16 moves out of said column, whereupon the spring 333 returns the arm 332 and rocks the bell crank 329 in the opposite direction. A link 337, (Figs. 5, 6, 73–75, 77 and 78

79), is pivoted at 338 to one key-connecting crank 327 for vertical movement thereon, and provided with an angular slot 339 in its opposite end to accommodate a stud 340 on the bell crank lever 329. The shape of the slot 339 is such that the link 337 may be swung on its pivot 338 for adjustment to two positions, in one of which it is connected to the bell crank 329 for automatic connection and disconnection of the keys 25 to the computing mechanism, and the other of which it positions another arm of the angular slot 339 in line with the stud 340 to enable the stud to idly traverse the slot without communicating motion to the link 337, which, in effect, is disconnected from said crank to prevent automatic operation of the key-connecting means. In the disconnected position of said link 337, the springs 141 (Figs. 5 and 6), are free to move the links 136 and the key connecting shaft 326 to key-disconnecting position, and the automatic key-connecting and disconnecting mechanism is disabled. A stop 340a on one crank 327 contacts one of the beforementioned tie rods 122 to arrest movement of the links 136 and the key-connecting shaft 326 in their key-disconnecting positions.

*Automatic escapement lock connecting and disconnecting means*

The escapement locking mechanism is normally rendered ineffective, so that in the independent use of the typewriter mechanism, the latter is controlled by the escapement in the usual manner. Since, however, for the reasons previously stated, it is desirable, when computing, to lock the escapement, the escapement locking mechanism is automatically rendered effective when the printing point of the machine enters a column position in which it is desired to compute, and is again rendered ineffective when the printing point leaves said column, to enable the independent use of the typewriter mechanism beyond said column. Preferably in the accomplishment of the above results the latch-releasing rod 295 of the escapement-locking mechanism is operatively connected to the key connecting shaft 326 through an arm 341 (Figs. 8, 14 and 73) fast on said shaft, a pin 342 on said rod, and a slot 343 in said arm 341, so that when said shaft 326 is in its normal key-disconnecting position, the latch-releasing rod 295 is in a position in which the stud 296 thereon is free from the bifurcated end 293 of the crank 292, and when said shaft is moved to key-connecting position, said rod is swung to locate the stud 296 in the bifurcated end 293. Obviously, in the first position of the latch-releasing rod 295, it is disconnected from the latch-operating shaft 291 and the escapement lock is disabled, and in the second position of said rod, the reverse is true.

*Decimal trip mechanism*

The machine of my invention embodies decimal spacing mechanism for automatically causing the carriage 16 to skip over the decimal spaces as is usual in this type of machine. Said mechanism is substantially the same in certain respects as that disclosed in U. S. Patent No. 820,879, issued to Leganke and Smith, May 15th, 1906, and U. S. Patent No. 922,559, issued to H. D. Bolton, May 15th, 1909, to which attention is directed. Referring briefly to said mechanism, (Figs. 12, 13, 14, 74 to 76 and 79), a decimal spacing shaft 344 is mounted to rock, and for endwise movement, in bearings 345 and 346 on the bracket 314 and carriage 16, respectively. An escapement tripping dog 347, (Fig. 13), is pivoted to an ear depending from the bottom plate of the carriage 16, as at 348, the dog being connected to said shaft 344 by a rod 349 and a crank 350 for operation when the shaft 344 is rocked from normal position to momentarily retard the movement of the escapement spacing dog 40 to effective position, and thus cause the carriage to skip the decimal spaces, as will be understood without further explanation. The shaft 344 is rocked from normal position by means of a decimal trip arm 351, fast thereon, engaging a decimal trip cam 352, (Figs. 2, 3, 14 and 46), on the column register 63, located in the path of travel of said arm 351. The decimal trip shaft 344 is adapted for endwise movement to a decimal trip disabling position, in which the decimal trip arm 351 is displaced from its normal path of travel and unaffected by said cam 352 in a manner next described. A suitably arranged spring 353 tensions the shaft 344 against rocking movement from normal position, and against endwise movement to disabling position.

*Means for manually disabling the key connecting, escapement locking, and decimal trip mechanisms*

Referring particularly to Figs. 1, 4, 8 to 11 and 73 to 77, a disabling rock shaft 354 extends transversely of the carriage, one end of which is suitably mounted in one of the brackets 177, the opposite end having a step bearing 355, (Fig. 11), projecting from the outer face of the right hand side frame bracket 95. A key lever 356, (Fig. 10), having a disabling key 357, is fixed on the shaft 354 for manually rocking the latter in opposite directions, respectively. A motion-transmitting lever 358, (Figs. 8 and 73), is fast on said shaft 354. Detent teeth 359 on said lever 358 with which co-acts a detent dog 360 pivoted, as at 361, and tensioned by a suitably connected spring 362, retains the shaft 354 in either of its positions.

Journaled at its opposite ends in the bracket 314 is a motion-transmitting shaft 363, (Figs. 74-77), having fast thereon three crank arms 364, 365 and 366, respectively. A link 367, (Figs. 8, 10 and 73), connects the crank arm 366 to the lever 358 for movement of the shaft 363 by the disabling shaft 354. A second link 368, (Figs. 5, 14, 73, 77 and 79), connects the crank arm 365 to the link 337 of the before-described automatic key connecting and disconnecting mechanism so that in one position of the key-disabling shaft 354, said link 337 is in a position in which the bell crank 329 is operatively connected to the latter for automatic connection and disconnection of the number keys 25 to and from the computing mechanism, and in the other position of said shaft 354, the link 337 is swung into the position in which it is inoperative by said bell crank 329 and the automatic key connecting and disconnecting mechanism is disabled. A spring 369 suitably connected to the motion-transmitting lever 358 and to a fixed stud 370, yieldingly retains said shaft 354 and associated parts in the first-described position, so that said key connecting and disconnecting mechanism is normally operative automatically. The connection of the link 368 to the link 337 is through a slot 371 and pin 372 to compensate for such automatic operation, as will be clear.

During the operation of disabling the automatic key connecting and disconnecting mechanism, the crank arm 364, (Figs. 7, 76 and 79), on the shaft 363 engages a stud 373 on the decimal trip shaft 344 and moves the latter endwise to the decimal trip disabling position previously described.

We have seen that the latch-releasing rod 295, (Figs. 11 and 73), of the escapement locking mechanism is connected through the arm 341 to the key-connecting shaft 326 so that when the latter is in key-disconnecting position, the escapement locking mechanism is disabled. Hence, the disabling key 357 as will be evident, in addition to disabling the automatic key connecting and disconnecting mechanism and the decimal trip mechanism, functions to disable the escapement locking mechanism as well.

*Automatic crossfooter restoring mechanism*

Returning now to the crossfooter or grand totalizers 75 and 76, and with particular reference to Figs. 1, 4, 11, 16, 54, 55 and 57 to 59, there is pivoted, as at 374, in each crossfooter 75, a rocking transfer restoring bail 375 having a bail rod 376 overlying the actuator levers 88 of the transfer mechanism so that movement of said bail in the proper direction, i. e., downwardly, will engage and return any levers 88 and their related transfer heads 85 which have been moved out of normal position in transferring operations to their normal positions.

The transfer restoring bails 375 are power-operated by the general operator shaft 174 through driving connections between said shaft and said bails, as follows:

Associated with each transfer restoring bail 375 is a bail rocker, including a rock shaft 378 journaled in the crossfooter plates and sub-frame 78 and 80, respectively, bail rocking arms 379 fast on said shaft 378 and links 380 connecting said arms 379 and the bail rod 376.

We have seen that the ends of the general operator shaft 174 are journaled in sleeves 176, (Fig. 11), supported for rotation in the brackets 177. The rotatable sleeves 176 form part of pitman connections between opposite ends of the general operator shaft 174 and the bail rockers 377 of the crossfooters 75 and 76, respectively. Each pitman connection includes a pitman rod 381, (Figs. 11, 16 and 55), the upper end of which is eccentrically connected at 377 to the outer disk-like face of its sleeve 176, the lower end of the pitman being connected to a crank 382 fast on the rock shaft 378 of the related crossfooter, so that a single revolution of the sleeve 176 will depress the transfer restoring bails 375 to effect a transfer restoring operation and then return said bails to their home positions. A slot 383 in said pitman rod 381 receiving a stud 384 on the crank 382, provides a lost motion connection between the pitman rod 381 and crank 382, permitting rebound of the rocker 378, 379 and restoring bail 375 under the quick drive of the general operator shaft 174 as a safety provision against breakage, said slot being open for quick detachment of the pitman rod 381. A spring 385 having its ends connected to the rod 381 and crank 382 as at 386 and 387, respectively, retains the rod 381 operatively connected with its crank.

Associated with each sleeve 176 is a single revolution, transfer-restoring clutch (Figs. 4, 11, 16 and 57–59), including a clutch dog 388 and spring 389 mounted in a housing 400 journaled on the general operator shaft 174, and forming a part of said sleeve, a ratchet wheel 401 fast on the general operator shaft 174, and a rocking, clutch-tripping arm 402. A notched detent lever 403, (Figs. 4, 9 and 10), tensioned by a spring 404 engages a detent tooth 405 on the housing 400 to prevent backlash in the crossfooter transfer-restoring mechanism.

The construction and operation of the transfer restoring clutches and of the detent levers 403 is the same as previously described with reference to the general operator clutch under the title "Drive from general operator shaft to general operator unit". It may be explained, however, that the housings 400 and sleeves 176 are connected by interlocking teeth 406, (Figs. 11, 16, 57 and 58), for convenience in assembling and disassembling.

The clutch tripping arms 402, (Figs. 9–11 and 57–59), are fast upon individual rock shafts 407 mounted in suitably secured brackets 408 and each is yieldingly held in clutch disengaging position by a spring 409 having its opposite ends connected to the bracket 408 and to a crank arm 410 fast on the shaft 407. The transfer-restoring clutches become simultaneously effective upon the disengagement of their respective clutch-tripping arms 402 from their clutch dogs 388 by a tripping bar 411, (Figs. 1, 4, 9, 10, 57 and 58), operatively connected at 412ª (Figs. 57 and 58) to the upwardly extending arms of bell cranks 412, and 413, respectively, pivoted at 414, with the remaining arms of the bell cranks arranged to overlie the crank arms 410, so that movement of said tripping bar in the proper direction will operate through the bell cranks 412, 413, crank arms 410, and shafts 407, to rock the clutch tripping arms 402 to releasing position, relatively to the clutch dogs 388, and permit the latter to engage the ratchet wheels 401. The springs 409 return the rock shafts 407, clutch tripping arms 402 and tripping bar 411, as will be clear.

A motor control finger 415 is pivoted co-axially with the bell crank 412 to overlie the motor control bail 206. Studs 416 on the bell crank 412 and lever 415, respectively, and a spring 417 superior to the spring 208 of the motor-control bail 206, operatively connect the crank 412 and lever 415 for depression of the bail 206 and consequent energizing of the motor 178 when the transfer restoring clutches are engaged, and to provide a yielding safety connection in the event of obstruction to the operation of said bail.

The tripping bar 411 is operated to engage the transfer-restoring clutches and to incidentally energize the motor 178, through the above-described connections, by the denomination selecting mechanism of the crossfooters 75 and 76 under control of the master wheel-advancing mechanism of either crossfooter. To this end, the opposite ends of the tripping bar 411 are provided with extensions 418 projecting into the crossfooters 75 and 76, respectively, and guided in the side frames 73 thereof, for operation of the bar 411 by the master wheel carriages 101 coincidentally with the advance of the master wheels 99 one step beyond the number wheels 83 of lowest order. For operating the bar 411 by the master wheel carriages 101, lugs 419, (Figs. 57 and 58), are provided on the extensions 418 with which collide studs 420 which secure the usual indicators 421 to the respective master wheel carriages 101.

*Automatic state control means for crossfooter*

The crossfooters 75 and 76 are each provided with state control means (see Figs. 2, 3, 4, 46, 47 and 48) for automatically determining whether or not addition or subtraction shall be performed therein. Such state control means includes the usual pivoted gear shifter lever 422 on the crossfooter operatively connected to the gear shifter truck 258, as at 423, (Figs. 46-48), and tensioned by a spring, as at 424, to yieldingly retain the shiftable gear 257 of the crossfooter normally in "add" position. Pivoted in horizontally spaced relation on the pick-up bar housing plates 108, as at 425, (Fig. 46), are a pair of bell cranks 426, one for each shifter lever 422, at the rear of the key carriage the related bell cranks 426 and levers 422 being connected by links 427 so that rocking movement of said bell cranks 426, in one direction, will shift the gears 257 to "subtract" positions. The bell cranks 426 are designed to be rocked in the proper direction to shift said gears 257 to "subtract" positions, and thus effect subtraction in the crossfooters 75 and 76, by subtraction cams 428, (Figs. 2, 3 and 46), one for each bell crank 426, and with which any column register 63 may be equipped. Said cams 428 are adapted to be detachably secured to the column registers 63, in any suitable manner, as by retaining springs and balls 429 and 430, respectively, to engage rollers 431 on said bell cranks 426 and rock the latter as the printing point of the machine enters a column position on the work related to a column register equipped with said cams 428.

It will be seen, that by attaching the subtraction cams 428 to a selected column register 63, both crossfooters 75 and 76 may be caused to automatically subtract in conjunction with adding operations in said register 63. Obviously by detaching, or omitting, said cams 428 both crossfooters may be caused to automatically add in conjunction with a column register, and either crossfooter may be caused to automatically subtract while the other adds in conjunction with operation of any column register 63 by the use of one or the other of the subtracting cams 428.

Each link 427 (Figs. 46 and 47) is yieldingly connected to its related bell crank 426 by a stud 432, (Fig. 64), on the bell crank entered in a slot 433 in its link 427, and a spring 434, the opposite ends of which are secured to studs 435 on said link and bell crank, respectively. The purpose of this yielding connection is to permit the shiftable gears 257 to be moved back to "add" positions, from the "subtract" positions in which they are being retained by the subtraction cams 428, notwithstanding the effectiveness of the cams, so that the crossfooters 75 and 76 may be reversed from such an automatic subtraction setting for correction purposes by mechanism now to be described.

*Means for reversing the registers for correction purposes*

Referring now particularly to Figs. 1, 4, 9, 11, 12, 13, 46 to 48 and 52, there is pivoted on the numeral key fulcrum rod 30 a "reverse" or correction key lever 436, equipped with a key 436' for manually reversing the column registers 63 and crossfooters 75 and 76. The key lever 436 is operatively connected by a link 437 (Figs. 4, 9, 11, 12, 46 and 47), and arm 438 to a register reversing rock shaft 439 journaled transversely of the carriage 16 in one bracket 177 and the brackets 95, respectively. Operation of said shaft 439 by the reverse key 436' reverses the before-described gear drive to the column register master wheel 97 by shifting the gear 247, (Figs. 4, 12 and 13), of said gear drive from its normal "add" position to its "subtract" position against the tension of the spring 252 as follows. A crank arm 440 fast on said reversing shaft 439, is flanged at its free end to support a pin 441 adapted, upon the operation of the reversing shaft, to rock a cam member 442, pivoted at 443, into engagement with a shoulder 444, (Fig. 47), on the gear shifter rod 249 to move the latter in the proper direction.

The above described reversing provision enables an operator to subtract an amount erroneously added in a column register 63, to correct the error. Simultaneously with reversal of the gear drive for the column registers 63, the gear drives to the crossfooters 75 and 76 are reversed from either their adding of their subtracting states, as the case may be, so that, during correction in a column register 63, the error will be corrected in either crossfooter in which it may have occurred or in both cross-footers simultaneously.

For effecting such reverse in the crossfooters 75 and 76, in each instance, a forked gear shifter lever 445 (Figs. 46, 47 and 52), is pivoted, as at 445', on the rear frame 79 of the crossfooter, and is pivotally connected to the gear shifter truck 258 thereof by a link 446, to correspondingly shift said shifter truck 258. Associated with each gear shifter lever 445 is a lever rocking plate 447 having opposed cam slots 448 to respectively accommodate studs 449 on the oppositely extending branches of said gear shifter lever 445 the rocking plate being mounted on a headed stud 450, (Figs. 48 and 52), for both pivotal and sliding movement in a slotted and offset keeper bar 451 (Fig. 53), fastened at its ends to the front face of the rear crossfooter frame plate 79, so that upon the application of power to said plate 447 in one direction, the shifter lever 445 will be rocked in one direction or the other to move the related reversing gear 257 from either "add" or "subtract" position to the opposite position.

Power is applied in the proper direction to said right and left lever-rocking plates 447, simultaneously, by transversely extending levers 452, (Figs. 46-48 and 52), individual to said plates and pivotally mounted, as at 453, on uprights 454 arising from the top plate 96 of the carriage 16, said levers being forked at their outer ends to embrace the studs 450 on to their related plates 447, the inner ends of the transversely extending levers being respectively connected to the reversing shaft 439, as by crank arms 456 fast on the latter and links 457 connecting said arms and levers. As will be understood the springs 252 and 424, assisted by the key lever spring 27', (Fig. 13), return the manual reversing mechanism to normal position after upon its release by the operator of the completion of the correcting operation.

A suitable casting 458 for the crossfooters 75 and 76 and the mechanism on top of the carriage 16 may be provided.

*Carriage retracting mechanism*

The carriage 16 is adapted to be retracted by mechanism disclosed substantially in my copending application Serial No. 135,210, filed September 13th, 1926, now Patent No. 1,904,127, issued April 18, 1933. Briefly, a transversely extending universal carriage retracting bail 459 (Figs. 2, 3, 17, 20, 85, 88, 92 and 93) is fast on a rock shaft 460 having its bearings in brackets 461 fast to the back of the rear rail 13 of the frame 10. Within the transmission casing 179, (Figs. 18-20), is a carriage retracting clutch, including a clutch sleeve 462 shiftable on the transmission shaft 186 and a clutch face 463 on the gear 189' which, it will be remembered, is driven by the motor 178. A pinion 464 on the sleeve 462 meshes at all times with a carriage retracting rack 465, (Figs. 2, 3 and 20) fast on the carriage 16. A clutch shifter 466, (Figs. 18-20), engaging a groove 467 in the clutch sleeve 462, is fast on a rock shaft 468 mounted in the bracket 180. Intermediate the shafts 460 and 468 are operating connections designated as a unit 469, (Figs. 3 and 17-19), whereby movement of the bail 459 in opposite directions will operate the shifter 466 to engage and disengage the carriage retracting clutch, respectively, the operating connections functioning to yieldingly latch said clutch in engaged or disengaged condition, and said bail in either clutch engaging or disengaging position, respectively.

The universal carriage retracting bail 459 may be rocked in the proper direction to engage the carriage return clutch in any position of said carriage, by a carriage "return" key 470, (Figs. 2-4 and 121), carried by a key lever 471 pivoted on a fixed stud 472 to the left side frame of the carriage and tensioned against depression by a suitably connected spring 473. The operating connection between the key lever 471 and bail 459 comprises a rock shaft 474 mounted in bearings 475 on said carriage 16, a link 476 connecting said lever 471 with an arm 477 on the shaft 474, which shaft carries a bail operating finger 478. Rocking movement of said bail 459 in the opposite direction to disengage the corriage retracting clutch is effected automatically upon retraction of the carriage 16 to its left hand marginal position by a suitable tappet (not shown) on the carriage adapted to contact a cam 479, (Fig. 88), adjustable along the bail 459, to time the disengagement of the carriage retracting clutch according to different marginal requirements.

Figure 1:
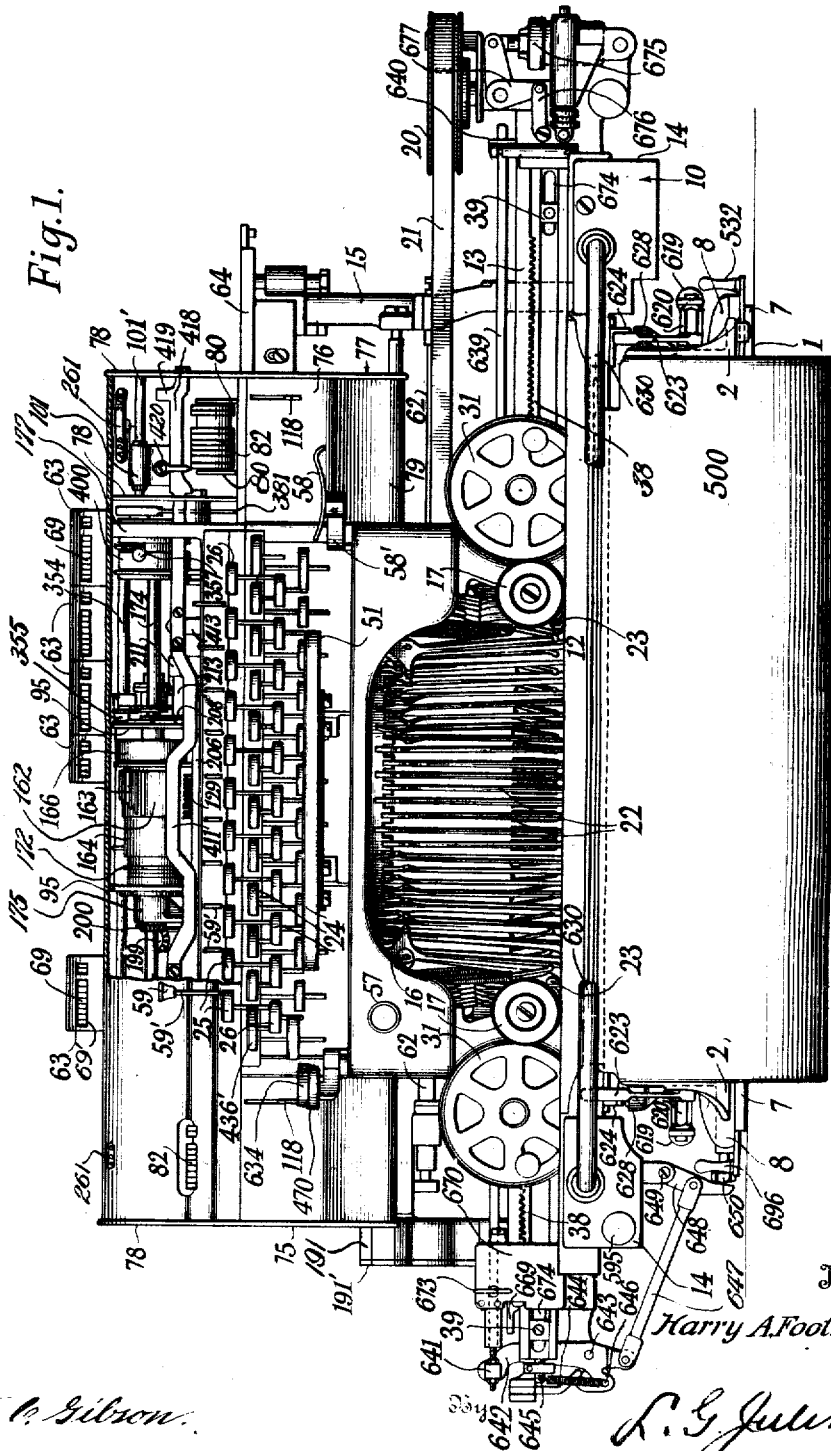
Figure 1 is a view in front elevation of an Elliott-Fisher type of machine equipped according to my invention.
Figure 2:
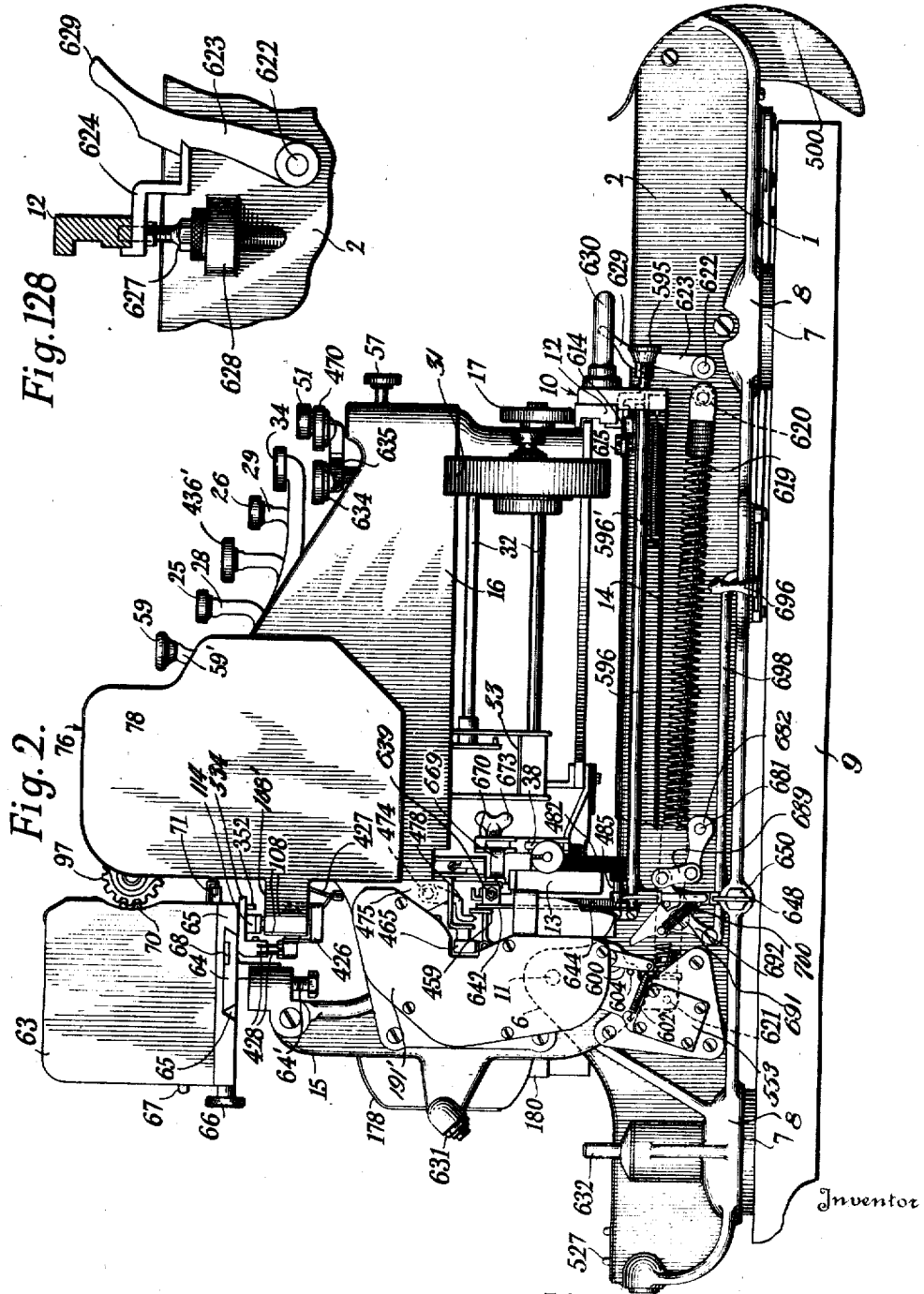
Fig. 2 is a view in side elevation looking toward the left side of the machine.
Figure 3:
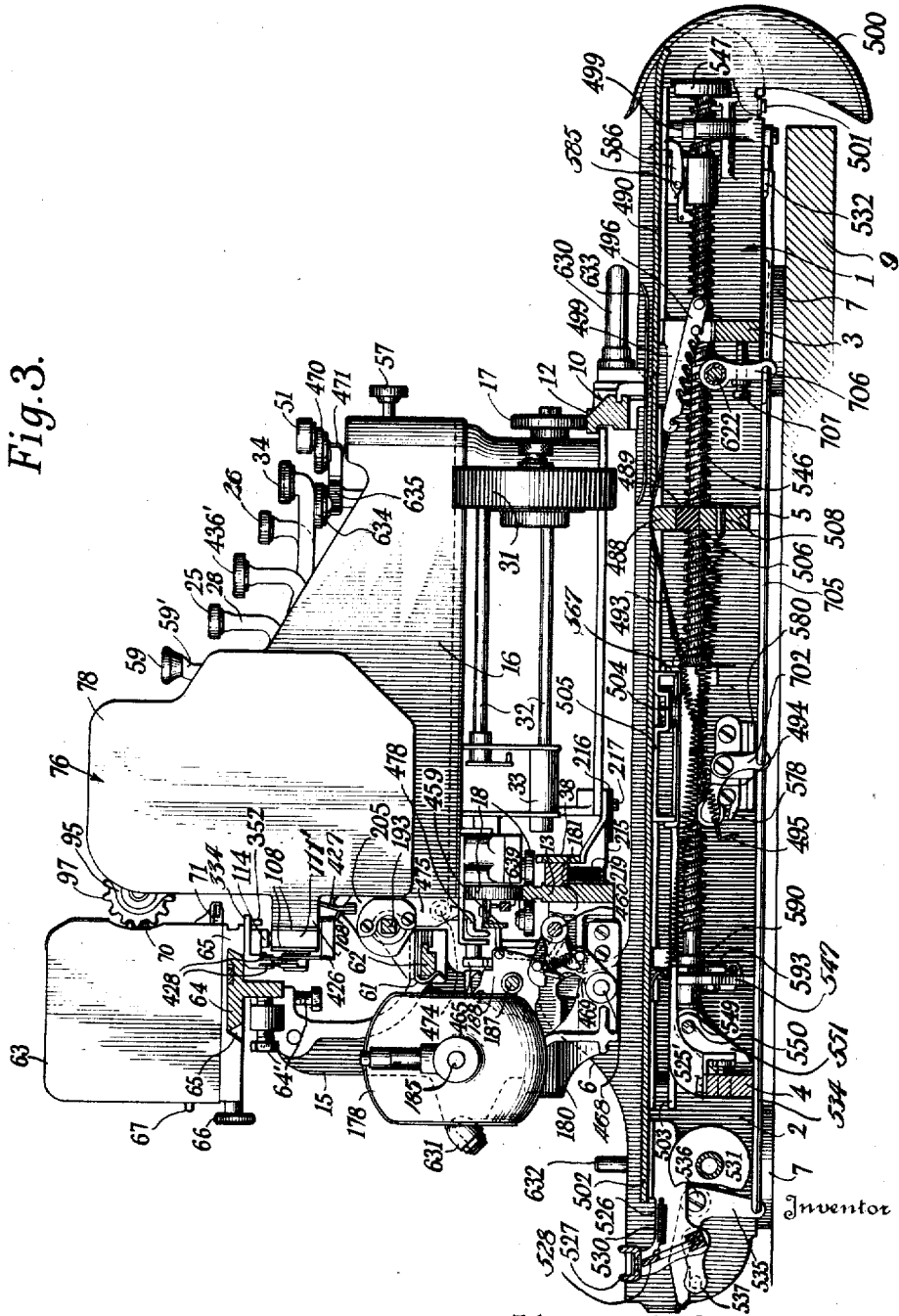
Fig. 3 is a view similar to Fig. 2, parts being shown in section.

The motor 178 is energized, by operation of the carriage "return" key 470, simultaneously with the engagement of the carriage retracting clutch, through the medium of a switch, (Figs. 40 to 45, 85-88 and 91-93), including fixed and movable contacts 480 and 481, respectively, mounted in a switch box 482, of insulation material, suitably secured to the tilting frame 10, (see Fig. 2). Wires 483 and 484 connect the contacts 480 and 481 to the conductor or bus-bars 218, respectively. The contact 481 is resilient and tends to engage the contact 480, but is normally disengaged therefrom by an insulated plunger 485, one end of which enters the switch box 482 to engage the spring contact 481, the opposite, outer end of the plunger being connected to a depending switch control arm 486 loose on the rock shaft 460 for operation thereby. A suitably arranged spring 485' urges said arm and plunger in a direction to disengage said contact. A crank arm 487 fast on the shaft 460, is provided with a laterally extending lip 487' overlapping the switch control arm 486, and when the carriage retracting bail 459 is rocked in a direction to enable the engagement of the carriage retracting clutch, (Fig. 92) the arm 487 will pick up and move the arm 486 and plunger 485 against the tension of the spring 485' to withdraw the plunger from the spring contact 481, and permit the contact 481 to engage the contact 480 and complete the circuit through the motor 178. The pick up connection between the arm 487 and the arm 486 provides for the circuit closing operation of the arm 486 and plunger 485 independently of said bail 459, for a purpose presently apparent.

WORK COLLATING AND FEEDING MEANS

Coming now to the work collating and feeding means with which the machine is equipped, a flat bar-like platen 488 (Figs. 3, 96 and 97) cushioned by a resilient strip 489, is mounted on the base 1, transversely thereof, and beneath the printing point of the machine, on the intermediate cross bar 5 of said base. The platen 488 and strip 489 are spaced at their ends from the side bars 2, (Fig. 129), for a purpose presently apparent, the platen and cushion therefor being secured to said bar 5 by sleeves and screws, as at 491 and 492, (Fig. 129), respectively. A protecting and cushioning sheet 493, preferably of rubberized fabric, is stretched taut across the upper edge of the platen 488, on the one hand, by springs 494 connecting its rear edge to a fixed anchor bar 495, and on the other hand, by notched stretcher hooks 496 along its front edge hooking over pins 497 on the front cross bar 3 of the base 1. The sheet 493 inclines downwardly from the front and rear of the platen 489 for a purpose which will presently be seen.

In front of the platen 488 is a horizontal, stationary, work supporting table 490 fixed by screws 498 to brackets 499 projecting from the side bars 2 and from the front bar 3 respectively, of the base 1. A curvilinear guard 500 is fixed at 501 to the side bars 2 in front of said table 490.

In the rear of the platen 488 is a table 502 mounted for movement in a line spacing direction on subjacent tracks 503, (Figs. 3, 95 and 97), by means of grooved rollers 504 and roller supporting brackets 505 depending from said line-spacing table. The tracks 503 may be supported at their rear ends on the upper ends of vertical posts 503a, (Figs. 95 and 97), projecting upwardly from the cross rail 4, and suspended at their forward ends on the rear brackets 499, (Figs. 95, 97 and 101), projecting from the frame side bars 2. Motor springs 506, (Figs. 3, 95 and 96), having their opposite ends connected to the line-spacing table 502 and to the bar 5, as at 507 and 508, respectively, tension said table against rearward movement in line spacing direction, and act to return it to normal position with its front edge contiguous to the platen 488.

At the left hand side of the movable table 502 (Figs. 95, 101 to 104 and 116 to 120) is means for clamping a bill, or other work sheet, not shown, thereon, including a clamping member 509 pivoted at its rear end 510 to the adjacent side frame bar 2 for vertical clamping and releasing movement. The member 509 is flanged inwardly along the forward portion of its upper edge to provide a sheet engaging lip 511 overlapping and adapted for clamping cooperation with the left edge of the line spacing table 502, the flange being extended forwardly, beyond the forward end of the clamping bar 509, as at 512, for sliding engagement with a grooved clamping member support 512' fixed by screws 513, (Fig. 95), to the under face of the line spacing table 502 and extending forwardly beyond said table and platen 488. The forwardly projecting end of the clamping member support 512' is accommodated in stationary work table 490. To clamp the bill sheet at both the rear and front of the platen 488, I may provide gripping teeth 515 for yieldingly engaging the work sheet. These gripping teeth are seated in apertures 515', (Fig. 101), formed in the flange 511 of the clamping member 509, overlying the edge of the line spacing table 502, and are held in effective position by the leaf springs 517 secured to said flange at 518. The clamping member 509 is yieldingly held in clamping position by a spring 519 secured to a stud 520 on the clamping member, and to a bracket 521 detachably mounted, for convenience in assembly, on a lug 522 on the clamping member support 512'. A slotted guide 523 on the clamping support 512' embraces the forward end of the clamping member 509 to prevent its lateral displacement. Cooperating keeper lugs 524 and 525 (Figs. 97, 100 and 116), are provided on the clamp supporting member 512' and the platen cross bar 5, respectively, to hold said member rigid, in the normal position of the line spacing table 502. Cooperating stops 524' and 525', (Figs. 95 and 96), on the line spacing table 502' and rear bar 4 of the base, respectively, limit forward movement of said table in the normal position of the latter.

Secured by brackets 526 to the rear of the movable table 502, (Figs. 3 and 95 to 97), are cooperating fixed and movable carbon clamping bars 527 and 528, respectively, the latter pivoted, as shown in dotted lines, at 529, and tensioned by springs 530 to engage the former whereby a carbon sheet may be clamped to the rear of the line spacing table 502 with its front portion free and extending forwardly for easy manipulation by the operator. Beneath the line spacing table 502 a carbon reel 531, (Figs. 3 and 95), is suitably journaled, preferably in the side bars 2, and upon which a roll of carbon (not shown) may be mounted to be fed between said clamping bars as desired.

In the normal "loading" position of the movable table 502, the clamping bar 528 is movable to releasing position by operation of a carbon releasing lever 532 (Figs. 1, 95, 112 and 113). The latter is pivoted, as at 533, on the right hand side bar 2 of the base 1 to be conveniently grasped by the operator, and is operatively connected (Figs. 3 and 96) to said clamping bar 528 by a rod 534, and a bell crank 535, the latter pivoted to the side bar 2, as at 536, to overlie a crank arm 537 on the clamping bar 528, whereby the arm 537 is operative by the bell crank, but is free to move rearwardly with the table 502. A gravity latch 538 is pivoted at 539 on one side bar 2 to retain the carbon releasing lever 532 in position to hold the carbon clamping bar 528 released.

Adjacent the right hand edges of the tables 490 and 502 is a proof sheet carrier 540 (Figs. 95, 98 and 111 to 115) in the form of a slide mounted for movement, in line spacing direction, on laterally spaced tracks 541, one projecting from the adjacent side bar 2 and the other secured to the aforesaid bracket 499, (see Fig. 113), and to the rear bar 4. The tracks 541 are below the level of said tables and the right hand side bar 2 and a sufficient space is provided between the latter and said side bar 2 so that said carrier 540 is guided in its movement by said tables and bar 2. The usual studs 542 are provided on the proof carrier 540 for attaching a proof or like sheet of type having a perforated margin. A sheet retaining member 543 is pivoted in lugs 544 on said carrier 540 and tensioned by springs 545, (Figs. 95 and 114), to clamp the marginal edge of the proof or like sheet to the carrier.

*Line space mechanism*

The movable table 502 and the proof sheet carrier 540 are adapted to be moved simultaneously, step by step in line spacing direction by the motor 178 and mechanism driven thereby, as follows: a line space worm shaft 546, (Figs. 3, 15, 16, 95, 96 and 111–113), is mounted at the right hand side of the machine, below and parallel with the proof sheet carrier 540, to extend longitudinally of the base 1, in bearing brackets 547 on the right hand side bar 2. The line space worm shaft 546 is connected by beveled gears 548 and 549, respectively, to a line space drive shaft 550 journaled adjacent one end in a suitably secured bearing bracket 551 and having its other end projecting through an opening in the opposite frame side bar 2, (Fig. 16), and through a bearing 552 into a gear housing 553 secured at 554 (Figs. 16, 86 and 87) to the left hand side bar 2 subjacent the spindle 11' constituting the reduced and outwardly extended end of the left hand trunnion 11.

The line space drive shaft 550 is driven through the main drive shaft 187 which is connected in constant driving relation with said shaft 550, irrespective of the relative positions of the frame and table, as follows: Within the gear housing 191 (Figs. 15 and 16) and meshing with the gear 195 on the main drive shaft 187 is a gear 555 fast on a toothed clutch sleeve 556 freely rotatable on the spindle 11' and projecting outside the housing through a bearing sleeve 557 in the latter. The clutch sleeve 556 forms the driving element of a single revolution line space clutch, (Figs. 85 to 93), the driven element of which includes a clutch housing 558, a clutch dog 559 and spring 560 in said housing, all as in the case of the before-described general operator and the transfer restoring clutches, and a beveled gear 561 fast on the clutch housing 558. Journaled in the gear housing 553 is a line space jack shaft 562 (Figs. 15 and 16) having fast on its opposite ends beveled gears 563 and 564, respectively, one meshing with the gear 561 and the other meshing with a similar gear 565 fast on the line space drive shaft 550.

Associated with the movable table 502 is means for clutching said table to the line space worm shaft 546 to be fed thereby, such means including a vertically rocking clutch control bail 566 (Figs. 3, 96 and 105 to 108) pivoted at 567 to one of the brackets 505 of said table, and having a follower arm 568 adapted, upon movement of the bail in opposite directions, to engage and release said worm shaft, respectively. A spring 569 connected to said clutch bail and to an extension 570 of said bracket 505, as at 571 and 572, yieldingly retains said bail with its follower 568 engaged with the worm 546.

Secured at 573 to the aforesaid bracket 505 is a stationary latch carrier 574 having a latch 575 pivoted thereto, as at 576, to snap over the follower arm 568 of the clutch control bail 566, under the urge of a suitably arranged spring 575ᵃ, when said bail is in its release position and retain the bail 566 in such position. A slotted guide and stop arm 577 receiving the follower arm 568 extends from said carrier 574 and limits downward movement of the clutch control bail 566 under the urge of the spring 569.

In the normal or starting position of the table 502, the latch 575 is rendered ineffective by a latch releasing finger 578 engaging a lug 579 on the latch 575, the finger being slidably mounted on the inner face of a flange struck up intermediate the ends of a bracket 580 extending inwardly from the right hand side bar 2 by screws 581 passing through slots 582 in the finger for adjustment to accurately time the release of the latch 575 to coincide with the return of the line spacing table 502 to normal position.

Depending from the proof sheet carrier 540 (Figs. 111 to 115) is a vertical guide flange 583 adapted to travel in the space between the tracks 541, and terminating in a smooth bored guide sleeve 584 encircling and sliding on the line space worm shaft 546. Pivoted on the guide flange 583 at 585 is a vertically rocking dog 586 having a follower portion 587 adapted, upon movement of the dog 586 in opposite directions, to engage and to release said worm shaft 546, respectively. A spring 588 retains the dog 586 in such position that the follower engages thereon. A finger piece 589 on said dog projects upwardly through a slot in the proof-sheet carrier 540, to a point above the carrier to enable the dog to impart step-by-step rearward movement to the carrier, as hereinafter explained, and to enable the operator to manually release the proof sheet carrier 540 from said worm shaft 546 and shift said slide to vary the relation of the proof sheet to the bill sheet, as desired, and then clutch said slide to said shaft for line space movement with the line spacing table 502. Obviously, said carrier may be released to return the same to any desired position.

To accurately locate the movable table 502 and the proof sheet carrier 540 in line position, a notched disc 590 (Figs. 16 and 96) is fast on the line space worm shaft 546 and a locator dog 591 carrying a roller 592 is pivoted at 593 for movement by a spring 594 to engage said disk.

*The means for controlling line spacing*

Positioned at the left hand side of the machine (Figs. 1, 2, and 87 to 93) is a manually and automatically operative control means for initiating a line space operation including a line space key 595 located in front of the tilting frame 10 on the forward end of a rearwardly extending push rod 596 mounted to slide on one side member 14 of said frame 10 against the tension of a suitably arranged spring 596', (Figs. 2 and 92).

The push rod 596 is operatively connected at its rear end, as at 597, to a clutch control arm 598 freely mounted on the rock shaft 460 contiguous to the before-described electric switch control arm 486. It will be remembered that the switch control arm 486 and plunger 485 are operative for closing the circuit to energize the motor 178 independently of such operation by the carriage retracting bail 459. The clutch control arm 598 is designed, upon rearward movement of the line space key 595, to impart such independent operation to the switch control arm 486 and plunger 485, and at the same time, effect engagement of the clutch dog 559 with the toothed clutch sleeve 556 of the line space clutch. To this end, said arm 598 is provided with a lug 599 overlapping the switch control arm 486 to pick up the latter and move it in the proper direction, the lug 599 forming such a connection between these two elements as will enable the operation of the switch control arm 486 by the carriage retracting bail 459 without affecting the clutch control dog 559.

Associated with the line space clutch is a clutch trip member 600, (Figs. 85, 87, 88, 91–93), rocking on a fixed stud 601 into clutch engaging and disengaging positions, respectively, in the latter of which, the clutch dog 559 is disengaged from the toothed clutch sleeve 556, as will be clear from Figs. 85 and 92. A spring 602 connected to one arm of the said trip member 600 and to a fixed stud 603, yieldingly retains said trip member in normal clutch-disengaging position against a stop 604.

A trip dog 605, having a lug 606, is pivoted, as at 607, on the clutch control arm 598, and in its normal position engages said lug with a laterally extending ear 608 on another arm of the trip member 600, whereby, when said arm 598 is operated by the line space key 595, the trip member 600 will be rocked in opposition to the spring 602 to release the clutch dog 559 for actuation to its clutch-engaging position (Figs. 88, 91 and 93). A spring 609 connecting the trip dog 605 to an ear 610 on the clutch control arm 598, urges the upturned tail of said dog into normal position against a stop 611 on said arm. A pin 612 on the rotatable housing 558 contacts the trip dog 605 shortly after the commencement of rotation of the housing, to shift the dog to a position in which the lug 606 frees the trip member 600 for return by its spring 602 to normal position to disengage the dog 559 from said clutch ratchet 556 at the end of a single revolution.

The before-described line space control mechanism is automatically operative by retraction of the carriage 16. For this purpose, the carriage 16 is provided with a lug 613 adapted, when said carriage is retracted to its extreme left hand position, to engage and cam a line space lever 614 pivoted, as at 615, on the tilting frame 10 and operatively connected to the push rod 596 to move the same rearwardly, and thereby automatically effect the operations previously described as consequent to such movement of said rod. To permit operation of the line space key 595 in the event that the line space lever 614 becomes jammed, a yielding connection between said lever and the push rod 596 is provided comprising a slot 616 in the former, a stud 617 on the latter, and a spring 618 suitably connecting said lever and rod.

FRAME TILTING AND LATCHING MEANS

The tilting frame 10 is constantly urged upwardly, about the trunnions 11, by a pair of frame tilting motor springs 619 (Figs. 1 and 2) located at opposite sides of the base 1, respectively, and each having one end secured to the adjacent side bar 2 by a stud 620 and its other end secured to a lug 621 on the frame 10, as shown in dotted lines in Fig. 2. Mounted in the side bars 2 is a transversely extending rock shaft 622 having fast on its opposite ends a pair of hooked frame latches 623, respectively, (Figs. 1, 2, 95, 98, 124 and 128) adapted to be rocked into latching and unlatching positions by movement of the shaft in opposite directions, respectively, and hooking, in their latching position, over a pair of keeper plates 624 on the frame 10 to latch the latter against tilting movement from its normal position. A spring 625, (Fig. 126), suitably connected to the transverse frame bar 3 and to a crank arm 626 fast on said shaft, urges the latter in a direction to normally retain the latches 623 in frame-latching position. Stop screws 627, (Fig. 128), adjustable on the rail 12 of the frame 10 contact cushioned stop lugs 628 on the side bars 2 of the base 1 to establish the normal position of the tilting frame 10. One of the latches 623 is provided with an extended finger portion 629 for manually releasing said latches. A hand rail 630, (Figs. 1–3), is secured to the front rail 12 of the tilting frame 10 for convenient manipulation of the frame by the operator. Cooperating rear stops 631 and 632 on the brackets 15 and side bars 2, respectively, limit upward tilting movement of the frame 10. The usual depressor plate 633, (Fig. 3), may be secured in any suitable manner to the front rail 12 of the frame 10.

*Means for automatically releasing tilting frame*

Means are provided for automatically unlatching the tilting frame 10 to release the same by retraction of the carriage 16, and also under the control of a "Frame Release" key 634, (Figs. 1-4 and 121), mounted on a key lever 635. Referring now particularly to Figs. 1, 121 to 124, the key lever 635 is pivoted on the carriage 16 alongside the lever 471 of the "carriage return" key 470, on the pivot stud 472 of the latter. A stud 636 on said lever 635 enters a slot 637 in the lever 470 to connect said levers together so that the "frame release" key 634 operates the "carriage return" key 470 to effect retraction of the carriage, whereas the "carriage return" key 470 is independently operative. A suitably arranged spring 638 tensions the "frame release" key lever 635.

Adjacent and parallel with the rear track rail 13 of the tilting frame is a transversely extending tilting frame release rod 639 endwise movable in an eye 640 projecting upwardly from the right hand end of the rear track rail, and operatively connected, as at 641, to the upper end of a lever 642 rocking on a stud 643 on said rail 13. A spring 644 connected to a bracket extension on the rail 13, as at 645, and to the lever 642, as at 646, tensions the tilting frame release rod 639 against movement in the direction of retraction of the carriage 16. A link 647 connects the lever 642 to a lever 648 pivoted on the frame 10, as at 649, and operatively related, in the normal position of said frame 10, to a push rod 650, sliding in the base 1, to press the rod 650 inwardly when the tilting frame release rod 639 is moved in the direction of retraction of the carriage 16. The push rod 650 is connected by a crank 651 to a shaft 652 (see also Figs. 97 and 98) mounted in bearings 653 on the frame 1 to be rocked in one direction by said push rod 650 against the tension of a spring 654. Rocking movement of the shaft 652 in said direction rocks the shaft 622 in a direction to move the latches 623 to unlatching position through the medium of a sleeve 655 loose on the shaft 622, cooperating crank arms 656 and 657 fast on said sleeve and the shaft 652, respectively, and a stud 658 on the arm 656 engaging the crank arm 626 on the shaft 622. The stud 658 is so related to the crank arm 626 that the shaft 622 may be independently rocked to manually release the tilting frame 10, as previously described. A suitably attached spring 658' tensions the sleeve 655 against movement by the shaft 652 and restores the sleeve to its normal position.

The tilting frame release rod 639 is moved in the direction of retraction of the carriage 16, as follows: Pivoted to a hanger on the carriage 16, as at 659, (Figs. 121-123, 129 and 130), is a coupling dog 660 adapted to be rocked into effective and ineffective positions, respectively, relatively to a coupling block 661 adjustably mounted on the tilting frame release rod 639, and in its effective position, contacting said block during retraction of the carriage, to couple said release rod 639 to said carriage 16 for movement therewith. A latch 662 is pivoted to the hanger on the carriage 16, as at 663, for cooperation with shoulders 664 and 665, respectively, on said dog 660, and is connected to the latter by a spring 666, to yieldingly latch the dog 660 in either of its two positions, and to enable said latch to rock said dog to effective position. A draw rod 667 connected at its lower end to the dog, has its upper, off-set end loosely entered in a slot 668 in the "Frame Release" key lever 635 to enable the aforesaid operation of the latch and permit the return of the lever 635 under the influence of its spring 638, while the dog 660 remains latched in effective position.

The coupling dog 660 is automatically returned to ineffective position to uncouple the frame release rod 639 from the carriage 16 when the latter has been fully retracted, by a cam shoe 669 on the adjustable left hand margin stop 670 of the machine, which is wiped by a pin 671 on said dog as the carriage completes its retracting travel. When said tilting frame release rod 639 has been thus uncoupled, the springs 644, (Fig. 1), 654, (Fig. 124), and 625, (Fig. 126), will return to their normal positions the before-described parts which have been operated by said rod.

As is usual in this type of machine, the margin stop 670, (Figs. 1, 2, 121 and 123), is mounted on the carriage feed rack 38 and may be set to different positions to vary the extent of retraction of the carriage 16 according to different marginal requirements, by a detent means 672 operative by the thumb screw 673 to interlock with the teeth on said rack. As featured in my co-pending application, Serial No. 570,568, filed October 23rd, 1931, now U. S. Letters Patent, No. 1,992,940, issued February 5, 1935, the feed rack 38, in the present instance, is slotted at 674 for limited endwise movement, and connected to a dash pot 675 (Fig. 1), for shock absorbing purposes, by the link 676 and intermediate connections designated as a whole 677.

The tilting release frame rod 639 is toothed, as at 678, (Figs. 121-123), and the coupling block 661 is equipped with a detent dog 679 urged by a spring 680 to interlock with said teeth, whereby said block may be set in proper relation to the margin stop 670 to effect automatic release of the tilting frame 10 and subsequent uncoupling of the release rod 639, by retraction of the carriage 16 to different marginal positions.

MEANS FOR RELEASING WORK CLAMPING MEANS

Associated with the before-described work clamping member 509, (Figs. 99-104 and 116-120), is means for moving said member to releasing position to release the work sheet either automatically or manually as desired and in any position of the table 502. Preferably a clamp releasing shaft 681, (Figs. 2, 99, 100, 104 and 116) having fast thereon oppositely disposed operating and clamp-releasing arms 682 and 683, respectively, is journaled in and projects through the base side bar 2 adjacent the clamping member 509 to lift said member 509 to a release position by means of a roller 684 on said arm 682 engaging a longitudinally extending flange 685 on the lower edge of said work clamping member, the flange 685 being of the requisite length for engagement by said roller in any position of the table 502. The shaft 681 and arms 682 and 683 are held in normal position, with the roller 684 engaging said flange, by a stop lug 686 on the arm 682 which rests upon a stop pin 687 on said side bar 2, a suitably arranged spring 688 tensioning said shaft 681 and arms against operation in a direction to lift said member 502. Connected by a link 689 to the outer arm 683, (Figs. 2 and 116), of the shaft 681 is a shaft-operating rocker 690 pivoted on a stud 691 on the side bar 2.

Mounted on the stud 691 is a rocker operating lever 692 having a lost motion connection with said rocker 690 through shoulders 693 on said lever and a stud 694 on said rocker, whereby the lever 692 may be set in either of two positions, in one of which it is effective to pick up the rocker 690 and rock the shaft 681 to lift the work clamping member 590 against the tension of the spring 519. As shown in full and in dotted lines in Fig. 116, the lever 692 is located in the path of a stud 695 on the tilting frame 10, whereby, when the frame is tilted, the lever 692 is automatically operated to cause its upper shoulder 693 to strike the stud 694 on the rocker 690, and operate the linkage connecting the rocker and the shaft 681, to lift said clamping member 590 and release the work. In the other set position of said lever 692, as shown in dot and dash lines in Fig. 116, the lug 695 passes idly thereover and the tilting frame 10 is ineffective to release the work. A hand lever 696 (see also Fig. 95) is pivoted at 697 on the frame bar 2 and connected to said lever 692 by a rod 698, whereby the lever 692 may be set into either of its two positions. A spring 699 connected to studs 700 and 701 on the rocker 690 and lever 692, respectively, yieldingly retains the latter in either of its set positions. Obviously, the work may be manually released by operation of the hand lever 696 when the tilting frame 10 is in normal position, or partly tilted, or in any position where the lug 695 does not interfere with such operation.

MEANS FOR AUTOMATICALLY RELEASING THE MOVABLE TABLE FROM THE LINE SPACE MECHANISM

It will be seen that when the carriage 16 has been retracted to automatically unlatch and release the tilting frame 10, the work sheet or sheets may be released as a result of subsequent tilting of the frame 10, and as determined by the position of the hand lever 696.

Simultaneously with the automatic release of the tilting frame 10, and hence, just prior to the automatic release of the clamping member 509, 511 and the work sheet, the movable table 502 is disengaged from the line space worm shaft 546 for return by its motor springs 506. Preferably, this operation is accomplished by disengaging the clutch bail 566, (Figs. 96, 105, 106, 108 and 124) from said shaft 546 through the medium of a bell crank lever 702 pivoted at 703 (Fig. 124), to the upturned inner end of the bracket 580, a grooved roller 704 on one arm of the bell crank lever engaging said bail, and a link 705 connecting the remaining arm of said lever to a crank 706 fast on the sleeve 655, whereby when the sleeve is rocked to release the latches 623 said bail 566 is rocked against the urge of its spring 569 to disengage the follower 568 from said shaft 546. A stop screw 707 on the arm 706 engaging a suitable part of the base 1 establishes the normal position of the lever 702, link 705 and sleeve 655. The bail 566 is of sufficient length to maintain contact with the roll 704 in any of the positions to which the line spacing table 502 may be fed.

WORK NOTCHING MECHANISM

The machine is equipped with work notching mechanism for forming a notch in a marginal edge of the work sheet in line with the last line of printing thereon.

The work notching mechanism (Figs. 95, 121, 122, 129 and 130) includes a notching shaft 708 mounted to rock in bearing brackets 709, on one side bar 2 of the base 1, alongside the left hand edge of the movable table 502, the shaft having fast thereon in line with the printing line of the machine, a notching blade 710 overhanging, in the normal position of the mechanism, the left hand marginal edge of the work sheet. Cooperating with the notching blade 710 is a notching die member 711 projecting from one of the bearing brackets 709. The die member 711 is located in the space between the platen 488 and said side bar 2, which as previously mentioned, is provided by spacing said platen from said bar. The die member underlies and supports the marginal edge of the work sheet for the notching operation. A stop arm 712 on the notching blade 710 and a stop screw 713 on the die member 711 establish the normal position of said blade and the shaft 708. A spring 714 connected to the stop arm 712 and to the die member 711, as at 715, tensions said blade and shaft against movement from normal position.

The shaft 708 is rocked in the proper direction from normal position by retraction of the carriage 16 to effect the notching operation. The means for accomplishing this operation includes the before-described coupling dog 660 which is provided with an arm 717 adapted, in the effective position of said dog, and when the carriage 16 is retracted, to operate a rocker member 718 pivoted, as at 719, to the back of the rear rail 13 of the tilting frame 10 and retained in normal position against a stop 720 by a spring 721. The rocker member 718 is operatively connected to a crank arm 722 fast on the shaft 708 by a slot 723 in said rocker receiving a pin 724 on said crank arm whereby a permanent connection is provided between said shaft and rocker in any position of the frame 10. The rocker member is so located that the notching operation occurs just prior to the automatic release of the tilting frame 10. Obviously, since the coupling dog 660 is under control of the "frame release" key 634 and the notching mechanism is operated through the medium of the arm 717 on said dog, the notching mechanism is also under control of the frame release key 634.

MEANS FOR LOCATING THE WORK SHEET

Upstanding from the fixed clamping member 512' is a locator lug 725, (Figs. 116, 118 and 119), for cooperation with the notch formed in the marginal edge of the work sheet. The position of the locator lug 725 with relation to the platen is such that when a notch is engaged therewith the work sheet is in position for the printing of the next line.

The foregoing constitutes a detailed description of a preferred embodiment of my invention, but right is herein reserved to such changes and modifications as fall fairly within the scope of the appended claims.

What I claim is:

1. In a machine of the class described, the combination with a base; and work-supporting and feeding means mounted therein; of a frame mounted on the base above the work-supporting and feeding means, and arranged to tilt relatively thereto to cover and uncover the work-supporting means; a carriage mounted to travel on, and tiltable with the frame; a totalizer mounted on the frame to tilt therewith; differential drive mechanism mounted on the carriage to traverse the totalizer; a motor fixed on the frame to tilt therewith; and connections between the motor, and the carriage, and the differential drive mechanism to maintain effective relation between these elements in any position of the frame and carriage.

2. In a machine of the class described, the combination with a series of value keys; a totalizer, and a master wheel relatively movable in axial direction, to enable the operation of the totalizer wheels seriatim by the master wheel; of differential mechanism normally ineffective stops having constant predetermined values associated with the respective keys of corresponding values to control the differential mechanism; means to shift the stops to their effective positions upon actuation of the appropriate keys; means to latch the stops in their normal ineffective positions; tripping means operable by the keys to free the stops to the action of their shifting means; a motor to drive the differential mechanism and master wheel and stop-restoring means likewise driven by the motor.

3. In a machine of the class described, having value keys; a totalizer; and a master wheel to operate the totalizer; the combination of a motor-driven gear having graduated teeth; a selector gear differentially positioned relatively to the graduated toothed gear; means to advance the selector gear relatively to the graduated toothed gear; means to normally retain the selector gear disengaged from the graduated toothed gear; normally ineffective stops to variously determine the advance of the selector gear relatively to the graduated toothed gear, the stops being associated with the keys of corresponding value; automatic means released for action by the keys to shift the stops to their effective positions upon actuation of the keys; means operated by the automatic means to trip the selector gear-retaining means to enable the selector gear to advance until arrested by the set stop; and motor-driven means to restore the selector gear and the set stop to their normal ineffective positions, and return the selector gear-retaining means to its effective position.

4. In a machine of the class described, having a totalizer; and a series of keys; the combination of normally cocked stops of constant values, each associated with its appropriate key; means to latch the stops in their cocked positions; means to actuate the totalizer, under control of the stops; a motor to drive the totalizer actuator; a normally open circuit between the motor and a source of power; means operable by a key to trip its corresponding stop latch and close the motor circuit; means operable upon the tripping of the latch to set the stop to effective position; and motor-operated means to restore the set stop to its ineffective position and to open the circuit.

5. The combination with value keys; and a register, including denominational wheels; of means to effect differential rotation of the wheels according to the values of the actuated keys, including a motor; cooperating, relatively shiftable drive and driven gears, one of which is provided with graduated teeth, to enable differential rotation of one by the other; connections between the motor and the drive gear; and settable stops of constant values to variously determine the extent of relative shifting of the gears, and hence, the values to be registered on the denominational wheels; means operable upon operation of the corresponding keys, to automatically set the corresponding value stops to their effective positions; and means under control of the automatic, value stop-setting means, to control the connection between the motor and the drive gear to enable the motor to actuate the relatively shiftable gearing, and the denominational wheels.

6. The combination with value keys; and a register, including denominational wheels; of means to effect differential rotation of the wheels according to the values of the actuated keys, including a motor; co-operating, relatively shiftable drive and driven gears, one of which is provided with graduated teeth, to enable differential rotation of one of the other; connections between the motor and the drive gear; settable stops of constant values to variously determine the extent of relative shifting of the gears, and hence, the values to be registered on the denominational wheels; means individual to and operable upon operation of the corresponding value keys, to automatically set such value stops to their effective positions; and a motor-control bail operable by the respective individual automatic stop-setting means.

7. The combination with value keys; and a register, including denominational wheels; of means to effect differential rotation of the wheels according to the values of the actuated keys, including a motor; co-operating, relatively shiftable drive and driven gears, one of which is provided with graduated teeth, to enable differential rotation of one by the other; connections between the motor and the drive gear; settable stops of constant values to variously determine the extent of relative shifting of the gears, and hence, the values to be registered on the denominational wheels; means, controlled by the corresponding keys, to automatically set such value stops to their effective positions; and a power operated bail to restore a value stop to its ineffective position.

8. In a machine of the class described, having value keys; a register, including denominational wheels; means to differentially rotate the wheels according to the values of the keys selected, including a motor; co-operating, driving and driven gear members, one of which is shiftable transversely of the other; and connections between the motor and the drive gear; the combination of settable value stops to variously limit such relative movement of the cooperating gears; and means, operable upon operation of the corresponding value keys, to set the value stops, the stops being mounted for limited movement under the impact of the shiftable gear member thereagainst to control the driving connections between the motor and the driving gear.

9. In a machine of the class described, having value keys; a register having denominational wheels; means to differentially rotate the wheels according to the values of the keys selected, including a motor; cooperating driving and driven gear members, one of which is shiftable transversely of the other; and connections between the motor and drive gear; the combination of means, under control of the value keys, to shift the shiftable gear member relatively to its cooperating gear member; and means controlled by the shiftable gear in its shifting travel to control the connections.

10. In an adding machine, having value keys; a register, including denominational wheels; means to effect differential rotation of the wheels according to the values of the keys, including a motor; a graduated driving gear, and a selector gear relatively shiftable axially to effect differential rotation of the selector gear; connections between the motor and the driving gear; and a normally open circuit for the motor; the combination of settable value stops to determine the extent of relative axial shift of the gears; and corresponding value stop-setting mechanism automatically operable upon operation of the appropriate value keys, to set the selected stops, and to close the motor circuit.

11. The combination with manipulative value keys; a traveling register, including denominational wheels; and a master wheel relatively to which the register travels step by step; of means to effect differential rotation of the master wheel to operate the denominational wheels successively according to the values of the selected keys, including relatively shiftable driving and driven members; settable value stops to variously arrest the extent of such relative shifting movement between the driving and driven members; corresponding value stop-setting mechanism automatically shifted to effective position, upon operation of the appropriate value keys, and a motor under control of the value stop-setting mechanism to actuate the driving member.

12. In a machine of the class described, having value keys; a register, including denominational wheels; means to differentially rotate the wheels according to the values of the keys, including a motor; co-operating driving and driven gears, one of which is axially shiftable relatively to the other for differential rotation; and connections between the motor and the drive gear; the combination of mechanism automatically shiftable to effective position, upon operation of the keys, to limit the relative axial travel of the gears; a source of power for the motor; and means controlled conjointly by the automatically shiftable mechanism and by the relatively shiftable gear to render the motor effective.

13. In a machine of the class described, having value keys; a register, including denominational wheels; means to effect differential rotation of the wheels according to the values of the selected keys, including a motor; cooperating driving and driven gears, one of which is variously shiftable across the other; and means to shift the gear; the combination of settable value stops to variously arrest the shiftable gear relatively to its cooperating gear; corresponding stop-setting means under control of the appropriate value keys; means controlled by the stop-setting means to shift the shiftable gear; and driving connections between the motor and the driving gear, under control of the shiftable gear.

14. In a machine of the class described, having value keys; a register, including denominational wheels; and means to effect differential rotation of the wheels, according to the values of the keys selected, including a general operator and a selector relatively shiftable, the general operator having a single cycle to rotate the selector differentially according to the relative positions of the general operator and the selector; the combination of settable value stops to variously arrest the selector relatively to the general operator; means to effect such relative shifting of the selector; means, released upon operation of the keys, to automatically set a value stop; and means, in turn, under control of the stop-setting means, to normally restrain the means which effects shifting of the selector, and releasable coincidently with the automatic setting of a stop.

15. The combination with value keys; and a register, including denominational wheels; of means to effect differential rotation of the wheels according to the values of the keys, including relatively shiftable differential members; means to effect such relative shift of the members; normally ineffective value stops settable to effective position, to variously determine the extent of relative movement of the differential members; means under control of the appropriate keys, to set the corresponding stops; retaining means to normally restrain from operation the means to effect relative shifting of the differential members; means operable by a value stop as it is set to effective position, to release the retaining means and free the restrained means for operation; and means operable upon the releasing means to cause it to restore the set value stop to its ineffective position.

16. The combination with value keys; and a register, including denominational wheels; of means to effect differential rotation of the wheels according to the values of the keys, including relatively shiftable differential members; means to effect a differential relative shift between such members; normally cocked value stops, settable to variously determine the extent of relative movement of the differential members; a motor; a source of power connected therewith; means individual to the corresponding value stops, and rendered effective by the respective keys, to set the stops; and means common to the respective individual means, to control the connection between the source of power and the motor.

17. The combination with value keys; and a register, including denominational wheels; of means to effect differential rotation of the wheels according to the values of the keys, including relatively shiftable differential members; means to effect a relative shift between such members; value stops associated with their respective value keys, to variously determine the extent of relative movement of the differential members; a motor; connections between the motor and a source of power; means to normally maintain the connections open; means, under control of the value keys, to close the connections; and stop-restoring means, operable by the motor, to return the stops to normal and to free the last-named means for operation by the means which normally maintains the connections open irrespective of the keys.

18. The combination with value keys; and a register, including denominational wheels; of means to effect differential rotation of the wheels according to the values of the keys, including relatively shiftable differential member; means to effect a relative shift between such members; settable value stops to variously determine the extent of such relative movement of the differential members; a normally de-energized motor for actuating the differential members; normally ineffective connections between the motor and the differential members; stop-setting means under control of the respective keys; and means controlled by the keys through the stop-setting mechanism to enable energization of the motor, and to connect it mechanically with the differential members.

19. The combination with value keys; and a register, including denominational wheels; of a general operator; a gear shiftable transversely thereof; means to shift the gear; a field of value stops to variously arrest the gear relatively to the general operator, each stop under control of its individual value key; and means to positively restore a value stop irrespective of the position of its key, including a bail common to the field of stops, and actuated by the general operator.

20. The combination with value keys; and a register, including denominational wheels; of a general operator; a gear shiftable transversely thereof; means to shift the gear in one direction; a field of value stops to variously arrest the gear relatively to the general operator, each stop under control of its individual value key; stop-resetting mechanism, including a cam on the general operator, and a bail common to the stops to restore the latter, and shiftable into the path of the cam by any stop as it is set.

21. The combination with value keys; and a register, including denominational wheels; of a general operator; a gear shiftable transversely thereof; means to shift the gear in one direction; a field of value stops to variously arrest the gear relatively to the general operator, each stop under control of its individual value key; stop-restoring mechanism, including a cam on the general operator, and a stop-restoring bail common to the field of stops, and operable by the cam; and restraining mechanism for the shiftable gear, operable under control of the stop-restoring bail.

22. The combination with value keys; and a register, including denominational wheels; of a general operator; a gear shiftable transversely thereof; means to shift the gear; a field of value stops to variously determine the extent of shift of the gear relatively to the general operator, each stop under control of its individual value key; gear-retracting mechanism operable by the general operator; stop-restoring mechanism, including a cam on the general operator, and a stop-restoring bail shiftable into the path of the cam by the setting of any stop; and restraining mechanism to normally latch the gear in its home position, and controlled by the stop-restoring bail to latch and to release the gear.

23. The combination with value keys; and a register having denominational wheels; of means to differentially rotate the wheels according to the values of the keys, including settable value stops to control the extent of differential rotation imparted to the wheels; stop-setting members displaceable under control of the corresponding keys; means, including a motor, to actuate the differential means; a motor control member common to the stop-setting members, and shiftable thereby; means to retain the displaced stop-setting members against return, and hence maintain the motor-control member in shifted position; and means to return a set value stop and its stop-setting member to release the motor control member for return to normal position.

24. The combination with a register having denominational wheels, and a register actuator, relatively shiftable to enable the actuation of the denominational wheels successively; of settable value stops; normally cocked stop-setting members associated with the respective value stops; a latching device engaged by the stop-setting members; value keys to trip their respective stop-setting members from the latching device; means to temporarily retain the stop-setting members in their tripped positions; a motor to actuate the register actuator; a motor control member common to the stop-setting members and operable in one direction by any of value keys; the stop-setting members, when tripped, adapted to retain the motor control member in its key-operated position; means to restore the motor control member to normal; and means to return the value stops and the stop-setting members to position to enable the restoring means for the motor-control member to relatch them in cocked position.

25. In a calculating machine, including a register having denominational wheels; and normally idle stops of constant values to control the extent of differential rotation imparted to the wheels; the combination of normally latched stop-setting members; value keys to trip the corresponding stop-setting members for operation; rocking bails; links to releasably connect the bails and the keys; releasable tripping members to normally connect the bails with their respective stop-setting members; and means to effect the automatic disconnection of the tripping members and the stop-setting members upon tripping the stop-setting members for operation.

26. In a calculating machine, including a register having denominational wheels; and normally idle stops of constant values to control the extent of differential rotation imparted to the wheels; of normally latched stop-setting members; value keys to trip the corresponding stop-setting members for operation; rocking bails; links to releasably connect the bails and the keys; tripping members to releasably connect the bails with their respective stop-setting members; stationary retaining means; the tripping members having extensions to maintain wiping engagement with the retaining means to insure disconnection of the tripping members and the stop-setting members as the stop-setting members are tripped for operation.

27. In a calculating machine having value keys; a register; and a master wheel to operate the register, the register and master wheel being relatively shiftable; the combination of means to effect differential rotation of the master wheel according to the values of the keys, including key-selected, settable stops, each stop having a constant, predetermined value, and automatically operable to its set position upon operation of its appropriate key.

28. In a calculating machine having value keys; a register; and a master wheel to operate the register, the register and master wheel being relatively shiftable denominationally; the combination of means to effect differential rotation of the master wheel according to the values of the keys, including a stationary field of normally idle settable stops, each stop having a constant predetermined value corresponding with the value of its individual key; means to shift the stops to their effective positions; means individual to the respective stops to latch them in their ineffective positions; and key-controlled means appropriate to the respective keys to trip the latching means.

29. In a calculating machine having value keys; a register; and a master wheel to operate the register, the master wheel and register being relatively shiftable denominationally; the combination of means to effect differential rotation of the master wheel according to the values of the keys, including a stationary field of settable stops, each stop having a constant predetermined value corresponding with the value of its individual key; a drive member having a series of graduated teeth; and a gear to transmit motion from the drive member to the master wheel and differentially arrested under control of the stops, relatively to the graduated drive member.

30. In a writing-computing machine having value keys, and a register; the combination of means to operate the register differentially, including relatively shiftable driving and driven elements; means to effect such relative shift; a plurality of value key-controlled settable stops having fixed predetermined values corresponding with the values of their co-related keys, to variously arrest one of the elements in its travel relatively to the other, prior to the operation of the register, and thereby control the extent of movement to be imparted to the register; normally latched, automatically operable stop-setting mechanisms individual to the respective stops to set the latter to their effective positions; and key-operated, tripping devices between the keys and their appropriate stop-setting mechanisms to release the corresponding stop-setting mechanisms for automatic operation.

31. In a machine of the class described having value keys; a register; and a master wheel for operating the register; the combination of means to effect differential rotation of the master wheel according to the values of the keys, including value stops, each stop having a constant, predetermined value, and means to automatically set a stop from ineffective to effective position, respectively, upon operation of its appropriate key; a motor to drive the master wheel; and mechanism operable by the motor to reset the value stops to ineffective positions.

32. In a machine of the class described having value keys; a register; and a master wheel to operate the register; the combination of means to effect differential rotation of the master wheel according to the values of the keys, including value stops, each stop having a constant, predetermined value, and means to automatically set a stop from ineffective to effective position upon operation of its appropriate key a motor; mechanism operable by the motor to reset the value stop to its ineffective position; and motor-controlling mechanism rendered effective to start and stop the motor by the setting and resetting of any of the value stops, respectively.

33. In a machine of the class described, having value keys; and a register, including denominational wheels; the combination of means to effect differential rotation of the wheels according to the values of the keys, including cooperating driving and driven gears, one of which is movable axially relatively to the other, to different positions for differential rotation by the other; means to effect such axial movement; mechanism automatically shiftable upon operation of the keys, for limiting axial movement of the movable gear in said positions; a motor; means controlled by the automatically shiftable mechanism to control the motor; and driving connections between the motor and the driving gear controlled incident to and as a result of the axial movement of the movable gear.

34. In a machine of the class described, having value keys; and a register, including denominational wheels; the combination of means to effect differential rotation of the wheels according to the values of the keys, including cooperating driving and driven gears, one of which is axially shiftable relatively to the other, to different positions for differential rotation by the other; means to effect such relative shift; settable value stops for limiting axial movement of the movable gear; stop-setting mechanism, automatically shifted upon operation of the appropriate keys; an electric motor; a circuit maker and breaker for said motor; means controlled by the automatic stop-setting mechanism to control the circuit maker and breaker; and driving connections between the motor and the driving gear, including a clutch controlled incident to and as a result of the axial travel of the movable gear.

35. In a machine of the class described, having value keys, and a register, including denominational wheels; the combination of means to effect differential rotation of the wheels according to the values of the keys, including cooperating drive and driven gears, one of which is axially shiftable relatively to the other, to different positions for differential rotation by the other; a travelling carriage for moving the shiftable gear axially; means to shift the carriage; value stops automatically set, upon operation of the appropriate keys, to variously arrest the carriage; means, including a motor, to rotate the drive gear; and means operated by the impact of the carriage against a set stop to render the motor effective.

36. In a machine of the class described, having value stop controlling keys; a register; and a rotatable actuator for said register; the combination of means to rotate the actuator differentially according to the values of the keys, including a gear axially movable to different positions; means to move the gear axially; a general operator having a single revolution cycle of movement to rotate the gear differentially in said different positions; settable value stops to variously arrest the axial movement of the gear; stop-setting mechanism automatically operative, upon operation of the keys; a normally ineffective motor to rotate the general operator; and means to render the motor effective to rotate the general operator through said single cycle of movement, and controlled conjointly by the stop-setting mechanism, and by the gear in its axial movement to said different positions.

37. In a machine of the class described, having value keys; and a register; the combination of means to effect differential operation of the register according to the values of the keys, including a gear axially movable to different positions; means to advance the gear axially; means to rotate the gear differentially in said different positions, including a motor; a series of stops, any of which is settable to intercept the axially movable gear; stop-setting mechanism, including normally cocked stop-setting members automatically shiftable in one direction to their effective positions; means operative by the appropriate keys to trip the stop-setting members for automatic movement; and motor-controlling means operated by the members as they are tripped.

38. In a machine of the class described, having value keys; and a register; the combination of means to effect differential operation of the register according to the values of the keys, including a gear axially movable to different positions; means to advance the gear axially; means to rotate the gear differentially in said positions; a series of stops, any of which is settable to intercept the axially movable gear; stop-setting mechanism, including normally latched stop-setting members releasable by movement in one direction, to enable them to automatically shift in another direction to set the stops; means operative by the appropriate keys to release the members for such automatic movement; means operable by the gear-rotating means to reset the stops, and return the members towards their latched positions; and means to relatch the members after their return.

39. In a machine of the class described, having value keys; and a register; the combination of means to effect differential operation of the register according to the values of the keys, including a gear axially movable to different positions; means to advance the gear axially; means to rotate the gear differentially in said positions, including a motor; a series of stops settable to intercept the axially movable gear; stop-setting mechanism, including normally latched stop-setting members releasable by movement in one direction, to enable them to automatically shift in another direction to set their corresponding stops; means operative by the gear-rotating means to reset the stops, and to return the members towards their latched positions; and motor-controlling means, including a bail operated by the members, as they release from their latched positions, to start said motor, and to re-latch the members after their return.

40. The combination with value keys; and a register, including denominational wheels; of a general operator; a gear axially shiftable transversely thereof; means to shift the gear in one direction; a field of value stops, each stop settable only under control of its respective value key, to variously arrest the gear relatively to the general operator; gear-retracting and stop-restoring mechanisms operable by the general operator; and means to arrest and latch the gear in its retracted position against axial movement.

41. The combination with value keys; and a register, including denominational wheels; of a general operator; a gear shiftable transversely thereof; means to shift the gear in one direction; a field of value stops, each stop settable under control of its respective value key, to variously arrest the gear relatively to the general operator; and gear-retracting and stop-restoring means operable by the general operator notwithstanding retention of the key in operated position.

42. In a machine of the class described, having value keys; a totalizer having a plurality of wheels; and a master wheel shiftable denominationally of, for operating the totalizer; the combination of means to effect differential rotation of the master wheel according to the values of the keys depressed, including relatively shiftable drive and driven members to differentially rotate the master wheel, and stop members having constant, predetermined values; and means to automatically and selectively set the stops under control of keys of corresponding values to variously limit the extent of relative movement of the drive and driven members and thereby determine the amount to be registered on the totalizer.

43. The combination with a totalizer, including denominational wheels; and actuating means to turn the respective wheels; of means variously adjustable from normal position, to differentially determine the extent of rotation imparted by the actuating means to the denominational wheels; means operable to restore the differential determining means to normal position; value keys to control the extent of adjustment of the differential determining means; and means to deprive the keys of their control of the differential determining means immediately upon initiating an operation thereof, to enable restoration of the differential determining means irrespective of the positions of the keys.

44. In a computing machine, including a totalizer having a plurality of denominational wheels; the combination of an actuator therefor; shiftable means to differentially determine the amount to be registered on any wheel of the totalizer; keys to control the differential determining means; the differential determining means operable to deprive the keys of their control thereof; and means to restore the differential determining means irrespective of the position of an operated key, to enable a key upon its return to normal to re-assume its control thereof.

45. In a computing machine; including a totalizer having a plurality of denominational wheels; the combination of an actuating means for the wheels; differential means operable to determine the extent of rotation imparted by the actuating means to the totalizer; value keys, depression of which initiates operation of the differential determining means; means to position the differential determining means according to the values of the keys depressed, and to deprive the depressed keys of their control of the differential determining means; and means to restore the differential determining means to normal at the end of a machine cycle, notwithstanding continued depression of a key, to enable the key, upon return to normal, to re-establish its control of the differential determining means.

46. In a computing machine, having differential mechanism; and stops to variously arrest the mechanism; the combination of means to shift the stops to effective position; keys to control the stop-shifting means, and automatically disengageable therefrom consequent to exercising control thereof; and means operable to restore the stops and stop shifting means notwithstanding continued depression of a key, to enable the re-engagement of the depressed key therewith upon its return to normal.

47. In a writing-adding machine, having a totalizer and a master wheel, adapted for relative movement; numeral keys; and means to effect the differential rotation of the master wheel according to the value of the numeral key depressed, including a stepped gear and a co-acting gear adapted for relative axial adjustment; the combination of normally idle stop means releasable by their corresponding numeral keys to automatically assume effective positions in the path of the axially adjustable gear; means released by a stop means in moving to its set position, to shift the axially movable gear to a position determined by the set stop means; and means rendered effective by the stop means, under control of the axially movable gear, to impart a single rotation to the stepped gear.

48. In a writing-adding machine, having a totalizer, and a master wheel adapted for relative movement; numeral keys; and means to effect the differential rotation of the master wheel according to the value of the numeral key depressed, including a stepped gear, and a co-acting gear mechanism adapted for relative axial adjustment; the combination of drive means partially controlled by the keys, to impart a single rotation to the stepped gear; and stop means operable in two directions at angles to each other, each under control of its appropriate numeral key, to variously arrest the co-acting gear mechanism, and to render the drive means effective.

49. In a writing-calculating machine, having a register; and value keys, relatively shiftable in letter-spacing direction; a master element mounted to operate the denominational wheels of the register successively; differential mechanism for the master element; a motor; and a main drive shaft driven by the motor; the combination of a transmission shaft axially shiftable with the differential mechanism relatively to the main drive shaft and the motor; gearing to connect the main and transmission shafts to enable the main shaft to drive the transmission shaft in any of their relative positions; a general operator shaft travelling with and driven by the transmission shaft, to actuate the differential mechanism; means to control the differential mechanism, to determine the differential movement imparted to the master element; and means operable by the general operator shaft to positively restore the differential control means to its normal position.

50. In a machine of the class described, having value keys; a totalizer having denominational elements; and means to actuate the totalizer elements; the combination of means to effect differential operation of the totalizer elements according to the values of the keys set, including normally ineffective stops of fixed, predetermined values, each stop associated only with its individual key of corresponding value; means automatically operable, under control of the selected value key, to set the corresponding value stop to its effective position; a motor to operate the means which actuates the totalizer elements; means controlled by any value key, to render the motor effective; and stop-restoring mechanism operable by the motor to restore any set stop to its ineffective position.

51. In a calculating machine, including a totalizer having denominational wheels; and a master element, the totalizer and master element being relatively shiftable to enable the master element to actuate the denominational wheels seriatim; an element to impart differential movement to the master element; value keys, the differential element being controlled by the value keys to determine the extent of differential movement to be imparted to the master element; and a motor relatively to which the differential element and the master element are bodily shiftable in the totalizer-traversing movement; the combination of drive means to enable the motor to actuate the differential element in any of their relative positions, including a main drive shaft driven by the motor; a spline shaft geared with the main drive shaft, the spline shaft and main drive shaft bearing a fixed relation to the motor; a gear slidable on and rotatable with the spline shaft; a general operator shaft shiftable with the differential element, to drive the latter; and transmitting mechanism connecting the general operator shaft and the spline shaft gear, and shiftable therewith.

52. In a machine of the class described, having value keys; a totalizer; and an actuator for the totalizer; the combination of means to effect differential actuation of the totalizer according to the values of the keys, including a gear and a general operator therefor relatively adjustable laterally to different positions; means to effect such relative movement in one direction; the general operator having a single cycle of movement to rotate the gear differentially in said different relative positions of the gear and the general operator; the gear and general operator being normally disengaged; and means actuated by the general operator to restore the gear from any of its relative positions wherein it is engageable by the general operator, to its normal disengaged position.

53. The combination with a totalizer having denominational wheels, and a totalizer actuator relatively shiftable to enable the actuation of the denominational wheels successively; and value keys; of settable value stops individual to the value keys; means under control of the value keys to automatically set the stops; a motor; a normally ineffective connection between the motor and the totalizer actuator to operate the latter differentially under control of any set stop; and means under control of the operated stop to establish the connection between the motor and the totalizer actuator.

54. In a writing-adding machine, having a stationary frame; a carriage traveling across the frame in letter spacing direction and return; a totalizer and a master wheel, one of which is mounted on the frame and the other on the carriage to enable relative movement denominationally between the master wheel and the totalizer; the combination of means to effect differential rotation of the master wheel, including drive and driven members mounted for bodily movement with the traveling carriage, and for relative axial movement between themselves; stop members having constant, predetermined values; and means to set the stops under control of their respective keys, to variously limit the extent of relative movement of the drive and driven members, and thereby determine the amount to be registered on the totalizer.

HARRY A. FOOTHORAP.

CERTIFICATE OF CORRECTION.

Patent No. 2,145,254. January 31, 1939.

HARRY A. FOOTHORAP.

It is hereby certified that error appears in the printed specification of the above numbered patent requiring correction as follows: Page 22, second column, line 13, claim 6, for the word "of" second occurrence, read by; page 23, second column, lines 28 and 29, claim 16, for "corresponding value stops, and rendered effective by the respective" read respective stops, and rendered effective by the corresponding value; line 55, claim 18, for "member" read members; page 24, first column, line 71, claim 24, after "of" insert the; page 25, first column, line 37, claim 32, after the word "key" insert a semicolon; and that the said Letters Patent should be read with this correction therein that the same may conform to the record of the case in the Patent Office.

Signed and sealed this 14th day of March, A. D. 1939.

Henry Van Arsdale.

(Seal) Acting Commissioner of Patents.